US011430057B1

(12) United States Patent
Hockey et al.

(10) Patent No.: US 11,430,057 B1
(45) Date of Patent: Aug. 30, 2022

(54) PARAMETER-BASED COMPUTER EVALUATION OF USER ACCOUNTS BASED ON USER ACCOUNT DATA STORED IN ONE OR MORE DATABASES

(71) Applicant: Plaid Inc., San Francisco, CA (US)

(72) Inventors: William Hockey, San Francisco, CA (US); Sharon Rapoport, Arlington, MA (US)

(73) Assignee: Plaid Inc., San Francisco, CA (US)

( * ) Notice: Subject to any disclaimer, the term of this patent is extended or adjusted under 35 U.S.C. 154(b) by 25 days.

(21) Appl. No.: 16/900,052

(22) Filed: Jun. 12, 2020

Related U.S. Application Data

(63) Continuation of application No. 15/159,714, filed on May 19, 2016, now Pat. No. 10,726,491.
(Continued)

(51) Int. Cl.
*G06Q 40/02* (2012.01)
*G06Q 40/08* (2012.01)
(Continued)

(52) U.S. Cl.
CPC ....... *G06Q 40/02* (2013.01); *G06F 16/24578* (2019.01); *G06F 16/285* (2019.01);
(Continued)

(58) Field of Classification Search
CPC .................................................... G06Q 40/08
(Continued)

(56) References Cited

U.S. PATENT DOCUMENTS 5,237,499 A   8/1993   Garback
5,347,632 A   9/1994   Filepp
(Continued)

FOREIGN PATENT DOCUMENTS

EP   0 848 336   6/1998
EP   0 848 338   6/1998
(Continued)

OTHER PUBLICATIONS

Quwaider Muhannad, Jararweh Yaser, Al-Alyyoub Mahmoud, Duwairi Rehab, Experimental Framework for Mobile Cloud Computing System, 2015 Jordan University of Science and Technology, Procedia Computer Science 52 (2015) 1147-1152 (Year: 2015).*
Sunwoo Dam, Wang William, Ghosh Mrinmoy, et al, A Structured Approach to the Simulation, Analysis and Characterization of Smartphone Applications, A Structured Approach to the Simulation, Analysis and Characterization of Smartphone Applications (Year: 2013).*
Mancini Emilio, Wainer Gabriel, Al-Zoubi Khaldoo, Dalle Olivier, Simulation in the Cloud Using Handheld Devices, Apr. 25, 2012, https://hal.inria.fr/hal-00691248 (Year: 2012).*
(Continued)

*Primary Examiner* — Eric T Wong
*Assistant Examiner* — Kevin T Poe
(74) *Attorney, Agent, or Firm* — Knobbe, Martens, Olson & Bear, LLP

(57) ABSTRACT

A user account evaluation system is disclosed for evaluating risk associated with a user account. The system may obtain user account data associated with many user accounts, select a statistically significant subset of the user accounts, and then process (e.g., to determine types of the user accounts, etc.) and analyze the subset of user accounts to generate a plurality of evaluation models. When a new user account is accessed by the system, user account data may be obtained for the new user account, and the new user account may be evaluated based on the plurality of evaluation models. Accordingly, a plurality of evaluation parameter scores may be generated for the new user account, each of which may indicate an amount of risk associated with the user account. Some embodiments of the present disclosure may include machine learning and/or artificial intelligence methods to improve evaluation of the user accounts.

18 Claims, 22 Drawing Sheets

Related U.S. Application Data

(60) Provisional application No. 62/271,758, filed on Dec. 28, 2015.

(51) Int. Cl.
*G06F 16/28* (2019.01)
*H04L 9/40* (2022.01)
*G06F 16/2457* (2019.01)

(52) U.S. Cl.
CPC ......... *G06Q 40/08* (2013.01); *H04L 63/0272* (2013.01); *H04L 63/08* (2013.01)

(58) Field of Classification Search
USPC .......................................................... 705/35
See application file for complete search history.

(56) References Cited

U.S. PATENT DOCUMENTS

| | | |
|---|---|---|
| 5,634,127 A | 5/1997 | Cloud |
| 5,649,186 A | 7/1997 | Ferguson |
| 5,701,451 A | 12/1997 | Rogers |
| 5,710,884 A | 1/1998 | Dedrick |
| 5,710,918 A | 1/1998 | Lagarde |
| 5,721,908 A | 2/1998 | Lagarde |
| 5,727,159 A | 3/1998 | Kikinis |
| 5,745,754 A | 4/1998 | Lagarde |
| 5,752,246 A | 5/1998 | Rogers |
| 5,778,065 A | 7/1998 | Hauser et al. |
| 5,778,367 A | 7/1998 | Wesinger, Jr. et al. |
| 5,787,403 A | 7/1998 | Randle |
| 5,793,964 A | 8/1998 | Rogers |
| 5,813,007 A | 9/1998 | Nielsen |
| 5,815,665 A | 9/1998 | Teper |
| 5,819,284 A | 10/1998 | Farber |
| 5,835,724 A | 11/1998 | Smith |
| 5,838,910 A | 11/1998 | Domenikos et al. |
| 5,838,916 A | 11/1998 | Domenikos et al. |
| 5,845,073 A | 12/1998 | Carlin |
| 5,855,018 A | 12/1998 | Chor et al. |
| 5,862,325 A | 1/1999 | Reed et al. |
| 5,870,559 A | 2/1999 | Leshem et al. |
| 5,875,296 A | 2/1999 | Shi |
| 5,878,219 A | 3/1999 | Vance |
| 5,892,905 A | 4/1999 | Brandt et al. |
| 5,892,909 A | 4/1999 | Grasso |
| 5,898,836 A | 4/1999 | Freivald |
| 5,901,287 A | 5/1999 | Bull |
| 5,903,881 A | 5/1999 | Schrader |
| 5,908,469 A | 6/1999 | Botz |
| 5,913,214 A | 6/1999 | Madnick |
| 5,918,216 A | 6/1999 | Miksovsky et al. |
| 5,920,848 A | 7/1999 | Schutzer |
| 5,926,798 A | 7/1999 | Carter |
| 5,930,764 A | 7/1999 | Melchione et al. |
| 5,930,777 A | 7/1999 | Barber |
| 5,933,604 A | 8/1999 | Inakoshi |
| 5,933,816 A | 8/1999 | Zeanah |
| 5,956,720 A | 9/1999 | Fernandez et al. |
| 5,961,593 A | 10/1999 | Gabber et al. |
| 5,961,601 A | 10/1999 | Iyengar |
| 5,963,915 A | 10/1999 | Kirsch |
| 5,963,925 A | 10/1999 | Kolling |
| 5,966,967 A | 10/1999 | Agrawal |
| 5,978,828 A | 11/1999 | Greer |
| 5,978,842 A | 11/1999 | Noble |
| 5,983,267 A | 11/1999 | Shklar et al. |
| 5,983,268 A | 11/1999 | Freivald |
| 5,987,440 A | 11/1999 | O'Neil |
| 5,987,454 A | 11/1999 | Hobbs |
| 5,995,943 A | 11/1999 | Bull |
| 5,999,971 A | 12/1999 | Buckland |
| 6,003,032 A | 12/1999 | Bunney et al. |
| 6,006,333 A | 12/1999 | Nielsen |
| 6,023,698 A | 2/2000 | Lavey |
| 6,041,362 A | 3/2000 | Mears et al. |
| 6,047,327 A | 4/2000 | Tso et al. |
| 6,055,570 A | 4/2000 | Nielsen |
| 6,078,929 A | 6/2000 | Rao |
| 6,082,776 A | 7/2000 | Feinberg |
| 6,092,196 A | 7/2000 | Reiche |
| 6,092,197 A | 7/2000 | Coueignoux |
| 6,105,131 A | 8/2000 | Carroll |
| 6,119,101 A | 9/2000 | Peckover |
| 6,138,158 A | 10/2000 | Boyle |
| 6,148,337 A | 11/2000 | Estberg et al. |
| 6,151,581 A | 11/2000 | Kraftson et al. |
| 6,151,601 A | 11/2000 | Papierniak |
| 6,182,142 B1 | 1/2001 | Win |
| 6,185,567 B1 | 2/2001 | Ratnaraj et al. |
| 6,195,698 B1 | 2/2001 | Lillibridge et al. |
| 6,199,077 B1 | 3/2001 | Inala |
| 6,205,433 B1 | 3/2001 | Boesch |
| 6,208,975 B1 | 3/2001 | Bull |
| 6,209,007 B1 | 3/2001 | Kelley et al. |
| 6,243,816 B1 | 6/2001 | Fang et al. |
| 6,246,999 B1 | 6/2001 | Riley et al. |
| 6,278,449 B1 | 8/2001 | Sugiarto et al. |
| 6,278,999 B1 | 8/2001 | Knapp |
| 6,292,789 B1 | 9/2001 | Schutzer |
| 6,297,819 B1 | 10/2001 | Furst |
| 6,301,584 B1 | 10/2001 | Ranger |
| 6,308,203 B1 | 10/2001 | Itabashi et al. |
| 6,311,275 B1 | 10/2001 | Jin et al. |
| 6,317,783 B1 | 11/2001 | Freishtat |
| 6,360,205 B1 | 3/2002 | Iyengar |
| 6,366,933 B1 | 4/2002 | Ball et al. |
| 6,401,118 B1 | 6/2002 | Thomas |
| 6,405,245 B1 | 6/2002 | Burson |
| 6,412,073 B1 | 6/2002 | Rangan |
| 6,424,968 B1 | 7/2002 | Broster |
| 6,430,539 B1 | 8/2002 | Lazarus |
| 6,484,155 B1 | 11/2002 | Kiss |
| 6,499,042 B1 | 12/2002 | Markus |
| 6,510,451 B2 | 1/2003 | Wu |
| 6,567,411 B2 | 5/2003 | Dahlen |
| 6,567,850 B1 | 5/2003 | Freishtat |
| 6,594,766 B2 | 7/2003 | Rangan |
| 6,632,248 B1 | 10/2003 | Isaac et al. |
| 6,633,910 B1 | 10/2003 | Rajan |
| 6,631,402 B1 | 11/2003 | Devine |
| 6,725,200 B1 | 4/2004 | Rost |
| 6,802,042 B2 | 10/2004 | Rangan |
| 6,859,931 B1 | 2/2005 | Cheyer et al. |
| 6,957,199 B1 | 10/2005 | Fisher |
| 7,028,049 B1 | 4/2006 | Shelton |
| 7,072,932 B1 | 7/2006 | Stahl |
| 7,092,913 B2 | 8/2006 | Cannon, Jr. |
| 7,200,578 B2 | 4/2007 | Paltenghe et al. |
| 7,263,548 B2 | 8/2007 | Daswani |
| 7,275,046 B1 | 9/2007 | Tritt et al. |
| 7,340,411 B2 | 3/2008 | Cook |
| 7,370,011 B2 | 5/2008 | Bennett et al. |
| 7,424,520 B2 | 9/2008 | Daswani |
| 7,640,210 B2 | 12/2009 | Bennett et al. |
| 7,752,535 B2 | 7/2010 | Satyavolu |
| 8,006,291 B2 | 8/2011 | Headley et al. |
| 8,010,783 B1 | 8/2011 | Cahill |
| 8,086,508 B2 | 12/2011 | Dheer et al. |
| 8,140,431 B1 | 3/2012 | Murphy |
| 8,145,914 B2 | 3/2012 | Steeves |
| 8,166,562 B2 | 4/2012 | Holvey et al. |
| 8,209,194 B1 | 6/2012 | Nidy et al. |
| 8,266,515 B2 | 9/2012 | Satyavolu |
| 8,613,066 B1 | 12/2013 | Brezinski et al. |
| 8,645,264 B2 | 2/2014 | Allison et al. |
| 8,676,611 B2 | 3/2014 | McLaughlin et al. |
| 8,739,260 B1 | 5/2014 | Damm-Goossens |
| 8,788,416 B1 | 7/2014 | Vu |
| 8,995,967 B1 | 3/2015 | Billman |
| 9,106,642 B1 | 8/2015 | Bhimanail |
| 9,202,250 B1 | 12/2015 | Palaniappan |
| 9,430,892 B2 | 8/2016 | Amdahl |
| 9,449,346 B1 | 9/2016 | Hockey et al. |

(56) References Cited

U.S. PATENT DOCUMENTS

| | | |
|---|---|---|
| 9,595,023 B1 | 3/2017 | Hockey et al. |
| 9,699,187 B2 | 7/2017 | Chen et al. |
| 9,774,590 B1 | 9/2017 | Bronshtein et al. |
| 9,906,520 B2 | 2/2018 | Fouad et al. |
| 10,003,591 B2 | 6/2018 | Hockey et al. |
| 10,104,059 B2 | 10/2018 | Hockey et al. |
| 10,319,029 B1 | 6/2019 | Hockey et al. |
| 10,523,653 B2 | 12/2019 | Hockey et al. |
| 10,530,761 B2 | 1/2020 | Hockey et al. |
| 10,546,348 B1 | 1/2020 | Lesner et al. |
| 10,614,463 B1 | 4/2020 | Hockey et al. |
| 10,726,491 B1 | 7/2020 | Hockey et al. |
| 10,878,421 B2 | 12/2020 | Putnam |
| 10,904,239 B2 | 1/2021 | Hockey et al. |
| 10,984,468 B1 | 4/2021 | Hockey et al. |
| 11,030,682 B1 | 6/2021 | Hockey et al. |
| 11,050,729 B2 | 6/2021 | Hockey et al. |
| 11,216,814 B1 | 1/2022 | Hockey et al. |
| 2001/0011274 A1 | 8/2001 | Klug et al. |
| 2002/0002596 A1 | 1/2002 | Sugiarto et al. |
| 2002/0065772 A1 | 5/2002 | Saliba et al. |
| 2002/0091635 A1 | 7/2002 | Dilip et al. |
| 2002/0095588 A1 | 7/2002 | Shigematsu et al. |
| 2003/0023879 A1 | 1/2003 | Wray |
| 2003/0028646 A1 | 2/2003 | Wray |
| 2003/0060896 A9 | 3/2003 | Hulai |
| 2003/0158960 A1 | 8/2003 | Engberg |
| 2003/0163425 A1 | 8/2003 | Cannon, Jr. |
| 2003/0182035 A1 | 9/2003 | DiLodovico et al. |
| 2003/0185370 A1 | 10/2003 | Rosera et al. |
| 2003/0204460 A1* | 10/2003 | Robinson ............... G07F 7/1016 705/35 |
| 2004/0059672 A1 | 3/2004 | Baig et al. |
| 2005/0027617 A1 | 2/2005 | Zucker et al. |
| 2005/0154913 A1 | 7/2005 | Barriga et al. |
| 2005/0177510 A1 | 8/2005 | Hilt et al. |
| 2005/0222929 A1 | 10/2005 | Steier et al. |
| 2005/0246269 A1 | 11/2005 | Smith |
| 2006/0015358 A1 | 1/2006 | Chua |
| 2006/0116949 A1 | 6/2006 | Wehunt et al. |
| 2006/0136332 A1 | 6/2006 | Ziegler |
| 2006/0190569 A1 | 8/2006 | Neil |
| 2006/0236384 A1 | 10/2006 | Lindholm et al. |
| 2007/0179883 A1 | 8/2007 | Questembert |
| 2007/0179942 A1 | 8/2007 | Heggem |
| 2007/0225047 A1 | 9/2007 | Bakos |
| 2007/0255662 A1 | 11/2007 | Tumminaro |
| 2007/0289002 A1 | 12/2007 | van der Horst et al. |
| 2008/0051059 A1 | 2/2008 | Fisher |
| 2008/0052192 A1 | 2/2008 | Fisher |
| 2008/0052233 A1 | 2/2008 | Fisher |
| 2008/0120129 A1 | 5/2008 | Seubert et al. |
| 2008/0162361 A1 | 7/2008 | Sklovsky |
| 2008/0183628 A1 | 7/2008 | Oliver et al. |
| 2008/0243784 A1 | 10/2008 | Stading |
| 2008/0249931 A1 | 10/2008 | Gilder et al. |
| 2008/0250246 A1 | 10/2008 | Arditti et al. |
| 2009/0037308 A1 | 2/2009 | Feinstein |
| 2009/0070257 A1 | 3/2009 | Csoka |
| 2009/0222900 A1 | 9/2009 | Benaloh et al. |
| 2009/0228779 A1 | 9/2009 | Williamson et al. |
| 2009/0245521 A1 | 10/2009 | Vembu |
| 2009/0271847 A1 | 10/2009 | Karjala et al. |
| 2009/0328177 A1 | 12/2009 | Frey et al. |
| 2010/0027552 A1 | 2/2010 | Hill |
| 2010/0043054 A1 | 2/2010 | Kidwell |
| 2010/0049850 A1 | 2/2010 | Nanduri et al. |
| 2010/0169072 A1 | 7/2010 | Zaki et al. |
| 2010/0185868 A1 | 7/2010 | Grecia |
| 2010/0235882 A1 | 9/2010 | Moore |
| 2010/0313255 A1 | 12/2010 | Khuda |
| 2010/0325710 A1 | 12/2010 | Etchegoyen |
| 2011/0196790 A1 | 8/2011 | Milne |
| 2011/0238550 A1 | 9/2011 | Reich et al. |
| 2011/0247060 A1 | 10/2011 | Whitmyer, Jr. |
| 2011/0295731 A1 | 12/2011 | Waldron, III et al. |
| 2012/0059706 A1 | 3/2012 | Goenka et al. |
| 2012/0129503 A1 | 5/2012 | Lindeman et al. |
| 2012/0209775 A1 | 8/2012 | Milne |
| 2012/0215688 A1 | 8/2012 | Musser et al. |
| 2012/0278201 A1 | 11/2012 | Milne |
| 2012/0281058 A1 | 11/2012 | Laney et al. |
| 2012/0284175 A1 | 11/2012 | Wilson et al. |
| 2012/0323717 A1 | 12/2012 | Kirsch |
| 2013/0019297 A1 | 1/2013 | Lawson et al. |
| 2013/0041736 A1 | 2/2013 | Coppinger |
| 2013/0041739 A1 | 2/2013 | Coppinger |
| 2013/0041744 A1 | 2/2013 | Coppinger |
| 2013/0046599 A1 | 2/2013 | Coppinger |
| 2013/0097685 A1 | 4/2013 | Kennedy et al. |
| 2013/0125223 A1 | 5/2013 | Sorotokin et al. |
| 2013/0174015 A1 | 7/2013 | Jeff L. |
| 2013/0191526 A1 | 7/2013 | Zhao |
| 2013/0232006 A1 | 9/2013 | Holcomb et al. |
| 2013/0247005 A1 | 9/2013 | Hirsch et al. |
| 2013/0282577 A1 | 10/2013 | Milne |
| 2013/0318592 A1 | 11/2013 | Grier, Sr. et al. |
| 2014/0032414 A1 | 1/2014 | Beisner et al. |
| 2014/0040148 A1 | 2/2014 | Ozvat et al. |
| 2014/0044123 A1 | 2/2014 | Lawson et al. |
| 2014/0067499 A1 | 3/2014 | Stepanovich |
| 2014/0150072 A1 | 5/2014 | Castro et al. |
| 2014/0165156 A1 | 6/2014 | Fushman et al. |
| 2014/0173695 A1 | 6/2014 | Valdivia |
| 2014/0180962 A1 | 6/2014 | Fiala et al. |
| 2014/0189808 A1 | 7/2014 | Mahaffey et al. |
| 2014/0189828 A1 | 7/2014 | Baghdasaryan et al. |
| 2014/0208389 A1* | 7/2014 | Kelley ............... H04W 12/06 726/4 |
| 2014/0215551 A1 | 7/2014 | Allain et al. |
| 2014/0236716 A1 | 8/2014 | Shapiro et al. |
| 2014/0245411 A1 | 8/2014 | Meng et al. |
| 2014/0258063 A1* | 9/2014 | Chourasia ............. G06Q 40/12 705/35 |
| 2014/0280555 A1* | 9/2014 | Tapia ................... G06Q 50/01 709/204 |
| 2014/0344141 A1 | 11/2014 | Cook |
| 2014/0358704 A1 | 12/2014 | Banerjee et al. |
| 2014/0365350 A1 | 12/2014 | Shvarts |
| 2015/0026024 A1* | 1/2015 | Calman ................. G06Q 40/02 705/35 |
| 2015/0046338 A1 | 2/2015 | Laxminarayanan et al. |
| 2015/0066719 A1 | 3/2015 | Agrawal et al. |
| 2015/0066765 A1 | 3/2015 | Banks et al. |
| 2015/0088707 A1 | 3/2015 | Drury et al. |
| 2015/0088732 A1 | 3/2015 | DeVan, Jr. et al. |
| 2015/0113511 A1 | 4/2015 | Poulin |
| 2015/0161608 A1 | 6/2015 | Gilbert |
| 2015/0193871 A1 | 7/2015 | Murphy |
| 2015/0254672 A1 | 9/2015 | Huesch et al. |
| 2015/0281225 A1 | 10/2015 | Schoen et al. |
| 2015/0310562 A1 | 10/2015 | Chourasia et al. |
| 2015/0339664 A1* | 11/2015 | Wong ................. H04W 12/069 705/71 |
| 2015/0365399 A1 | 12/2015 | Biswas et al. |
| 2016/0063657 A1 | 3/2016 | Chen et al. |
| 2017/0118301 A1 | 4/2017 | Kouru et al. |
| 2017/0132633 A1 | 5/2017 | Whitehouse |
| 2017/0148021 A1 | 5/2017 | Goldstein et al. |
| 2017/0193112 A1 | 7/2017 | Desineni et al. |
| 2017/0193486 A1 | 7/2017 | Parekh |
| 2017/0200137 A1 | 7/2017 | Vilmont |
| 2017/0200234 A1 | 7/2017 | Morse |
| 2017/0262840 A1 | 9/2017 | Dunwoody |
| 2017/0300960 A1 | 10/2017 | Khvostov et al. |
| 2017/0308902 A1 | 10/2017 | Quiroga et al. |
| 2018/0060927 A1 | 3/2018 | Gupta |
| 2018/0157851 A1 | 6/2018 | Sgambati et al. |
| 2018/0191685 A1 | 7/2018 | Bajoria |
| 2018/0196694 A1 | 7/2018 | Banerjee et al. |
| 2018/0232734 A1 | 8/2018 | Smets et al. |
| 2018/0246943 A1 | 8/2018 | Avagyan et al. |
| 2018/0267847 A1 | 9/2018 | Smith et al. |
| 2018/0267874 A1 | 9/2018 | Keremane et al. |

(56) References Cited

U.S. PATENT DOCUMENTS

| | | |
|---|---|---|
| 2018/0330342 A1 | 11/2018 | Prakash et al. |
| 2018/0349909 A1 | 12/2018 | Allen et al. |
| 2018/0367428 A1 | 12/2018 | Di Pietro et al. |
| 2019/0075115 A1 | 3/2019 | Anderson et al. |
| 2019/0180364 A1 | 6/2019 | Chong et al. |
| 2019/0188717 A1 | 6/2019 | Putnam |
| 2019/0333159 A1 | 10/2019 | Chourasia et al. |
| 2019/0354544 A1 | 11/2019 | Hertz et al. |
| 2020/0106764 A1 | 4/2020 | Hockey et al. |
| 2020/0106765 A1 | 4/2020 | Hockey et al. |
| 2020/0110585 A1 | 4/2020 | Perry |
| 2020/0201878 A1 | 6/2020 | Putnam et al. |
| 2021/0004439 A1 | 1/2021 | Xiong et al. |
| 2021/0165960 A1 | 6/2021 | Eisenschlos et al. |
| 2021/0217016 A1 | 7/2021 | Putman |
| 2021/0233162 A1 | 7/2021 | Hockey et al. |
| 2021/0281558 A1 | 9/2021 | Hockey et al. |
| 2021/0288956 A1 | 9/2021 | Hockey et al. |
| 2021/0350340 A1 | 11/2021 | Lai et al. |

FOREIGN PATENT DOCUMENTS

| | | |
|---|---|---|
| EP | 0 848 339 | 6/1998 |
| EP | 2 747 374 | 6/2014 |
| EP | 3 347 846 | 7/2018 |
| WO | WO 96/38795 | 12/1996 |
| WO | WO 97/10542 | 3/1997 |
| WO | WO 97/09682 | 5/1997 |
| WO | WO 97/26612 | 7/1997 |
| WO | WO 97/37314 | 10/1997 |
| WO | WO 98/14896 | 4/1998 |
| WO | WO 00/25227 | 5/2000 |
| WO | WO 2017/044479 | 3/2017 |
| WO | WO 2017/173021 | 10/2017 |

OTHER PUBLICATIONS

U.S. Appl. No. 14/719,110 System and Method for Programmatically Accessing Financial Data, filed May 21, 2015.
U.S. Appl. No. 16/396,505, System and Method for Programmatically Accessing Financial Data, filed Apr. 26, 2019.
U.S. Appl. No. 14/719,117, System and Method for Facilitating Programmatic Verification of Transactions, filed May 21, 2015.
U.S. Appl. No. 16/800,543, System and Method for Facilitating Programmatic Verification of Transactions, filed Feb. 25, 2020.
U.S. Appl. No. 16/688,192, Secure Permissioning of Access to User Accounts, Including Secure Deauthorization of Access to User Accounts, filed Nov. 19, 2019.
U.S. Appl. No. 16/688,263, Secure Permissioning of Access to User Accounts, Including Secure Deauthorization of Access to User Accounts, filed Nov. 19, 2019.
U.S. Appl. No. 15/159,714, Parameter-Based Computer Evaluation of User Accounts Based on User Account Data Stored in One or More Databases, filed May 19, 2016.
U.S. Appl. No. 15/160,663, Systems and Methods for Estimating Past and Prospective Attribute Values Associated With a User Account, filed May 20, 2016.
U.S. Appl. No. 16/042,618, Data Verified Deposits, filed Jul. 23, 2018.
"A Single Login Web Service Integrator—WebEntrance", Yan Zhao, Sixth International World Wide Web Conference, Santa Clara, CA, Apr. 7-11, 1997.
"Automatic Notification of Web Sites Changes," Google Groups, Aug. 30, 1995.
"Boeing Chooses NetMind Enterprise Minder to Help Thousands of Employees Track Web-Based Information," PR Newswire, Nov. 19, 1998.
"Caravelle's InfoWatcher 1.1 Keeps an Eye on the Web," PC Week 1997.
"Cognisoft Announces IntelliServ, A Revolutionary Intranet Information Management Application; a Powerful Solution that Enables the Right Information to Find the Right User at the Right Time," Business Wire, p. 8140125, Aug. 14, 1996.
"FirstFloor and AirMedia Announce Partnership," Business Wire 1997 ("FirstFloor").
"Fujitsu Announces 'WebAgent' Application as part of ByeDesk Link Wireless Server Software," Business Wire, Sept. 1, 1998.
"Fujitsu Announces Availability of ByeDesk Link for Alpha-Numeric Pagers; Next Step in Empowering Mobile Workforces with 'Anyplace, Anytime' Information," Business Wire, Jul. 9, 1998.
"Fujitsu Picks NetMind for Wireless Web Agent Software," Computergram International, Sep. 2, 1998.
"Fujitsu's ByeDesk Link Now Available On the PalmPilot," Business Wire, Sep. 21, 1998.
"GC Tech's GlobeID Payment Internet Commerce Software Supports Microsoft, Merchant Server," Business Wire, Jan. 21, 1997, p. 1211286.
"Highly Scalable On-Line Payments via Task Decoupling," Financial Cryptography First International Conference, 1998, p. 355-373.
"Minding Web Site Changes," PC Week, Sep. 14, 1998.
"NetMind Accepts $7 Million Strategic Investment From Three Prominent VC Firms—BancBoston, Softbank and Draper Fisher Jurvestson," PR Newswire, Nov. 6, 1998.
"NetMind Updates the World's Largest Free Web Tracking Service," PR Newswire, Sep. 18, 1998.
"The AT&T Internet Difference Engine: Tracking and Viewing Changes on the Web," World Wide Web 1(1); Jan. 1998, pp. 27-44.
"Versatile Intelligent Agents in Commercial Applications," Google Groups, Dec. 12, 1998.
"Web Interface Definition Language (WIDL)", W3 Consortium submission from webMethods, Inc., Sep. 22, 1997.
"WebEntree: A Web Service Aggregator", Y. Zhao, IBM Systems Journal, vol. 37, No. 4, 1998.
A hierarchical approach to wrapper induction, Ion Muslea, Steve Minton, and Craig A. Knoblock. In Proceedings of the 3rd International Conference on Autonomous Agents 1999, Seattle, WA, 1999. May 1-5, 1999.
Building agents for internet-base supply chain integration, Craig A. Knoblock and Steven Minton. In Proceedings of the Workshop on Agents for Electronic Commerce and Managing the Internet-Enabled Supply Chain, Seattle, WA, 1999. May 1-5, 1999.
Corena et al., "Secure and fast aggregation of financial data in cloud-based expense tracking applications." Journal of Network and Systems Management 20.4 (2012): 534-560.
Examination Report in CA Application No. 2997115, dated Jun. 20, 2019.
Examination Report in CA Application No. 2997115, dated Nov. 13, 2019.
Hagel et al. "The Coming Battle for Customer Information." Harvard Business Review, Jan.-Feb. 1997, reprint No. 97104.
Hummer, Waldemar, Philipp Leitner, and Schahram Dustdar. "Ws-aggregation: distributed of web services data." Proceedings of the 2011 ACM Symposium on Applied Computing. ACM, 2011.
Intelligent caching for information mediators: A kr based approach, Naveen Ashish, Craig A. Knoblock, and Cyrus Shahabi. In Proceedings of the Workshop on Knowledge Representation meets Databases (KRDB), Seattle, WA, 1998. Presented May 1, 1998.
International Search Report in PCT Application No. PCT/US2016/050536, dated Dec. 15, 2016.
Johner et al. "Sign On with IBM's Global Sign-On!" IBM manual, Nov. 1998. Part 1, in 184 pages.
Johner et al. "Sign On with IBM's Global Sign-On!" IBM manual, Nov. 1998. Part 2, pp. 166-307.
Kim, Young-Gon et. al., 'A Design of User Authentication System Using QR code Identifying Method', 6th International Conference on Computer Sciences and Convergence Information Technology (ICCIT), pp. 31-35, 2011.
Kyeongwon C., et. al., 'A Mobile based Anti-Phishing Authentication Scheme using QR code', IEEE International Conference on Mobile IT Convergence, pp. 109-113, 2011.
Mancini et al., "Simulation in the Cloud Using Handheld Devices," Workshop on Modeling and Simulation on Grid and Cloud Computing, Apr. 25, 2012, 8 pages.

(56) References Cited

OTHER PUBLICATIONS

Modeling web sources for information integration, Craig A. Knoblock, Steven Minton, Jose Luis Ambite, Naveen Ashish, Pragnesh Jay Modi, Ion Muslea, Andrew G. Philpot, and Sheila Tejada. In Proceedings of the Fifteenth National Conference on Artificial Intelligence, Madison, WI, 1998. Jul. 26-30, 1998.

Mohammed et al. A Multi-layer of Multi Factors Authentication Model for Online Banking Services, Oct. 15, 2013, 2013 International Conference on Computing, Electrical and Electronic Engineering (ICCEEE), pp. 220-224.

Neville, S.W. et al. Efficiently Archieving Full Three-Way Non-repudiation in Consumer-level eCommerce and M-Commerce Transactions, Nov. 1, 2011, 2011 IEEE 10th International Conference on Trust, Security and Privacy in Computing and Communications, pp. 664-672.

Optimizing Information Agents by Selectively Materializing Data, Naveen Ashish, Craig A. Knoblock, and Cyrus Shahabi. In Proceedings of the AAAI'98 Workshop on AI and Information Integration, Madison, WI, 1998. Jul. 26-30, 1998.

O'Riain et al., "XBRL and open data for global financial ecosystems: A linked data approach." International Journal of Accounting Information Systems 13.2 (2012): 141-162.

Quwaider et al., "Experimental Framework for Mobile Cloud Computing System", Jordan University of Science and Technology, Procedia Computer Science 52, 2015, pp. 1147-1152.

Semi-automatic wrapper generation for Internet information sources, Naveen Ashish and Craig A. Knoblock. In Proceedings of the Second IFCIS International Conference on Cooperative Information Systems, Kiawah Island, SC, 1997. Jun. 24-27, 1997.

Sunwoo et al., "A Structured Approach to the Simulation, Analysis and Characterization of Smartphone Applications", IEEE 2013, pp. 113-122.

Supplementary European Search Report in EP Application No. 16844973.4, dated Jan. 4, 2019.

The ariadne approach to web-based information integration, Craig A. Knoblock and Steven Minton. IEEE Intelligent Systems, 13(5), Sep./Oct. 1998.

Wrapper generation for semi-structured Internet sources, Naveen Ashish and Craig A. Knoblock. In Proceedings of the Workshop on Management of Semistructured Data, Tucson, AZ, 1997. May 13-15, 1997.

Wrapper induction for semistructured, web-based information sources, Ion Muslea, Steven Minton, and Craig A. Knoblock. In Proceedings of the Conference on Automated Learning and Discovery Workshop on Learning from Text and the Web, Pittsburgh, PA, 1998. Jun. 11-13, 1998.

Examination Report in CA Application No. 2997115 dated Apr. 2, 2020.

U.S. Appl. No. 17/302,630, System and Method for Programmatically Accessing Financial Data, filed May 7, 2021.

U.S. Appl. No. 17/533,728 System and Method for Facilitating Programmatic Verification of Transactions, filed Nov. 23, 2021.

U.S. Appl. No. 17/303,432, Secure Permissioning of Access to User Accounts, Including Secure Deauthorization of Access to User Accounts, filed May 28, 2021.

U.S. Appl. No. 17/126,673, Secure Permissioning of Access to User Accounts, Including Secure Deauthorization of Access to User Accounts, filed Dec. 18, 2020.

U.S. Appl. No. 17/230,835, Systems and Methods for Estimating Past and Prospective Attribute Values Associated With a User Account, filed Apr. 14, 2021.

U.S. Appl. No. 16/570,630, Secure Authorization of Access to User Accounts by One or More Authorization Mechanisms, filed Sep. 13, 2019.

U.S. Appl. No. 16/042,147, Browser-Based Aggregation, filed Jul. 23, 2018.

U.S. Appl. No. 17/103,267, Data Verified Deposits, filed Nov. 24, 2020.

U.S. Appl. No. 17/302,499, Secure Updating of Allocations to User Accounts, filed May 4, 2021.

U.S. Appl. No. 17/499,696, Systems and Methods for Data Parsing, filed Oct. 12, 2021.

Chaulagain et al., "Cloud Based Web Scraping for Big Data Application." IEEE International Conference on Smart Cloud, 2017, pp. 138-143.

Devlin, J. et al., "BERT: Pre-training of Deep Bidirectional Transformers for Language Understanding," arXive, May 24, 2019, retrieved from the internet, URL: https://arxiv.org/pdf/1810.04805.pdf, 16 pages.

Jin, C., "How Plaid parses transaction data," Oct. 22, 2020, retrieved from the internet, URL: https://plaid.com/blog/how-plaid-parsestransaction-data/, 10 pages.

M. C. McChesney, "Banking in cyberspace: an investment in itself," IEEE Spectrum, vol. 34, No. 2, Feb. 1997, pp. 54-59.

Y. Zhao, "WebEntree: A Web Service Aggregator", IBM Systems Journal, vol. 37, No. 4, 1998, pp. 584-595.

Examination Report in CA Application No. 2997115 dated Nov. 2, 2020, 3 pages.

Examination Report in CA Application No. 3119897 dated Jul. 30, 2021, 6 pages.

Examination Report in EP Application No. 16844973.4 dated Nov. 4, 2020, 6 pages.

Examination Report in AU Application No. 2016321166 dated Dec. 7, 2020, 5 pages.

International Search Report and Written Opinion in PCT Application No. PCT/US2021/030808, dated Jun. 21, 2021, 11 pages.

International Search Report and Written Opinion in PCT Application No. PCT/US2021/071851, dated Dec. 13, 2021, 10 pages.

\* cited by examiner

Proxy Instance User A Bank 1 121

User: "User A"
Institution: "Bank 1 141"
Credentials: <User A Credentials Bank 1>
Properties: <User A Properties Bank 1>

Proxy Instance User A Bank 2 122

User: "User A"
Institution: "Bank 2 142"
Credentials: <User A Credentials Bank 2>
Properties: <User A Properties Bank 2>

Proxy Instance User B Bank 2 123

User: "User B"
Institution: "Bank 2 142"
Credentials: <User B Credentials Bank 2>
Properties: <User B Properties Bank 2>

FIG. 2

Dev Account B Proxy Instance User A Bank 1 421

Dev Account B User: "User A"
Institution: "Bank 1 141"
Credentials: <User A Credentials Bank 1>
Properties: <User A Properties Bank 1>

Dev Account B Proxy Instance User A Bank 2 422

Dev Account B User: "User A"
Institution: "Bank 2 142"
Credentials: <User A Credentials Bank 2>
Properties: <User A Properties Bank 2>

Dev Account B Proxy Instance User B Bank 2 423

Dev Account B User: "User B"
Institution: "Bank 2 142"
Credentials: <User B Credentials Bank 2>
Properties: <User B Properties Bank 2>

Dev Account A Proxy Instance User C Bank 1 424

Dev Account A User: "User C"
Institution: "Bank 1 141"
Credentials: <User C Credentials Bank 1>
Properties: <User C Properties Bank 1>

Dev Account A Proxy Instance User C Bank 2 425

Dev Account A User: "User C"
Institution: "Bank 2 142"
Credentials: <User C Credentials Bank 2>
Properties: <User C Properties Bank 2>

FIG. 4B

NEW USER WITH STATE SUBMIT

```
\curl -X POST https://bankAPI.example/auth \
 -d client_id={CLIENT_ID} \
 -d secret={SECRET} \
 -d credentials='{
  "username":"plaid_test",
  "password":"plaid_good",
  "state":"tx"}' \
 -d type={TYPE}
```

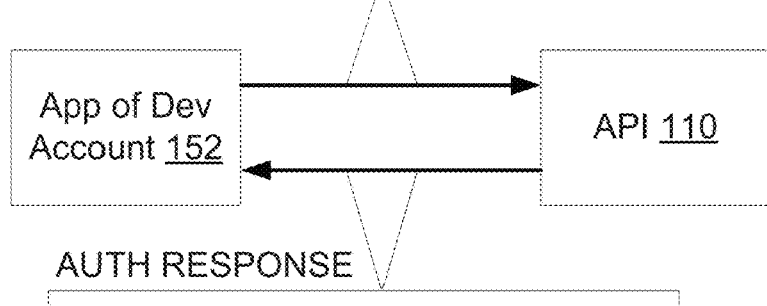

AUTH RESPONSE

```
http code 200
{"accounts": [{
  "_id": "52db1be4be13cbXXXXXXXXXX",
  "_item": "52af631671c3bdXXXXXXXXXX",
  "_user": "52af630f71c3bdXXXXXXXXXX",
  "balance": {
   "available": 1400,
   "current": 1230
  },
  "meta": {
   "name": "My Savings",
   "number": "31015"
  },
  "numbers": {
   "routing": "0000000",
   "account": "1111111",
   "wireRouting": "2222222"
  },
  "institution_type": "chase",
  "type": "depository",
  "status": "normal",
},
...], "access_token": "xxxxx"}
```

FIG. 7

NEW USER WITH STATE SUBMIT

```
\curl -X POST https://bankAPI.example/transaction \
 -d client_id={CLIENT_ID} \
 -d secret={SECRET} \
 -d transaction='{
   "withdrawal_account_token":"jasdlkfjio34i29",
   "deposit_account_token":"Bjsklaidf9djanjk",
   "amount":"515.15"}' \
 -d type={TYPE}
```

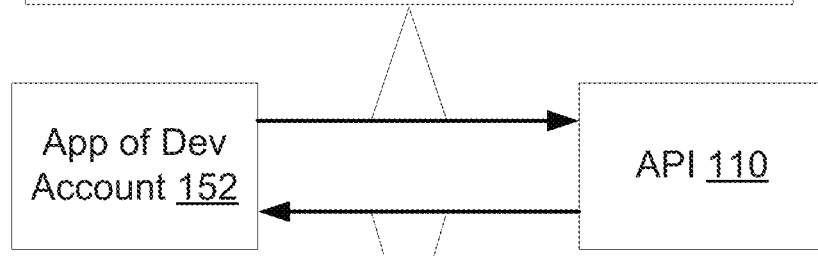

AUTH RESPONSE

```
http code 200
{"transaction": [{
  "_id": "52db1be4be13cbXXXXXXXXXX",
  "status": "processing",
},
...], "transaction_access_token": "xxxxx"}
```

FIG. 8

| |
|---|
| transaction_amounts: How transaction amounts are distributed across different buckets. |
| ratio_high_average: Ratio of highest transaction amount to average positive transaction amount. |
| ratio_low_average: Ratio of lowest negative transaction amount to average negative transaction amount. |
| high_risk_class_txns: Number of transactions that fall into four specific high risk categories. |
| fraction_bank_fees: Proportion of transactions that are bank fees. |
| foreign_fees: Number of foreign fees per month. |
| bank_transfers: Proportion of transactions that are transfers. |
| benfords_law: How much transaction amounts deviate from the distribution of digits predicted by Benford's Law. |
| additional_risk_class_txns: Number of transactions with additional risk factors. |
| mean_payment_amount: Average credit card payment amount. |
| mean_payment_time: Average time between credit payments. |
| home_state_percentage: Percentage of time spent in primary spending state. |
| n_txns_per_month: The average number of transactions this account has per month. |
| zero_count_credit_payments: Zero count from the right for credit card payments. |
| zero_count: Zero count from the right for all payments. |

FIG. 15

```
http code 200
{
  "accounts": [
    {
      "_id": "mjj9jp92z2fD1mLlp",
      "_item": "aWWVW4VqGqIdaP495",
      "_user": "bkkVkMVwQwfYmBMy9",
      "balance": {
        "available": 1203.42,
        "current": 1274.93
      },
      "meta": {
        "name": "Savings",
        "number": "9606"
      },
      "institution_type": "fake_institution",
      "type": "depository",
      "risk": { # 0 is not risky, 1 is risky
        "reason": {
          "zero_count": 0.38,
          "ratio_low_average": 0.75,
          "high_risk_class_txns": 0.73,
          "bank_transfers": 0.4,
          "benfords_law": 0.65,
          "transaction_amounts": 0.78,
          "additional_risk_class_txns": 0.94,
          "foreign_fees": 0.96,
          "fraction_bank_fees": 0.64
        },
        "score": 0.79
      },
    },
    ...],
  "access_token": "xxxxx"
}
```

- 1802: `_id`, `_item`, `_user`, `balance`
- 1804: `meta`
- 1806, 1808: `institution_type`, `type`
- 1810: `risk` / `reason`
- 1812: `score`

FIG. 18

PARAMETER-BASED COMPUTER EVALUATION OF USER ACCOUNTS BASED ON USER ACCOUNT DATA STORED IN ONE OR MORE DATABASES

CROSS-REFERENCE TO RELATED APPLICATIONS

This application is a continuation of U.S. patent application Ser. No. 15/159,714, filed May 19, 2016, and titled "PARAMETER-BASED COMPUTER EVALUATION OF USER ACCOUNTS BASED ON USER ACCOUNT DATA STORED IN ONE OR MORE DATABASES," which application claims benefit of U.S. Provisional Patent Application No. 62/271,758, filed Dec. 28, 2015, and titled "PARAMETER-BASED COMPUTER EVALUATION OF USER ACCOUNTS BASED ON USER ACCOUNT DATA STORED IN ONE OR MORE DATABASES." The entire disclosure of each of the above items is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57 for all purposes and for all that they contain.

TECHNICAL FIELD

Embodiments of present disclosure relate to systems and techniques for computer-based evaluation of user account data. More specifically, embodiments of the present disclosure relate to generating parameter-based models based on a population of user account data, evaluating new user account data based on those models, and providing results of the evaluation via a normalized API. Embodiments of the present disclosure may include machine learning and/or artificial intelligence methods to improve evaluation of the user accounts.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Engaging in transactions with a user via a user account of the user inherently involves some risk. For example, the user may have malicious motives, or may be unlikely to be able to meet an obligation. It would be useful have an idea of the risk represented by a user account.

SUMMARY

The systems, methods, and devices described herein each have several aspects, no single one of which is solely responsible for its desirable attributes. Without limiting the scope of this disclosure, several non-limiting features will now be described briefly.

Embodiments of the present disclosure relate to systems and techniques for securely and efficiently obtaining user account data via instantiation of virtualized instances of first-party software applications. For example, the systems of the present disclosure include generation of proxy, or virtualized, instances of software applications that are configured to interface with external systems via non-public, or proprietary application programming interfaces (APIs). The virtualized instances of the software applications may be authenticated with the external systems as if the virtualized instances are actually first-party software applications executing on a user computing device. Via the non-public APIs user account information may be obtained and processed, such that the data may be normalized and provided to other software systems via a normalized API of the system. Accordingly, the systems of the present disclosure may be significantly more efficient at obtaining user account data from external systems than previous techniques. Further, the user account data may be normalized and requested and/or provided via a normalized API, enabling others to efficiently access such data (originally obtained from multiple external systems) from a single standardized interface in a highly efficient manner.

Embodiments of the present disclosure also relate to systems (e.g., a user account evaluation system) and techniques for evaluating risk associated with a user account. In some embodiments, the system obtains, via methods described above and herein, user account data associated with many user accounts. In order to increase efficiency of the system, a subset (e.g., a statistically significant subset) of the user accounts may be selected. The user account data from the subset of accounts is then processed (e.g., to determine types of the user accounts, parse transactions, categorize transactions, augment transactions, etc.) and analyzed to generate a plurality of evaluation models (each of which may be specific to a type of user account, for example). The evaluation models may be normalized. The evaluation models may include, for example, normalized evaluation parameter functions for each of a plurality of parameters, each of which indicates behaviors of the many user accounts with respect to one evaluation parameter. When a new user account is accessed by the system, user account data may be obtained for the new user account (via, e.g., methods described above and herein), and the new user account may be evaluated based on the plurality of evaluation models. Accordingly, a plurality of evaluation parameter scores may be generated for the new user account, each of which may indicate an amount of risk associated with the user account. The evaluation parameters may be combined in various ways to generate overall evaluation parameters and corresponding overall evaluation parameter scores. The evaluation parameter scores may be requested and/or provided via a normalized API, enabling others to efficiently access such evaluation parameter scores from a single standardized interface in a highly efficient manner.

Some embodiments of the present disclosure may include machine learning and/or artificial intelligence methods to improve evaluation of the user accounts. For example, the evaluation parameter scores generated by the system may be automatically evaluated to determine an accuracy of the evaluation parameter scores. Results of such an evaluation may be fed back into the system to identify other evaluation parameters, adjust the evaluation parameters, adjust weightings of the evaluation parameters, and/or the like.

Advantageously, evaluation parameter scores may provide objective indications to a customer of, e.g., risk associated with a given user account. By determining and providing scores related to multiple evaluation parameters for a given account, the system, in some implementations, advantageously provides multiple dimensions of evaluation to the customer that the customer me use and/or combine in various ways to determine whether, e.g., to enter into a transaction with the user/user account. In some embodiments, the customer may specify how and which evaluation parameters are provided by the system. Further, advantageously, an overall evaluation parameter score may provide an objective indication to the customer of an overall assessment of, e.g., risk associated with a given user account. In some embodiments, the customer may specify how and which evaluation parameters are combined for the overall evaluation parameter score.

According to some embodiments, an external user-facing system/application may, via the API, request and receive user account data and evaluation parameter scores, as described above and herein. Advantageously, according to some embodiments, the external user-facing system/application may request various different evaluation parameter scores, and/or may request that the evaluation parameter scores be combined in various ways. Thus, the system may be customized to the needs of each external user-facing system/application.

In various embodiments, large amounts of data are automatically and dynamically retrieved and processed in response to application programming interface (API) requests and other user inputs, and the retrieved data is efficiently and compactly accessible to a customer or user also via normalized API responses from the system. The data is retrieved in an efficient way via instantiation of virtualized instances of mobile applications, for example. Thus, in some embodiments, the API interfaces described herein are more efficient as compared to previous interfaces in which data is not normalized and compactly and efficiently provided to the customer user in response to such requests. Advantageously, using the system, the customer or user may access data from multiple disparate data sources/stores and/or systems, each of which may use a proprietary interface, in a standardized way.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The present disclosure describes various embodiments of interactive and dynamic user interfaces that are the result of significant development. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interface via the inputs described herein may provide an optimized display of, and interaction with, transaction and account data and may enable a customer user to more quickly and accurately access, navigate, assess, and digest the account data than previous systems.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various aspects and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as mentioned above, existing account and/or transaction data retrieval technology is limited in various ways (e.g., interfaces differ for each system or source, data is provided in different formats, etc.), and various embodiments of the disclosure provide significant improvements over such technology. Additionally, various embodiments of the present disclosure are inextricably tied to computer technology. In particular, various embodiments rely on receipt of computer-based API requests, accessing of transaction and/or other data via, e.g., virtualized instances of mobile applications, normalization of retrieved data, and responses to the requests via the API in a standardized way. Such features and others are intimately tied to, and enabled by, computer technology, and would not exist except for computer technology. For example, the API request and responses, and instantiation of virtualized instances of e.g., mobile applications, described below in reference to various embodiments, cannot reasonably be performed by humans alone, without the computer technology upon which they are implemented. Further, the implementation of the various embodiments of the present disclosure via computer technology enables many of the advantages described herein, including more efficient interaction with, various types of data.

According to an embodiment, a method is disclosed comprising: at a financial platform system constructed to programmatically access financial data: creating an application proxy instance that simulates an application of an external financial service system; receiving a normalized account request for financial data of the external financial service system for a specified account, the normalized account request being provided by an external financial application system by using a financial data API of the financial platform system; responsive to the normalized account request: negotiating communication with the external financial service system by using the application proxy instance to access the requested financial data from the external financial service system by using a proprietary Application Programming Interface (API) of the external financial service system; and providing the financial data to the external financial application system as a response to the normalized account request.

According to an aspect, the method further comprises setting up a session through the proxy instance.

According to another aspect, the normalized account request is a request in accordance with the financial data API of the financial platform system, and the financial data API is constructed to provide a normalized interface for accessing financial data from external financial service systems having different proprietary APIs.

According to yet another aspect, negotiating communication comprises: forming a request in accordance with the proprietary API based on information specified by the normalized account request.

According to another aspect, the financial platform system includes an institution interface module for the external financial service system, the institution interface module models the proprietary API of the external financial service system, and the institution interface module is used to access the requested financial data from the external financial service system.

According to yet another aspect, the financial platform system generates the institution interface module by at least one of: parsing source code of the application of the external financial service system; and parsing communication between the application and the external financial service system.

According to another aspect, the institution interface module defines headers of messages sent to the external financial service system.

According to yet another aspect, the specified account is an account of the external financial service system.

According to another aspect, the specified account is a user account of the financial application system, and the financial data accessed from the external financial service system is financial data corresponding to at least one account of the external financial service system that is associated with user credentials of the application proxy instance.

According to yet another aspect, the specified account is a user account of the financial application system, wherein a plurality of application proxy instances corresponding to the specified user account are used to access financial data from a plurality of external financial service systems, and wherein financial data provided to the application system corresponds to accounts of the external financial service systems that are associated with user credentials of the application proxy instances.

According to another embodiment, a method is disclosed comprising: at a multi-tenant financial platform system constructed to programmatically access at least one financial service system external to the financial platform system, and responsive to a normalized financial service request provided by an external application system associated with an account of the financial platform system: for each external financial service system corresponding to the normalized financial service request, using an application proxy instance associated with the account of the financial platform system to provide a proprietary Application Programming Interface (API) request to the financial service system in accordance with a proprietary API of the financial service system; and providing a normalized financial service response to the external application system based on at least one proprietary API response received from an external financial service system, wherein using an application proxy instance comprises using an application proxy instance that is constructed to provide a proprietary API request to the respective external financial service system on behalf of a user account of the external application system by simulating an application of the external financial service system.

According to an aspect, the financial platform system includes an institution interface module for each external financial service system, wherein each institution interface module models the proprietary API of the associated external financial service system, wherein each proprietary API request is provided to the corresponding financial service system by using the institution interface module for the financial service system, and an application proxy instance corresponding to the financial service system and the user account, and wherein the financial platform system generates each institution interface module by at least one of: parsing source code of the application of the corresponding financial service system; and parsing communication between the application and the corresponding financial service system.

According to another aspect, a primary application proxy instance and at least one secondary application proxy instance are associated with a financial service system corresponding to the normalized financial service request, and wherein responsive to a determination that the normalized financial service request cannot be processed by using the primary application proxy instance, the secondary application proxy instance is used to process the normalized financial service request.

According to yet another aspect, the primary application proxy instance corresponds to a mobile application of a respective financial service system and the secondary application proxy instance corresponds to at least one of a web-based application and a desktop application of the respective financial service system.

According to another aspect, proprietary API requests of a proprietary API of a financial service system include at least one of: a request for a list of transactions for at least one account of the financial service system; a request for details of a transaction associated with an account of the financial service system; a financial transfer request, a payment scheduling request; an electronic check deposit request; an account update request; a fraud reporting request; and a services request, and wherein normalized API requests of an API of the financial platform system include at least one of: a request for a list of transactions for a user account of an external application system; a request for details of a transaction associated with the user account; a financial transfer request; a payment scheduling request; an electronic check deposit request; an account update request; a fraud reporting request; and a services request.

According to yet another aspect, the normalized financial service request is a request for a list of transactions for the user account, wherein financial service systems corresponding to the normalized financial service request include financial service systems corresponding to application proxy instances for the user account of the external application system, and wherein each proprietary API request is a request for financial data of accounts corresponding to user credentials of the associated application proxy instance used to provide the proprietary API request.

According to another aspect, providing the normalized financial service response comprises transforming the received financial data into a normalized form, and wherein transforming the received financial data comprises at least one of processing the financial data, cleaning the financial data, supplementing the financial data with additional information, and enhancing the financial data, and wherein additional information includes at least one of categorical labels, tags, and geo location information.

According to yet another aspect, the normalized financial service request is a request for details of a transaction associated with the user account, wherein the normalized financial service request specifies information identifying the transaction, the associated financial service system, and the associated account of the financial service system, and wherein the proprietary API request is a request for details of the transaction of the specified account of the specified financial service system.

According to another aspect, the normalized financial service request is a financial transfer request, wherein the normalized financial service request specifies information identifying a source financial service system, a source account of the source financial service system, a destination financial service system, a destination account of the destination financial service system, and a transaction amount, and wherein at least one of an application proxy instance of the source financial service system and an application proxy instance of the destination financial service system is used to initiate the financial transfer request to transfer the specified transaction amount from the source account to the destination account by providing a proprietary transfer API request to the respective financial service system.

According to yet another aspect, the financial platform system selects one of the application proxy instance of the source financial service system and the application proxy instance of the destination financial service system for initiation of the financial transfer request based on at least one of capabilities and transaction fees of the source financial service system and the destination financial service system.

According to yet another embodiment, a method is disclosed comprising a financial platform system receiving a normalized financial API request associated with at least one financial account endpoint, the normalized financial API request being provided by an external financial application system by using a financial platform API of the financial platform system, the normalized financial API request specifying account credentials of each financial account endpoint of the normalized financial API request; responsive to the normalized financial API request: collecting transaction information of each financial account endpoint of the normalized financial API request by using an application proxy instance associated with the financial account endpoint to collect the transaction information from a corresponding financial institution system by using the associated account credentials specified by the normalized financial API request and a proprietary Application Programming Interface (API) of the financial institution system; and providing a normalized financial API response to the external financial application system, the normalized financial API response providing the transaction information of each financial account endpoint of the normalized financial API request, wherein each application proxy instance is constructed to simulate an application of the corresponding external financial institution system.

According to an aspect, the collected transaction information for each financial account endpoint includes at least an account number and a corresponding routing number for use in automated clearing house (ACH) transactions.

According to another aspect, the transaction information is collected by processing at least one financial statement accessed from the corresponding external financial institution system.

According to yet another aspect, the financial platform system includes an institution interface module for each external financial institution system, each institution interface module models the proprietary API of the external financial institution system, and each application proxy instance uses a corresponding institution interface module to collect the transaction information from the external financial institution system.

According to another aspect, the financial platform system generates each institution interface module by at least one of: parsing source code of the application of the associated external financial institution system; and parsing communication between the application and the associated external financial institution system.

According to yet another aspect, each institution interface module defines headers of messages sent to the associated external financial institution system, and wherein the proprietary API is different from a web browser interface.

According to another embodiment, a method is disclosed comprising: at a financial platform system: receiving a normalized financial API request associated with at least one financial account endpoint, the normalized financial API request being provided by an external financial application system by using a financial platform API of the financial platform system, the normalized financial API request specifying a financial transaction and at least one of an account token and account credentials of each financial account endpoint of the normalized financial API request; responsive to the normalized financial API request: collecting transaction information of each financial account endpoint of the normalized financial API request by using an application proxy instance associated with the financial account endpoint to collect the transaction information from a corresponding financial institution system by using at least one of an associated account token and associated account credentials specified by the normalized financial API request and by using a proprietary API of the financial institution system; executing the transaction specified by the normalized financial API request by using the collected transaction information; and providing a normalized financial API response to the external system, the normalized financial API response providing at least one of a status of the transaction and results of the transaction, wherein each application proxy instance is constructed to simulate an application of the corresponding external financial institution system.

According to yet another embodiment, a method is disclosed comprising a financial platform system constructed to programmatically access at least one external financial institution system external to the financial platform system, and responsive to a normalized financial API request provided by a financial application system by using a financial platform API of the financial platform system, the normalized financial API request specifying user information corresponding to at least one financial account endpoint of the at least one external financial institution system: using at least one application proxy instance associated with the normalized API request to collect transaction information from a corresponding financial institution system by providing the financial institution system with a proprietary financial API request that specifies at least account credentials associated with the user information specified by the normalized financial API request, the transaction information being included in at least one proprietary financial API response provided by the financial institution system; generating a normalized financial API response based on the collected transaction information; and providing the normalized financial API response to the financial application system, wherein each application proxy instance is constructed to simulate an application of the corresponding financial institution system on behalf of a user associated with the application proxy instance.

According to an aspect, each proprietary API is a private API of the respective financial institution system, and wherein each proprietary API is different from a web browser interface.

According to another aspect, the normalized financial API request is provided on behalf of a user account of the financial application system, and wherein the specified user information includes information associated with the user account.

According to yet another aspect, the normalized financial API request is provided on behalf of a user account of the financial application system, and wherein the specified user information includes information associated with a user that is different from a user of the user account of the financial application system.

According to another aspect, the normalized financial API request is a request for financial account endpoint information, wherein the collected transaction information includes financial account endpoint information, and wherein generating the normalized financial API response comprises including the financial account endpoint information in the normalized financial API response.

According to yet another aspect, the normalized financial API request is a request to transfer funds from at least one withdrawal account endpoint to at least one deposit account endpoint and the normalized financial API request specifies an amount of funds to be transferred, wherein the user information indicates the at least one withdrawal account endpoint and the at least one deposit account endpoint, wherein a transaction engine of the financial platform system is used to execute an ACH transaction to transfer the specified amount of funds from the at least one withdrawal account endpoint to the at least one deposit account endpoint by using the collected transaction information, and wherein generating the normalized financial API response comprises including at least one of a status of the transfer and results of the transfer in the normalized financial API response.

According to another aspect, the normalized financial API request specifies an originating financial institution system for executing the transfer.

According to yet another aspect, the financial platform system is a multi-tenant financial platform system, wherein the application system is an external application system associated with an account of the financial platform system, wherein each application proxy instance is associated with the account of the financial platform system, and wherein each application proxy instance is constructed to provide a proprietary financial API request to the respective external financial institution system on behalf of a user of the external application system by simulating an application of the external financial institution system.

According to another aspect, the financial platform system is a single-tenant financial platform system, wherein the application system is an application system of the financial platform system, and wherein each application proxy instance is constructed to provide a proprietary financial API request to the respective external financial institution system on behalf of a user of the application system by simulating an application of the external financial institution system.

According to yet another aspect, the user information includes a user account identifier for at least one user account of the application system corresponding to the normalized financial API request, each user account identifier is used to select at least one of the at least one application proxy instance, and each at least one application proxy instance includes user credentials to access the associated financial institution system, and wherein each proprietary financial API request specifies the corresponding user credentials.

According to another aspect, the user information includes at least one set of user credentials for at least one user account of the application system corresponding to the normalized financial API request, and wherein at least one proprietary financial API request specifies a corresponding set of user credentials of the user information.

According to yet another aspect, the user information includes at least one account token for at least one user account of the application system corresponding to the normalized financial API request, and wherein at least one proprietary financial API request specifies user credentials associated with a corresponding account token of the user information.

According to another aspect, the method further comprises at least one of: selecting at least one of the at least one withdrawal account endpoint for the transfer based on at least one of capabilities of at least one withdrawal account endpoints, availability of at least one withdrawal account endpoint, configuration for at least one withdrawal account endpoints, and parameters of the normalized financial API request, and selecting at least one of the at least one deposit account endpoint for the transfer based on at least one of capabilities of at least one deposit account endpoint, availability of at least one deposit account endpoint, configuration for at least one deposit account endpoint, and parameters of the normalized financial API request.

According to another embodiment, a computer system is disclosed comprising: one or more computer readable storage devices configured to store a plurality of computer executable instructions; and one or more hardware computer processors in communication with the one or more computer readable storage devices and configured to execute the plurality of computer executable instructions in order to cause the computer system to: execute an Application Programming Interface (API) of the computer system, the API of the computer system configured to receive and provide responses to requests from a developer computing device according to a normalized format of the API of the computer system; receive, via the API and according to the normalized format, a request from the developer computing device for transaction data associated with a user, the request including at least: a username associated with the user, a password associated with the user, and an external institution identifier; determine, based on the external institution identifier, an external institution associated with the request; in response to the request: access an institution interface module of the computer system, wherein: the institution interface module is uniquely configured to enable communication with an external computing device of the external institution via a non-public API of the external computing device of the external institution, and the institution interface module is generated based on an analysis of interactions between an actual instance of a mobile device application associated with the external institution and the external computing device of the external institution; and instantiate a virtualized instance of the mobile device application associated with the external institution, wherein: the virtualized instance of the mobile device application is configured to communicate with the institution interface module of the computer system so as to interface with the external computing device of the external institution via the non-public API of the external computing device of the external institution, the non-public API of the external computing device of the external institution is configured to interact with the mobile device application, and the virtualized instance of the mobile device application is generated based on an analysis of the mobile device application; authenticate, via the institution interface module, the virtualized instance of the mobile device application with the external computing device of the external institution based on at least one of: an mobile device identifier code, an mobile device authentication token, or a mobile device Media Access Control (MAC) address; request, by the virtualized instance of the mobile device application and via the non-public API of the external computing device of the external institution, the transaction data associated with the user from the external computing device of the external institution by: providing the username associated with the user and the password associated with the user to the external computing device of the external institution; receiving a request for second factor authentication information from the external computing device of the external institution; requesting, via the API of the computer system, the second factor authentication information from the developer computing device; receiving, via the API of the computer system, the second factor authentication information from the developer computing device; providing the second factor authentication information to the external computing device of the external institution; receiving, from the external computing device of the external institution, a response indicating acceptance of the second factor authentication information; requesting the transaction information from the external computing device of the external institution; and receiving the transaction data associated with the user from the external computing device of the external institution; enhance the transaction data associated with the user to generate enhanced transaction data by: augmenting, based on an analysis of the transaction data, a plurality of transaction data items of the transaction data with respective category labels; augmenting, based on a further analysis of the transaction data, the plurality of transaction data items of the transaction data with respective geolocation information; and standardizing a format of the transaction data such that the enhanced transaction data may be provided by the computer system in the normalized format; provide, via the API of the computer system and in the normalized format, the enhanced transaction data to the developer computing device; and persist, in the one or more computer readable storage devices of the computer system, the virtualized instance of the mobile device application such that future requests for transaction data associated with the user may be obtained via the virtualized instance of the mobile device application.

According to an aspect, the one or more hardware computer processors are configured to execute the plurality of computer executable instructions in order to further cause the computer system to: further in response to the request: determine a second external institution from which second transaction data associated with the user is to be obtained to fulfill the request; access a second institution interface module of the computer system, wherein: the second institution interface module is uniquely configured to enable communication with an external computing device of the second external institution via a non-public API of the external computing device of the second external institution, the non-public API of the external computing device of the second external institution is different from the non-public API of the external computing device of the external institution, and the second institution interface module is generated based on an analysis of interactions between an actual instance of a second mobile device application associated with the second external institution and the external computing device of the second external institution; and instantiate a virtualized instance of the second mobile device application associated with the second external institution, wherein: the virtualized instance of the second mobile device application is configured to communicate with the second institution interface module of the computer system so as to interface with the external computing device of the second external institution via the non-public API of the external computing device of the second external institution, the non-public API of the external computing device of the second external institution is configured to interact with the second mobile device application, and the virtualized instance of the second mobile device application is generated based on an analysis the second mobile device application; authenticate, via the second institution interface module, the virtualized instance of the second mobile device application with the external computing device of the second external institution based on at least one of: an identifier code associated with a mobile device, an authentication token associated with a mobile device, or a Media Access Control (MAC) address associated with a mobile device; request, by the virtualized instance of the second mobile device application and via the non-public API of the external computing device of the second external institution, the second transaction data associated with the user from the external computing device of the second external institution by: providing the username associated with the user and the password associated with the user to the external computing device of the second external institution; requesting the second transaction information from the external computing device of the second external institution; and receiving the second transaction data associated with the user from the external computing device of the second external institution; enhance the second transaction data associated with the user to generate second enhanced transaction data by: augmenting, based on an analysis of the second transaction data, a plurality of transaction data items of the second transaction data with respective category labels; augmenting, based on a further analysis of the second transaction data, the plurality of transaction data items of the second transaction data with respective geolocation information; and standardizing a format of the second transaction data such that the second enhanced transaction data may be provided by the computer system in the normalized format; combine the enhanced transaction data and the second enhanced transaction data to generate combined enhanced transaction data; provide, via the API of the computer system and in the normalized format, the combined enhanced transaction data to the developer computing device; and persist, in the one or more computer readable storage devices of the computer system, the virtualized instance of the second mobile device application such that future requests for transaction data associated with the user may be obtained via the virtualized instance of the second mobile device application.

According to another aspect, the institution interface module is further generated based on at least one of: parsing source code of the mobile device application or parsing communication between the mobile device application and the external computing device of the external institution.

According to yet another aspect, the institution interface module defines headers of messages sent to the external computing device of the external institution.

According to another aspect, the one or more hardware computer processors are configured to execute the plurality of computer executable instructions in order to further cause the computer system to: receive, via the API and according to the normalized format, a request from the developer computing device for at least one of: a list of transactions associated with an account of the user at the external institution, details of a transaction associated with an account of the user at the external institution, a financial transfer from or to and account of the user at the external institution, payment scheduling at the external institution, an electronic check deposit to an account of the user at the external institution, an update of an account of the user at the external institution, a fraud report at the external institution, or a service request at the external institution.

According to yet another aspect, in response to receiving, from the developer computing device, a request for financial transfer from or to and account of the user at the external institution, the one or more hardware computer processors are configured to execute the plurality of computer executable instructions in order to further cause the computer system to: request, by the virtualized instance of the mobile device application and via the non-public API of the external computing device of the external institution, a transfer from or two, based on the request for financial transfer, the account of the user at the external financial institution.

According to yet another embodiment, a computer-implemented method is disclosed comprising: by one or more hardware computer processors executing a plurality of computer executable instructions: executing an Application Programming Interface (API) of the computer system, the API of the computer system configured to receive and provide responses to requests from a developer computing device according to a normalized format of the API of the computer system; receiving, via the API and according to the normalized format, a request from the developer computing device for transaction data associated with a user, the request including at least: a username associated with the user, a password associated with the user, and an external institution identifier; determining, based on the external institution identifier, an external institution associated with the request; in response to the request: accessing an institution interface module of the computer system, wherein: the institution interface module is uniquely configured to enable communication with an external computing device of the external institution via a non-public API of the external computing device of the external institution, and the institution interface module is generated based on an analysis of interactions between an actual instance of a mobile device application associated with the external institution and the external computing device of the external institution; and instantiating a virtualized instance of the mobile device application associated with the external institution, wherein: the virtualized instance of the mobile device application is configured to communicate with the institution interface module of the computer system so as to interface with the external computing device of the external institution via the non-public API of the external computing device of the external institution, the non-public API of the external computing device of the external institution is configured to interact with the mobile device application, and the virtualized instance of the mobile device application is generated based on an analysis of the mobile device application; authenticating, via the institution interface module, the virtualized instance of the mobile device application with the external computing device of the external institution based on at least one of: an mobile device identifier code, an mobile device authentication token, or a mobile device Media Access Control (MAC) address; requesting, by the virtualized instance of the mobile device application and via the non-public API of the external computing device of the external institution, the transaction data associated with the user from the external computing device of the external institution by: providing the username associated with the user and the password associated with the user to the external computing device of the external institution; in response to receiving a request for second factor authentication information from the external computing device of the external institution: providing the second factor authentication information to the external computing device of the external institution; and receiving, from the external computing device of the external institution, a response indicating acceptance of the second factor authentication information; requesting the transaction information from the external computing device of the external institution; and receiving the transaction data associated with the user from the external computing device of the external institution; enhancing the transaction data associated with the user to generate enhanced transaction data by: augmenting, based on an analysis of the transaction data, a plurality of transaction data items of the transaction data with respective category labels; augmenting, based on a further analysis of the transaction data, the plurality of transaction data items of the transaction data with respective geolocation information; and standardizing a format of the transaction data such that the enhanced transaction data may be provided by the computer system in the normalized format; providing, via the API of the computer system and in the normalized format, the enhanced transaction data to the developer computing device; and persisting, in the one or more computer readable storage devices of the computer system, the virtualized instance of the mobile device application such that future requests for transaction data associated with the user may be obtained via the virtualized instance of the mobile device application.

According to an aspect, the computer-implemented method further comprises: by one or more hardware computer processors executing a plurality of computer executable instructions: further in response to the request: determining a second external institution from which second transaction data associated with the user is to be obtained to fulfill the request; accessing a second institution interface module of the computer system, wherein: the second institution interface module is uniquely configured to enable communication with an external computing device of the second external institution via a non-public API of the external computing device of the second external institution, the non-public API of the external computing device of the second external institution is different from the non-public API of the external computing device of the external institution, and the second institution interface module is generated based on an analysis of interactions between an actual instance of a second mobile device application associated with the second external institution and the external computing device of the second external institution; and instantiating a virtualized instance of the second mobile device application associated with the second external institution, wherein: the virtualized instance of the second mobile device application is configured to communicate with the second institution interface module of the computer system so as to interface with the external computing device of the second external institution via the non-public API of the external computing device of the second external institution, the non-public API of the external computing device of the second external institution is configured to interact with the second mobile device application, and the virtualized instance of the second mobile device application is generated based on an analysis the second mobile device application; authenticating, via the second institution interface module, the virtualized instance of the second mobile device application with the external computing device of the second external institution based on at least one of: an identifier code associated with a mobile device, an authentication token associated with a mobile device, or a Media Access Control (MAC) address associated with a mobile device; requesting, by the virtualized instance of the second mobile device application and via the non-public API of the external computing device of the second external institution, the second transaction data associated with the user from the external computing device of the second external institution by: providing the username associated with the user and the password associated with the user to the external computing device of the second external institution; requesting the second transaction information from the external computing device of the second external institution; and receiving the second transaction data associated with the user from the external computing device of the second external institution; enhancing the second transaction data associated with the user to generate second enhanced transaction data by: augmenting, based on an analysis of the second transaction data, a plurality of transaction data items of the second transaction data with respective category labels; augmenting, based on a further analysis of the second transaction data, the plurality of transaction data items of the second transaction data with respective geolocation information; and standardizing a format of the second transaction data such that the second enhanced transaction data may be provided by the computer system in the normalized format; combining the enhanced transaction data and the second enhanced transaction data to generate combined enhanced transaction data; providing, via the API of the computer system and in the normalized format, the combined enhanced transaction data to the developer computing device; and persisting, in the one or more computer readable storage devices of the computer system, the virtualized instance of the second mobile device application such that future requests for transaction data associated with the user may be obtained via the virtualized instance of the second mobile device application.

According to another aspect, the institution interface module is further generated based on at least one of: parsing source code of the mobile device application or parsing communication between the mobile device application and the external computing device of the external institution.

According to yet another aspect, the institution interface module defines headers of messages sent to the external computing device of the external institution.

According to another aspect, the computer-implemented method further comprises: by one or more hardware computer processors executing a plurality of computer executable instructions: receiving, via the API and according to the normalized format, a request from the developer computing device for at least one of: a list of transactions associated with an account of the user at the external institution, details of a transaction associated with an account of the user at the external institution, a financial transfer from or to and account of the user at the external institution, payment scheduling at the external institution, an electronic check deposit to an account of the user at the external institution, an update of an account of the user at the external institution, a fraud report at the external institution, or a service request at the external institution.

According to yet another aspect, the computer-implemented method further comprises: by one or more hardware computer processors executing a plurality of computer executable instructions: in response to receiving, from the developer computing device, a request for financial transfer from or to and account of the user at the external institution: requesting, by the virtualized instance of the mobile device application and via the non-public API of the external computing device of the external institution, a transfer from or two, based on the request for financial transfer, the account of the user at the external financial institution.

According to another embodiment, a non-transitory computer-readable medium storing software instructions is disclosed that, in response to execution by one or more hardware computer processors, configure the one or more hardware computer processors to perform operations comprising: executing an Application Programming Interface (API) of the computer system, the API of the computer system configured to receive and provide responses to requests from a developer computing device according to a normalized format of the API of the computer system; receiving, via the API and according to the normalized format, a request from the developer computing device for transaction data associated with a user, the request including at least: a username associated with the user, a password associated with the user, and an external institution identifier; determining, based on the external institution identifier, an external institution associated with the request; in response to the request: accessing an institution interface module of the computer system, wherein: the institution interface module is uniquely configured to enable communication with an external computing device of the external institution via a non-public API of the external computing device of the external institution, and the institution interface module is generated based on an analysis of interactions between an actual instance of a mobile device application associated with the external institution and the external computing device of the external institution; and instantiating a virtualized instance of the mobile device application associated with the external institution, wherein: the virtualized instance of the mobile device application is configured to communicate with the institution interface module of the computer system so as to interface with the external computing device of the external institution via the non-public API of the external computing device of the external institution, the non-public API of the external computing device of the external institution is configured to interact with the mobile device application, and the virtualized instance of the mobile device application is generated based on an analysis of the mobile device application; authenticating, via the institution interface module, the virtualized instance of the mobile device application with the external computing device of the external institution based on at least one of: an mobile device identifier code, an mobile device authentication token, or a mobile device Media Access Control (MAC) address; requesting, by the virtualized instance of the mobile device application and via the non-public API of the external computing device of the external institution, the transaction data associated with the user from the external computing device of the external institution by: providing the username associated with the user and the password associated with the user to the external computing device of the external institution; in response to receiving a request for second factor authentication information from the external computing device of the external institution: providing the second factor authentication information to the external computing device of the external institution; and receiving, from the external computing device of the external institution, a response indicating acceptance of the second factor authentication information; requesting the transaction information from the external computing device of the external institution; and receiving the transaction data associated with the user from the external computing device of the external institution; enhancing the transaction data associated with the user to generate enhanced transaction data by: augmenting, based on an analysis of the transaction data, a plurality of transaction data items of the transaction data with respective category labels; augmenting, based on a further analysis of the transaction data, the plurality of transaction data items of the transaction data with respective geolocation information; and standardizing a format of the transaction data such that the enhanced transaction data may be provided by the computer system in the normalized format; providing, via the API of the computer system and in the normalized format, the enhanced transaction data to the developer computing device; and persisting, in the one or more computer readable storage devices of the computer system, the virtualized instance of the mobile device application such that future requests for transaction data associated with the user may be obtained via the virtualized instance of the mobile device application.

According to an aspect, further in response to execution by one or more hardware computer processors, the software instructions configure the one or more hardware computer processors to perform operations comprising: further in response to the request: determining a second external institution from which second transaction data associated with the user is to be obtained to fulfill the request; accessing a second institution interface module of the computer system, wherein: the second institution interface module is uniquely configured to enable communication with an external computing device of the second external institution via a non-public API of the external computing device of the second external institution, the non-public API of the external computing device of the second external institution is different from the non-public API of the external computing device of the external institution, and the second institution interface module is generated based on an analysis of interactions between an actual instance of a second mobile device application associated with the second external institution and the external computing device of the second external institution; and instantiating a virtualized instance of the second mobile device application associated with the second external institution, wherein: the virtualized instance of the second mobile device application is configured to communicate with the second institution interface module of the computer system so as to interface with the external computing device of the second external institution via the non-public API of the external computing device of the second external institution, the non-public API of the external computing device of the second external institution is configured to interact with the second mobile device application, and the virtualized instance of the second mobile device application is generated based on an analysis the second mobile device application; authenticating, via the second institution interface module, the virtualized instance of the second mobile device application with the external computing device of the second external institution based on at least one of: an identifier code associated with a mobile device, an authentication token associated with a mobile device, or a Media Access Control (MAC) address associated with a mobile device; requesting, by the virtualized instance of the second mobile device application and via the non-public API of the external computing device of the second external institution, the second transaction data associated with the user from the external computing device of the second external institution by: providing the username associated with the user and the password associated with the user to the external computing device of the second external institution; requesting the second transaction information from the external computing device of the second external institution; and receiving the second transaction data associated with the user from the external computing device of the second external institution; enhancing the second transaction data associated with the user to generate second enhanced transaction data by: augmenting, based on an analysis of the second transaction data, a plurality of transaction data items of the second transaction data with respective category labels; augmenting, based on a further analysis of the second transaction data, the plurality of transaction data items of the second transaction data with respective geolocation information; and standardizing a format of the second transaction data such that the second enhanced transaction data may be provided by the computer system in the normalized format; combining the enhanced transaction data and the second enhanced transaction data to generate combined enhanced transaction data; providing, via the API of the computer system and in the normalized format, the combined enhanced transaction data to the developer computing device; and persisting, in the one or more computer readable storage devices of the computer system, the virtualized instance of the second mobile device application such that future requests for transaction data associated with the user may be obtained via the virtualized instance of the second mobile device application.

According to yet another aspect, the institution interface module is further generated based on at least one of: parsing source code of the mobile device application or parsing communication between the mobile device application and the external computing device of the external institution.

According to another aspect, the institution interface module defines headers of messages sent to the external computing device of the external institution.

According to yet another aspect, further in response to execution by one or more hardware computer processors, the software instructions configure the one or more hardware computer processors to perform operations comprising: receiving, via the API and according to the normalized format, a request from the developer computing device for at least one of: a list of transactions associated with an account of the user at the external institution, details of a transaction associated with an account of the user at the external institution, a financial transfer from or to and account of the user at the external institution, payment scheduling at the external institution, an electronic check deposit to an account of the user at the external institution, an update of an account of the user at the external institution, a fraud report at the external institution, or a service request at the external institution.

According to another aspect, further in response to execution by one or more hardware computer processors, the software instructions configure the one or more hardware computer processors to perform operations comprising: in response to receiving, from the developer computing device, a request for financial transfer from or to and account of the user at the external institution: requesting, by the virtualized instance of the mobile device application and via the non-public API of the external computing device of the external institution, a transfer from or two, based on the request for financial transfer, the account of the user at the external financial institution.

Additional embodiments of the disclosure are described below in reference to the appended claims, which may serve as an additional summary of the disclosure.

In various embodiments, computer systems are disclosed that comprise one or more hardware computer processors in communication with one or more non-transitory computer readable storage devices, wherein the one or more hardware computer processors are configured to execute the plurality of computer executable instructions in order to cause the computer system to perform operations comprising one or more aspects of the above- and/or below-described embodiments (including one or more aspects of the appended claims).

In various embodiments, computer-implemented methods are disclosed in which, under control of one or more hardware computing devices configured with specific computer executable instructions, one or more aspects of the above- and/or below-described embodiments (including one or more aspects of the appended claims) are implemented and/or performed.

In various embodiments, computer readable storage mediums storing software instructions are disclosed, wherein, in response to execution by a computing system having one or more hardware processors, the software instructions configure the computing system to perform operations comprising one or more aspects of the above- and/or below-described embodiments (including one or more aspects of the appended claims).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIG. 2 illustrates aspects of some example proxy instances, according to an embodiment;

FIG. 4B illustrates aspects of some example proxy instances, according to an embodiment;

FIGS. 7-8 illustrate examples of API request and response flows of the system, according to an embodiment;

FIG. 15 illustrates various example evaluation parameters, according to an embodiment;

FIG. 18 illustrates an example API response with user account evaluation information, according to an embodiment.

DETAILED DESCRIPTION

Figure 1:
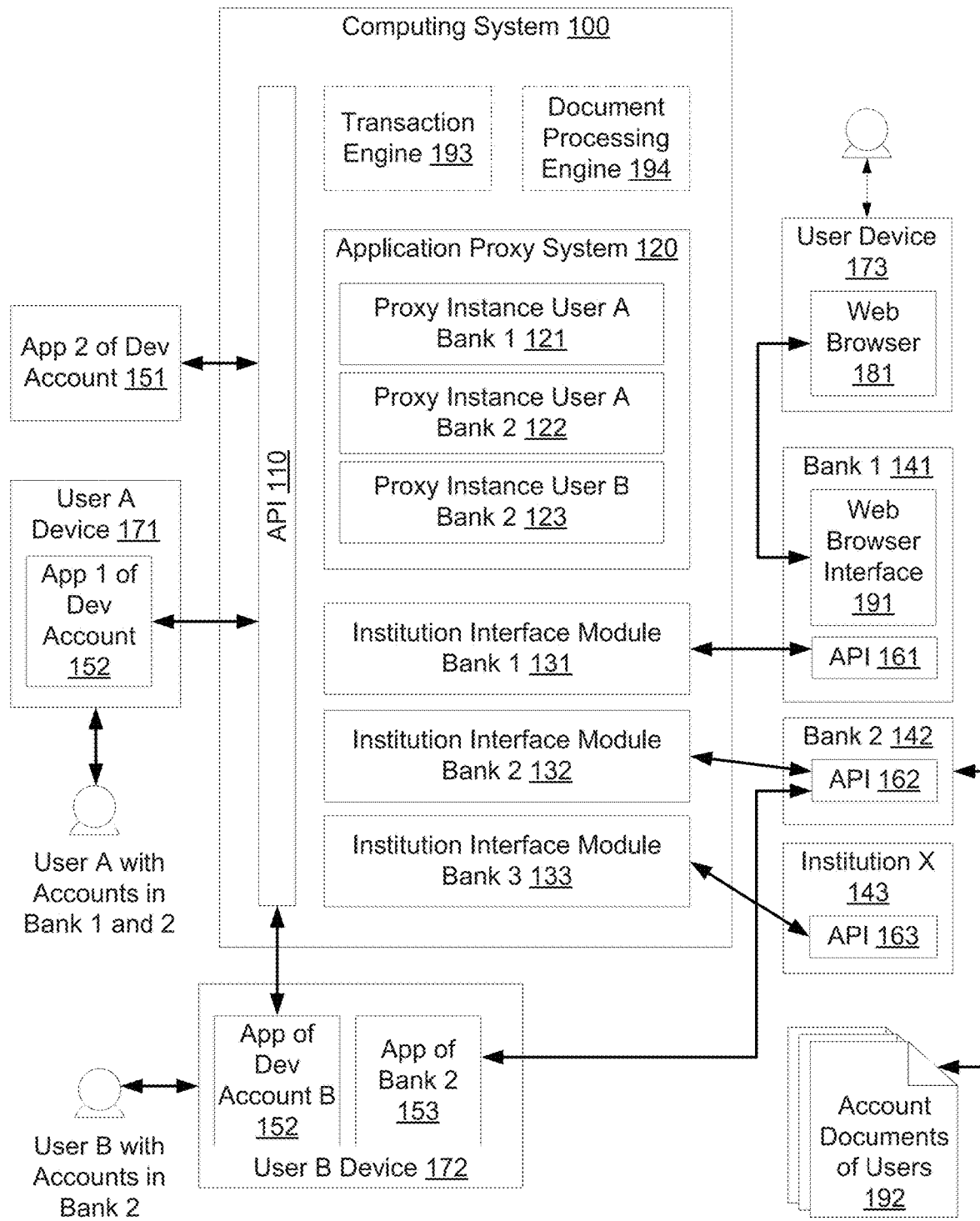
FIG. 1 is a block diagram illustrating various aspects of a computing system and network environment in which the computing system may be implemented, according to an embodiment.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

I. Overview

As mentioned above, according to various embodiments systems are disclosed for securely and efficiently obtaining user account data via instantiation of virtualized instances of first-party software applications. For example, the systems of the present disclosure include generation of proxy, or virtualized, instances of software applications that are configured to interface with external systems via non-public, or proprietary application programming interfaces (APIs). The virtualized instances of the software applications may be authenticated with the external systems as if the virtualized instances are actually first-party software applications executing on a user computing device. Via the non-public APIs user account information may be obtained and processed, such that the data may be normalized and provided to other software systems via a normalized API of the system. Accordingly, the systems of the present disclosure may be significantly more efficient at obtaining user account data from external systems than previous techniques. Further, the user account data may be normalized and provided via a normalized API, enabling others to efficiently access such data (originally obtained from multiple external systems) from a single standardized interface in a highly efficient manner.

As also mentioned above, embodiments of the present disclosure also relate to systems (e.g., a user account evaluation system) and techniques for evaluating risk associated with a user account. In some embodiments, the system obtains, via methods described above and herein, user account data associated with many user accounts. In order to increase efficiency of the system, a subset (e.g., a statistically significant subset) of the user accounts may be selected. The user account data from the subset of accounts is then processed (e.g., to determine types of the user accounts, parse transactions, categorize transactions, augment transactions, etc.) and analyzed to generate a plurality of evaluation models (each of which may be specific to a type of user account, for example). The evaluation models may be normalized. The evaluation models may include, for example, normalized evaluation parameter functions for each of a plurality of parameters, each of which indicates behaviors of the many user accounts with respect to one evaluation parameter. When a new user account is accessed by the system, user account data may be obtained for the new user account (via, e.g., methods described above and herein), and the new user account may be evaluated based on the plurality of evaluation models. Accordingly, a plurality of evaluation parameter scores may be generated for the new user account, each of which may indicate an amount of risk associated with the user account. The evaluation parameters may be combined in various ways to generate overall evaluation parameters and corresponding overall evaluation parameter scores. The evaluation parameter scores may be requested and/or provided via a normalized API, enabling others to efficiently access such evaluation parameter scores from a single standardized interface in a highly efficient manner.

As described above, evaluation parameter scores may provide objective indications to a customer, e.g., of risk associated with a given user account. By determining and providing scores related to multiple evaluation parameters for a given account, the system, in some implementations, advantageously provides multiple dimensions of evaluation to the customer that the customer may use and/or combine in various ways to determine whether, e.g., to enter into a transaction with the user/user account. In some embodiments, the customer may specify how and which evaluation parameters are provided by the system. Further, advantageously, an overall evaluation parameter score may provide an objective indication to the customer of an overall assessment, e.g., of risk associated with a given user account. In some embodiments, the customer may specify how and which evaluation parameters are combined for the overall evaluation parameter score.

As further mentioned above, some embodiments of the present disclosure may include machine learning and/or artificial intelligence methods to improve evaluation of the user accounts. For example, the evaluation parameter scores generated by the system may be automatically evaluated to determine an accuracy of the evaluation parameter scores. Results of such an evaluation may be fed back into the system to identify other evaluation parameters, adjust the evaluation parameters, adjust weightings of the evaluation parameters, and/or the like.

Yet further, according to some embodiments, an external user-facing system/application may, via the API, request and receive user account data and evaluation parameter scores, as described above and herein. Advantageously, according to some embodiments, the external user-facing system/application may request various different evaluation parameter scores, and/or may request that the evaluation parameter scores be combined in various ways. Thus, the system may be customized to the needs of each external user-facing system/application.

In various embodiments, the systems and techniques described herein may be applied in various fields including, for example, electronic financial accounts, electronic access accounts, Internet-based accounts, and/or the like. Further, various types of user accounts may be evaluated on various bases including, for example, risk (as, e.g., described below), potential (e.g., profit potential, benefit potential, potential for increase, etc.), likely maliciousness, and/or the like. For clarity purposes, the systems and techniques of the present disclosure are usually described in the context of electronic financial accounts, but the systems and techniques may similarly be applied to various other fields.

For example, in some implementations, the system of the present disclosure may be used to evaluate risk associated with electronic financial accounts. As described below, the system of the present disclosure may access and retrieve transactions associated with financial accounts of various users. These various financial accounts and transactions may provide a significant amount of user account data that may be used to generate evaluation models that may be used to assess risk of financial accounts. For example, the system may store transactions associated with many hundreds of millions of financial accounts. These transactions may be processed, categorized, and/or augmented, as described herein. Further, the financial accounts may be categorized by type (e.g., depository account, credit account, etc.). Due to the variations in transactions associated with each type of account, the system may generate different evaluation models for each account type. Due to the volume to data, the system may select a subset (e.g., a statistically significant subset) of financial accounts of each type upon which to generate the evaluation models, thus increasing the efficiency of generating the evaluation models.

Continuing with the example, a customer (e.g., a developer, merchant, etc.) via their external user-facing system/application (e.g., a web app, web store, mobile app, etc.), when considering entering into a financial transaction with a user, may desire to determine some measure of risk associated with the potential transactions. For example, a merchant may have previously experienced charge backs and/or insufficient funds issues when entering into transactions with users, and may want to avoid such transactions in the future. In another example, the customer may be considering lending funds to a user, and may desire to asses a risk of not getting paid back. Accordingly, the customer may, via the API, request an indication of risk associated with the financial account of the user. The system may then access transactions associated with the financial account of the user, and assess the financial account for one or more evaluation parameters based on the previously generated evaluation models. If the evaluation models indicate that the financial account is an outlier from the norm in one or more areas, one or more evaluation parameter scores (e.g., risk scores) may indicate this. These risk scores may then be returned to the customer via the API such that the customer may then decide whether or not to enter into the transaction. As mentioned, various evaluation parameters may be combined, and an overall evaluation parameter score may be determined and returned to the customer.

Various other aspects of the disclosure are described below in detail.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

II. Definitions

In order to facilitate an understanding of the systems and methods discussed herein, a number of terms are defined below. The terms defined below, as well as other terms used herein, should be construed broadly to include the provided definitions, the ordinary and customary meaning of the terms, and/or any other implied meaning for the respective terms. Thus, the definitions below do not limit the meaning of these terms, but only provide example definitions.

User Account Evaluation System (also referred to herein as "the system"): A computing system, the functionality of which is described in detail in the present disclosure. Functions of the user account evaluation system (which are described in further detail below) include, but are not limited to: accessing and/or extracting user account data from external user account systems; initiating execution of, or executing, transactions via external user account systems; generating evaluation models based on the user account data; and/or evaluating new user accounts accessed by the system based on the generated evaluation models; among others. One or more of these functionalities may be implemented via the user account evaluation system, as described below, and may be accessible to customers via a standardized application programming interface (API). Accordingly, a customer may access any of the functionality of the user account evaluation system (including, e.g., accessing user account data, accessing evaluation parameter scores associated with user accounts, etc.), via the standardized application programming interface (API).

External User Account System: A computing system or service of an external institution. For ease of description, general references herein to external institutions (or more simply "institutions") may be understood to refer to the external user account systems of those institutions. Accordingly, external user account systems may also be referred to herein as "external institution system," "external bank systems," "bank systems," "banks," "institutions," "external services," and/or the like. As described below, external user account systems may provide non-public and/or proprietary application programming interfaces (APIs) by which user account data may be accessed by first-party software applications (e.g., mobile device software applications) of the external institutions. However, as further described below, the system of the present disclosure may enable access to user account data via such non-public and/or proprietary APIs of the external user account systems, e.g., by instantiating virtual and/or proxy instances of the first-party software applications of the external institutions. External user accounts may also be referred to herein as "user accounts."

External Institution: An entity that maintains a user account. Examples of external institutions (also referred to herein as "institutions") include, but are not limited to, banks, credit card providers, investment services, loan providers, and/or other suitable financial institutions or user account holding institutions.

Application Programming Interface (API): A set of routines, protocols, and/or tools for building a software application. Generally an API defines a standardized set of operations, inputs, outputs, and underlying types, such that functionality is accessible via the API in an efficient way. The system provides an API by which a customer may access any of the functionality of the system, as described herein. Accordingly, the system advantageously abstracts away (from a customer's perspective), much of the complexity that may be involved in the functionality of the system, and enables the customer to quickly and efficiently leverage the functionality of the system to build other systems and services.

Customer: One who makes use of the API of the system to access functionality of the system in a software application of the customer, as described herein. Customers of the system may include, but are not limited to, software developers (who may be developing, e.g., a software application such as a store, or mobile app), third-party processors (e.g., third-party payment processors), external institutions, merchants, and/or the like.

External User-Facing System/Application: A software application and/or computing system of a customer (e.g., developed by a customer) that interacts with the system via the API of the system. Examples of external user-facing systems/applications include, but are not limited to, desktop software applications, mobile device software applications, server software applications, and/or the like. In general, external user-facing systems/applications provide goods or services to a user. In some instances, for ease of description, such software applications may be referred to herein as "apps." Additionally, external user-facing systems/applications may also be referred to herein as "developer systems," "developer computing devices," and/or the like.

User: A holder of a user account at an external institution. In general, a user maintains account credentials for accessing their user account, and provides authorizations and/or de-authorizations for an external user-facing system/application of a customer (e.g., an "app" of a developer) to limitedly and securely access the user account (e.g., to initiate payments for goods or services), and/or initiate transactions with the user account. Such transaction initiations and authorizations and/or de-authorizations (among other functionality) are enabled by the system and via the API of the system, as described herein, and further in U.S. Provisional Patent Application No. 62/215,603, filed Sep. 8, 2015, and titled "LINK", and U.S. Provisional Patent Application No. 62/267,508, filed Dec. 15, 2015, and titled "SECURE PERMISSIONING OF ACCESS TO USER ACCOUNTS, INCLUDING SECURE DEAUTHORIZATION OF ACCESS TO USER ACCOUNTS", (the '603 and '508 applications) the entire disclosures of which are hereby made part of this specification as if set forth fully herein and incorporated by reference for all purposes, for all that they contain.

User Input (also referred to as "input."): A person's (e.g., a user or customer) interactions with a computing system, such as any type of input provided by a user/customer that is intended to be received and/or stored by the system, to cause an update to data that is displayed and/or stored by the system, to cause an update to the way that data is displayed and/or stored by the system, and/or the like. Non-limiting examples of such user inputs include keyboard inputs, mouse inputs, digital pen inputs, voice inputs, finger touch inputs (e.g., via touch sensitive display), gesture inputs (e.g., hand movements, finger movements, arm movements, movements of any other appendage, and/or body movements), and/or the like. Additionally, user inputs to the system may include inputs via tools and/or other objects manipulated by the user. For example, the user may move an object, such as a tool, stylus, or wand, to provide inputs. Further, user inputs may include motion, position, rotation, angle, alignment, orientation, configuration (e.g., fist, hand flat, one finger extended, etc.), and/or the like. For example, user inputs may comprise a position, orientation, and/or motion of a hand and/or a 3D mouse.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, mySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Risk: Any potential for loss or undesirable outcome. Risk may have different meaning in different contexts (e.g., different implementations/applications of the system). In general, the system of the present disclosure employs various techniques and methods to attempt to quantify risk associated with a user account (and thereby, indirectly, a user) based on user account data associated with the user account, and in comparison to a broader population of user accounts. In general, the techniques of the present disclosure depend on the assumption that deviations from the norm are correlated with higher risk (although in some implementations this may not be assumed). Thus, in the example of a financial account, when characteristics of transactions (e.g., evaluation parameters) of the financial account deviate from characteristics of transactions of a larger population of financial accounts, the financial account may be considered to be more risky than the average (or vice versa). Greater deviation from the average may correlate with greater risk. Certain evaluation parameters may be selected/determined (automatically (e.g., by a machine learning and/or artificial intelligence algorithm) and/or manually) that are more highly correlated with risk (depending on the implementation and/or context in which the system is operating) than others. For example, in the instance of evaluating a financial account for a possible financial transaction with a user, "risk" may refer to, at least in part, a customer's potential for encountering insufficient funds or a charge back of the transaction with the user, and/or various types of fraud. Thus, the financial account of the user may be evaluated based on evaluation models and evaluation parameters that may indicate such a risk to the customer (as described in the various examples below).

III. Example Systems and Methods for Programmatically Accessing User Account Data FIG. 1 illustrates certain aspects of a computing system 100 (e.g., the system) that may access user account data from one or more external user account systems. The system 100 may include an application programming interface (API) service 110, an application proxy system 120, and at least one institution interface module (e.g., modules 131, 132, and 133). The system functions to provide programmatic access to one or more external user account systems (e.g., external user account systems 141, 142, and 143) that lack exposed programmatic access. The external user account systems may comprise proprietary and external financial services (e.g., financial institution services, among others, as described above). Such institutions may have first party software applications (e.g., mobile applications) that enable users to access user account data/information from a mobile or desktop device. Such first party applications commonly use proprietary or customized application programming interfaces (API) (e.g., APIs 161, 162, and 163). These APIs are commonly not public and not exposed. For example, a developer is commonly prevented from registering an account and using an open API authentication approach to arbitrarily access the API resources of such external user account systems. Additionally, the APIs (e.g., APIs 161, 162, and 163) of the external user account systems are a non-trivial customized interface protocols that may not be shared with other institutions; e.g., each external user account system conforms to its own interface.

The system 100 functions to provide a normalized interface (e.g., API service 110) to the one or more external user account systems (e.g., external user account systems 141, 142, and 143). The system 100 enables access to a user account within an external user account system by leveraging the application proxy system 120. A virtualized "image" or digital simulation of an application instance is maintained in the application proxy system 120 and used to access the unexposed API (e.g., APIs 161, 162, and 163) of the external user account system. While the system may be applied to financial institutions, the system may additionally or alternatively be applied to providing API access to other external systems with closed or limited API access.

The API 110 of the system functions to provide a normalized customer facing interface. The API 110 may be normalized in the sense that the underlying non-public API to the external user account system (e.g., external user account systems 141, 142, and 143) that acts as the source of the user account data is abstracted away, and the API 110 to various different external user account systems is substantially standardized. In some variations, various aspects of the API 110 may be limited when interfacing with external user account systems. For example, one institution may not support a feature such as digital check deposit, while a second institution does. In this case, the API 110 may define the API such that the API feature for check deposit is prevented for the first institution. The system 100, and more specifically the API 110, may be used to provide an accessible API service to customers, e.g., outside developers. As such, the system 100 is may be a multi-tenant system that allows numerous accounts to share use of the system 100. The system 100 and more particularly the API 110 may alternatively be a single tenant system. For example, the system may be used as an internal system to a website providing an online financial management product.

The API service 110 may be a RESTful API, but may alternatively be any suitable API such as SOAP or custom protocol. The RESTful API works according to an HTTP request and response model. HTTP requests (or any suitable request communication) to the system 100 may observe the principles of a RESTful design. RESTful is understood in this document to describe a Representational State Transfer architecture as is known in the art. The RESTful HTTP requests may be stateless, thus each message communicated contains all necessary information for processing the request and generating a response. The API service 110 can include various resources which act as endpoints which act as a mechanism for specifying requested information or requesting particular actions. The resources can be expressed as URI's or resource paths. The RESTful API resources can additionally be responsive to different types of HTTP methods such as GET, PUT, POST and/or DELETE.

The API service 110 can provide an interface into a variety of information and action resources, as provided by the system 100. Information/data relating to a user account may be accessible through querying particular API resources via the API 110. For example, a list of transactions and information about each individual transaction may be accessible through different API calls of the API 110. Information can additionally relate to account summary information, account details such as address and contact information, information about other parties such as the entities involved in a transaction, and/or any suitable information. The API 110 may additionally be used to trigger or facilitate performing some action. For example, an API call may be used in transferring money, updating account information, setting up alerts, or performing any suitable action. Those skilled in the art will appreciate that such example API features that any suitable API feature possibilities and semantic architecture may be used.

In one example implementation, an API call via the API 110 can support adding a user, completing authentication, accessing transaction information, and other actions. For example, an application may POST to a "/connect" REST API resource of the API 110 to authenticate a user; if an institution includes multi-factor authentication, then a "/connect/step" resource can be submitted to complete multi-factor authentication credentials; and then performing a GET on the "/connect" resource can access transactional data related to the user/user's account. The API 110 may additionally include informational resources to access information about entities involved in transactions. For example, the API 110 may allow a particular business resource to be accessed to obtain contextual information about the business such as name, location, and classification.

The application proxy system 120 functions to manage a simulation of a first-party software application access to an institution. The application proxy system 120 operates in cooperation with one or more institution interface modules (e.g., institution interface modules 131, 132, and 133) to establish a data model and/or a data image that acts as a virtualized application instance (also referred to herein as an "application proxy instance," "proxy instance," "virtualized instance," and/or the like) (e.g., proxy instances 121, 122, and 123). From the perspective of the institution, the proxy instance (e.g., proxy instances 121, 122, and 123) appears as a first-party application (e.g., Bank 2 application 153) installed on a physical user device (e.g., user devices 171 and 172) that is being used by a user. In other words, the requests received from the proxy instance are treated like requests from a first-party mobile app, desktop app, or web-based application of the user. The application proxy system 120 may store and maintain a plurality of application proxy instances (e.g., proxy instances 121, 122, and 123). The proxy instances may include configuration settings and properties that, when used according to a defined institution interface (e.g., an institution interface of an institution interface module 131, 132, and/or 133), will appear as requests from first-party applications (e.g., application 153) of the institution (e.g., institution 141, 142, and/or 143). A different proxy instance may be created and maintained for each user account-institution pair. A given user may have multiple user accounts with different institutions. A proxy instance may include a set of properties that can be used to authenticate the proxy instance with the institution system (e.g., institution 141, 142, and/or 143). The application proxy system 120 provides a method to programmatically create a proxy instance for a user. The user may provide some account credentials that can be used in an initial registration of the proxy instance with the non-public API of the institution. The proxy instance may be characterized as a set of properties that can be stored and maintained. Some of those properties may be automatically generated, may be provided from the institution during negotiating registration, may be properties of the application that is being simulated, and/or may include any suitable identifying and authenticating information. The properties may include a unique user identifier code, an authentication token, a MAC address (e.g., a MAC address of a user device 171 or 172), or any suitable information. When a request is made to a bank on behalf of a user, the properties of the proxy instance may be invoked to gain access to the institution on behalf of the associated user.

FIG. 2 depicts example proxy instances 121, 122, and 123 of FIG. 1. As shown in FIG. 2, User A has accounts in Bank 1 and Bank 2, and User B has accounts in Bank 2. As shown in FIG. 2, each proxy instance includes account credentials and properties.

An institution interface module (e.g., one of institution interface modules 131, 132, or 133) functions to model the internal interface (e.g., interaction with one of APIs 161, 162, or 163) of at least one application (e.g., the application 153) with an external institution (e.g., one of institutions 141, 142, or 143). An institution interface module may be established for each institution with which the system 100 can interface. For example, an institution interface module may exist for each bank and/or credit card company that is available in the system. The institution interface module may include a set of rules and processes of a particular institution. The institution interface module may include a proxy sub-module that defines how the institution recognizes and/or authenticates a particular application. Some banks may depend on the MAC address of a device (e.g., a MAC address of user devices 171 and/or 172), some may depend on asymmetric cryptography tokens, and others may generate encrypted tokens. The proxy sub-module is used in establishing the proxy instance information. The institution interface module can additionally include institution protocol sub-module, which defines a mapping between provided API 110 functionality and the form and mode of communication with the external institution (e.g., institutions 141, 142, or 143). The institution protocol sub-module can define the headers, body, and other properties of messages sent to the associated institution. The protocol sub-module may additionally define how data should be processed to form that message. In some cases, the data may be encrypted in a standard or proprietary format, which the protocol sub-module can define. Additionally, the protocol sub-module can define the communication flow to fulfill a request. In some cases, multiple requests may need to be made to complete a request objective. Other aspects of interacting with an interface (e.g., APIs 161, 162, and/or 163) of an external institution (e.g., institutions 141, 142, and/or 143) may additionally be built into the institution interface module such as multi-factor authentication rules.

An institution interface module may be constructed based on use of an actual first-party application (e.g., the application 153). For example, communication of, and/or source code of, the first-party application can be parsed and analyzed to establish some or all of an institution interface module. In some implementations, source code of a first-party application (e.g., the application 153) of an external institution is parsed and analyzed to establish some or all of an institution interface module for the external institution. In some implementations, communication between an external institution and a first-party application (e.g. the application 153) of the external institution is parsed and analyzed to establish some or all of an institution interface module for the external institution.

Figure 3:
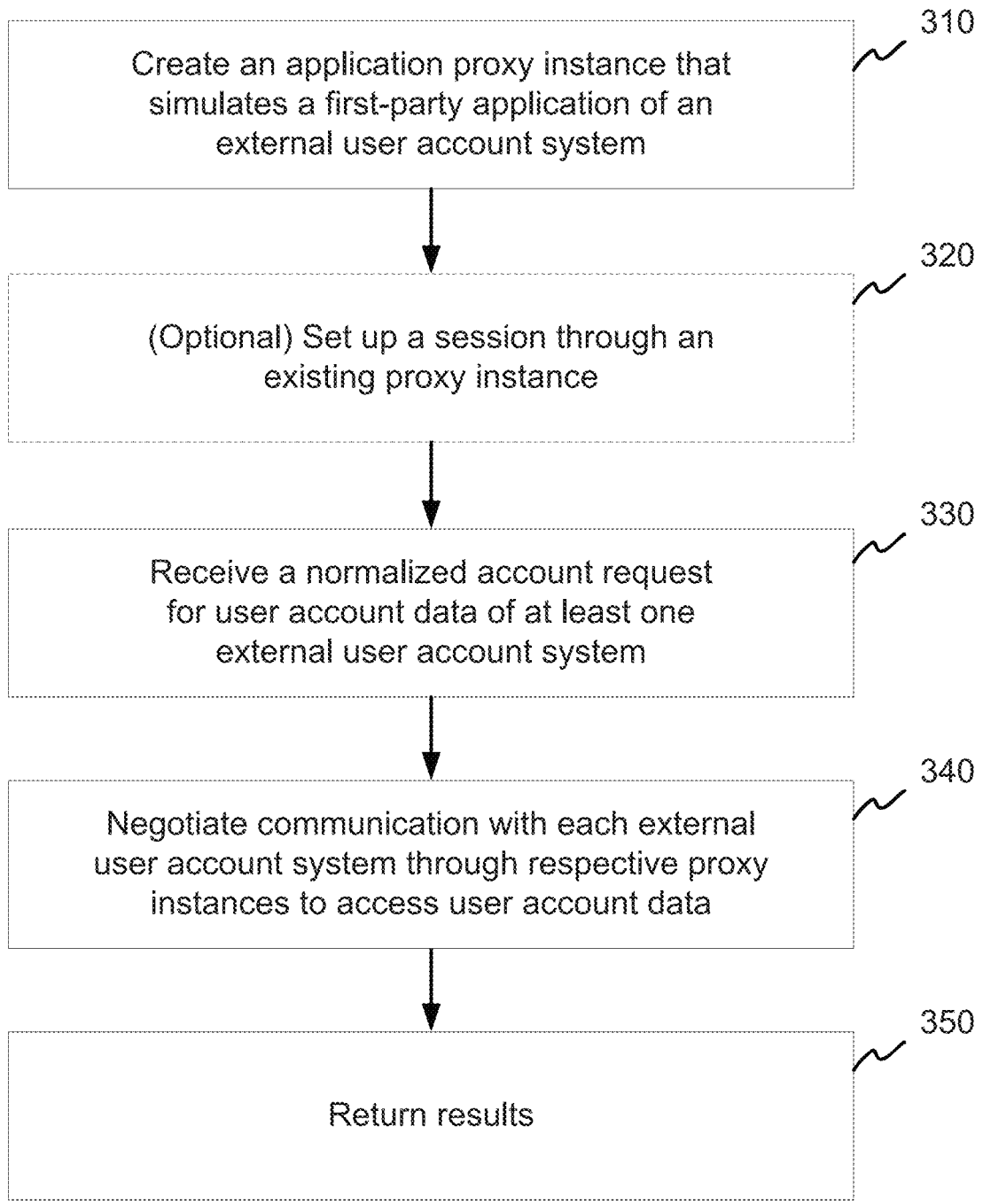
FIG. 3 is a flowchart illustrating an example method of accessing user account data, according to an embodiment.

FIG. 3 is a flowchart illustrating an example method of accessing user account data, according to an embodiment. As shown in FIG. 3, the method can include creating an application proxy instance (block 310), optionally setting up a communication session through the proxy instance (block 320), receiving a normalized account request (block 330), negotiating communication with an external interface through a proxy instance (block 340), and returning results (block 350). The method functions to provide programmatic access to one or more external services (e.g., external user account systems of external institutions) that lack exposed programmatic access. The external services may be proprietary and/or non-public. The external services can be provided by external institutions, as described above. Such institutions may have first-party applications that enable users to access user account information via a mobile or desktop application. Such first-party applications may use a proprietary or customized API (e.g., API 161, 162, and/or 163) of the external institution. Such APIs are commonly not public and not exposed. For example, a developer is commonly prevented from registering an account and using an open API authentication approach to arbitrarily access the API resources of external institutions. Additionally, such APIs are non-trivial customized interface protocols that are not shared with other institutions, e.g., each institution conforms to its own interface. The method can additionally provide a normalized interface to a plurality of external services (e.g., external institutions 141, 142, and/or 143). The method enables a programmatic interface into an account within an institution by leveraging an application proxy approach. A virtualized "image" or digital simulation of an application instance is maintained in the application proxy system 120 and used to access the unexposed API (e.g., API 161, 162, and/or 163) of the institution. While the system 100 may be applied to financial institutions, the system 100 may additionally or alternatively be applied to providing API access to any other external entities with closed or limited API access. The method may be implemented through the system 100 as described above, but may alternatively be implemented by any suitable system.

At block 310, which includes creating an application proxy instance (e.g., an application proxy instance 121, 122, and/or 123), the system 100 functions to establish a digital image of a first-party application instance (e.g., the application instance 153) for a selected institution (e.g., the Bank 2 142). Creating an application proxy instances may be initiated in response to receiving an initial request. The initial request may be initiated by a user (or entity) (e.g., User A or User B) interacting with an external user-facing system/application (e.g., application instances 151 and/or 152, executing on either of user devices 171 or 172 and/or another suitable device, and/or further executing on another system of the application instances 151, 152) of a customer (e.g., a developer). The external user-facing system/application may then send the initial request to the system 100. The user (e.g., User A and/or User B) may have a user account with the external institution (e.g., an online bank account). An application proxy instance (e.g., one of proxy instances 121, 122, and/or 123) can be created during the initial registration or at a later time, which will provide access to account information of the external institution. Once created, the application proxy instance of that user can be persisted and used at a later time for that given user-institution combination (e.g., "User A-Bank 1", "User A-Bank 2", "User B-Bank 2"). However, a new proxy instance may be created when the proxy instance becomes invalid (e.g., as a result of institution API changes, password/login changes made within the institution, and/or other changes to invalidate a proxy instance). The initial request may be received through a normalized API (e.g., API 110) as a connection request. The connection request may be accompanied by parameters that specify a selected institution (if there are multiple institution options) and user credentials for the institution. The user credentials may include a username, password, pin code, and/or any suitable credentials. The API request may additionally include authentication credentials such as a client identifier and secret token that is associated with the account in the system.

Creating a proxy instance may include negotiating registration of the proxy instance with the institution, which functions to establish the proxy instance with the selected external institution. An institution interface module (e.g., one of the modules 131, 132, or 133) may facilitate navigating the communication handshaking during the initial login. Different institutions may have different processes to register or enroll a new application (which in the method is a proxy instance) such as multi-factor authentication. During the negotiation, various elements may be extracted and stored as part of the proxy instance. Similarly, some properties may be generated based on communication with the institution. For example, a MAC address or a unique device identifier may be used in connecting to the services of the external institution. Such properties may be stored as part of the proxy instance.

As mentioned above, multifactor authentication (MFA) may be part of negotiating with an external institution. For example, an external institution may respond with indication of a MFA credential requirement. Such MFA requirements may be fulfilled by relaying the MFA challenge/task up to a user. In one implementation, the system 100 receives a message indicating that a security question should be asked to complete the negotiation. The security question is passed back to the associated application (e.g., applications 151 and/or 152, which may be operated by a customer/developer account of the system 100). Then, the associated application may present the security question in some manner to obtain the user response. The MFA can include security questions, additional pin codes (such as those supplied by a one-time password generator or a code transmitted to a secondary device), or any suitable form of MFA.

At block 330, the system receives a normalized account request via the API 110 of the system 100. As mentioned above, the syntax and mode of communicating an API request is normalized such that the format is independent of the institution. The requests can include a variety of types of requests which may include: obtaining a list of transactions; requesting details on a particular transaction; performing some financial transfer (moving money from savings to checking, setting up transfer to another account, making scheduled payments, digital deposit of a check, and/or the like), updating account information (e.g., updating contact information, changing password, manage alerts, and/or the like), requesting services (e.g., new cards, reporting fraud, and/or the like), and/or the like. A normalized account request may be mapped to an institution interface module (e.g., one of the institution interface modules 131, 132, or 133) or other suitable component that defines communication to fulfill the API request.

At block 340, which includes negotiating communication with an external interface (e.g., one of APIs 161, 162, and/or 163) through a proxy instance (e.g., one of the proxy instances 121, 122, and/or 123), the system 100 functions to execute and manage communication between the system and an external institution system (e.g., one of systems 141, 142, and/or 143) when fulfilling an account request. The proxy instance (e.g., one of the proxy instances 121, 122, and/or 123) provides a mechanism through which access may be granted. The communication is executed while an authenticated session is active. Communication sessions may be expired by the system 100 or the external institution for various reasons, such as remaining inactive for a set amount of time. A communication session may be active subsequent to enrolling a proxy instance or may require setting up a session through the proxy instance as described below.

Negotiating communication may include creating requests that conform to expected messages of the external institution. This can include setting headers, body contents, and other message properties. An institution may expect particular headers. For example, the headers may include a host or path, a data, content type, cookies, MAC address, a user identifier, authorization properties, and/or other suitable headers. Creating requests can additionally include transforming request properties into an expected form, which may include applying a set encryption pattern to a request. In one variation, transforming the request involves encrypting content according to a public key, wherein the public key may be stored as part of the proxy instance. The institutions may take varying approaches to how information is communicated. In an alternative institution, the contents of a message may be unencrypted, in which case, the contents may be submitted in a plaintext, unencrypted form. In addition to creating requests that conform to expected messages of the external institution, the method can include following a request-response pattern. That pattern can involve a single request and response, but may alternatively include a sequence of different request and responses to obtain desired information.

In some variations, information or actions may not be available through the first proxy instance and so the method may include automatically switching to a second proxy instance with supported functionality. For example, full bank statements may not be available in a mobile application, and the institution API (e.g., one of APIs 161, 162, and/or 163) may not include such functionality. Accordingly, when that functionality is required to fulfill an API request of the API 110, then a second proxy interface may be used. In some variations, an API request via the API 110 may require multiple institutions to be queried. Such an API request may be particularly useful for summarizing financial statements across multiple accounts. The method can include negotiating communication for multiple institutions and combining results into a combined form.

At block 350, which includes returning results, the system 100 functions to deliver the results as a response to the request. Returning the results includes transforming the data obtained from the external institution into a normalized form. The information is formatted into a standardized format that is substantially similar in representation between different institutions served by the system 100. Transforming the data can additionally include processing, supplementing, and/or otherwise enhancing information. Some information provided by an institution may be poorly formed. For example, store information for a particular transaction may be poorly labeled and may be represented different from other institutions. Such contextual information about external entities can be cleaned and/or supplemented with additional information. For example, an entity may be supplemented with categorical labels, tags, geolocation information, and/or other suitable information. The returned results can be represented data format such as JSON, XML, or any suitable format.

The method can additionally optionally include block 320, which includes setting up a session through a proxy instance that was previously created, and functions to facilitate accessing information after negotiating a proxy instance for an account and institution. The proxy instance may store and maintain information required for subsequent access. The external institutions may restrict access to set sessions, which may expire after some amount of time or may require reconfirming user credentials. Thus, when an API request for an account occurs after a communication session has expired, then the method may automatically set up a new session using the previous user credentials and proxy instance credentials. In some variations, MFA challenges, such as security questions, may be automatically completed.

The method can additionally include re-capturing updated credentials, which functions to update user credentials for an institution. Updated credentials may be updated when a user changes them within the institution or when the proxy instance is otherwise locked out of the account. An error may occur indicating that a communication session was not successful, and then an API request can be submitted to update a proxy instance with new credentials.

Referring again to FIG. 1, in some implementations external user account system of the external institutions may include public web browser interfaces. For example, as shown in FIG. 1, the bank 1 system 141 may include a web browser interface 191 for accessing the bank 1 system 141 via a web browser (or any suitable web client) (e.g., web browser 181 of the user device 173). As described herein and further below in reference to FIGS. 6 and 7, the system 100 provides access to the user account data via private, proprietary APIs (e.g., API 161) of external institutions, as opposed to access via a public web browser interface 191. In some implementations, the web browser interface 191 is a web server that hosts a web site for access of the external institution system via a web browser over the Internet.

Figure 4A:
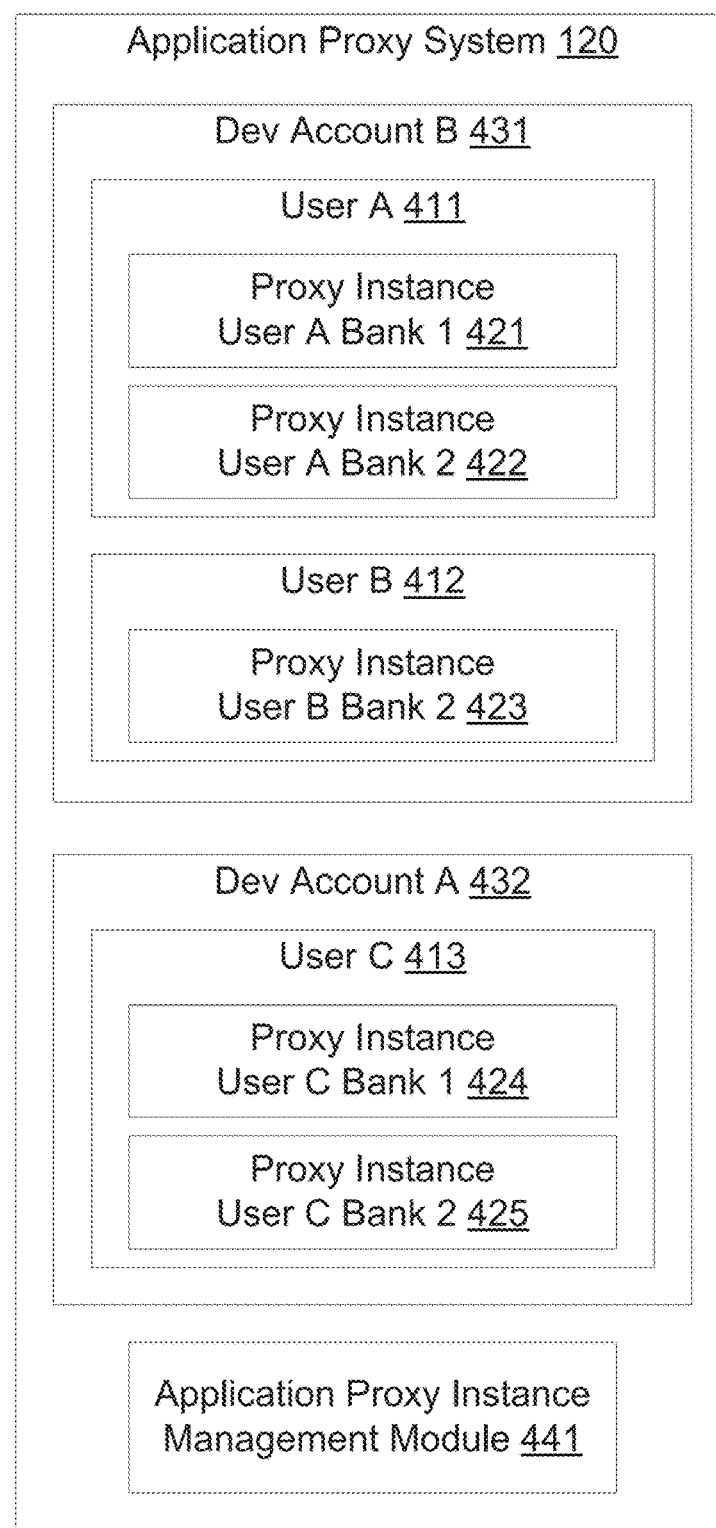
FIG. 4A illustrates aspects of an application proxy system, according to an embodiment.

FIG. 4A illustrates aspects of the application proxy system 120, according to an embodiment. As shown in FIG. 4A, the application proxy system 120 includes application proxy instances (e.g., proxy instances 421, 422, 423, 424, and 425) for user accounts (e.g., user accounts 411, 412 and 413) of developer accounts (e.g., Dev Account B 431 and Dev Account A 432) at the system 100. The application proxy system 120 includes an application proxy instance management module 441 that is constructed to generate application proxy instances, configure application proxy instances, remove application proxy instances, and/or the like.

In some implementations, each application proxy instance (e.g., proxy instances 421, 422, 423, 424, and/or 425), specifies a developer account, a user account of the developer account, an associated external user account system (e.g., an external institution), and credentials of the user account for the external institution, as shown in FIG. 4B. In some implementations, each application proxy instance specifies properties of the application proxy instance. In some implementations, properties include one or more of a unique user identifier code, an authentication token, a MAC address (e.g., a MAC address of a user device 171 and/or 172), or any suitable information.

In some implementations, the application proxy instance management module 441 creates the application proxy instance responsive to a request to create an application proxy instance. In some implementations, the request to create an application proxy instance specifies information identifying an external user account system, and a user account of an external user-facing system/application (e.g., a user account of the external user-facing system/application 152 of FIG. 1). In some implementations, the request to create an application proxy instance specifies user credentials for the external user account system. In some implementations, the request to create an application proxy instance specifies information identifying an account of the system 100 associated with the external user-facing systems/application. In some implementations, the request to create an application proxy instance specifies properties for the application proxy instance. In some implementations, properties for the application proxy instance include at least one of a unique user identifier code, an authentication token, a MAC address, user accounts of the corresponding external user account system, and/or any other suitable information.

In some implementations, the application proxy instance management module 441 stores the created application proxy instance in association with a user account (e.g., "User A" 411 of FIGS. 4A and 4B) of an external user-facing system/application (e.g., a user account of the external user-facing system/application 152 of FIG. 1). In some implementations, the application proxy instance management module 441 stores the created application proxy instance in association with an account (e.g., "Dev Account B" 431 of FIGS. 4A and 4B) of the system 100 associated with an external user-facing system/application (e.g., a user account of the external user-facing system/application 152 of FIG. 1). In some implementations, the application proxy instance management module 441 stores the created application proxy instance (e.g., "Proxy Instance User A Bank 1" 421 of FIGS. 4A and 4B) in association with an account (e.g., "Dev Account B" 431) of the system 100 associated with an external user-facing systems/application, and a user account (e.g., "User A" 411) of the external user-facing systems/application. In some implementations, the application proxy instance management module 441 stores the created application proxy instance in association with an account of the system 100 associated with an external user-facing systems/application, a user account of the external user-facing systems/application, and information identifying the external user account system (e.g., "Bank 1 141" of FIG. 4B) of the application proxy instance. In some implementations, the application proxy instance management module 441 stores the created application proxy instance in association with an account of the system 100 associated with an external user-facing systems/application, a user account of the external user-facing systems/application, information identifying the external user account system of the application proxy instance, and information identifying user accounts of the application proxy instance.

In some implementations, creating the application proxy instance includes controlling the application proxy instance management module 441 to construct the application proxy instance to simulate communication, register, negotiate registration, and/or the like, of an application (e.g., application 153 of FIG. 1) (of the external user account system of the application proxy instance) with the external user account system on behalf of the user account (e.g., "User A", "User B") of the application system.

Additional examples and details of accessing user account data via proxy instances of the system may be found in U.S. patent application Ser. No. 14/790,840, filed Jul. 2, 2015, and titled "SYSTEM AND METHOD FOR PROGRAMMATICALLY ACCESSING FINANCIAL DATA" (referred to herein as "the '840 application"). The entire disclosure of this application is hereby made part of this specification as if set forth fully herein and incorporated by reference for all purposes, for all that it contains.

As mentioned above, the system 100 may also be used, via the API 110, to access various types of user account data, including documents (such as statements). The system 100 may also be used, via the API 110, to initiate transactions (such as a transfer of funds between accounts, schedule payments, etc.). The system 100 may also be used, via the API 110, to update account information or request services. Additional examples and details of such functionality of the system is provided below, and may also be found in the '840 application.

IV. Example Systems and Methods for Programmatically Verifying Transactions

Figure 5:
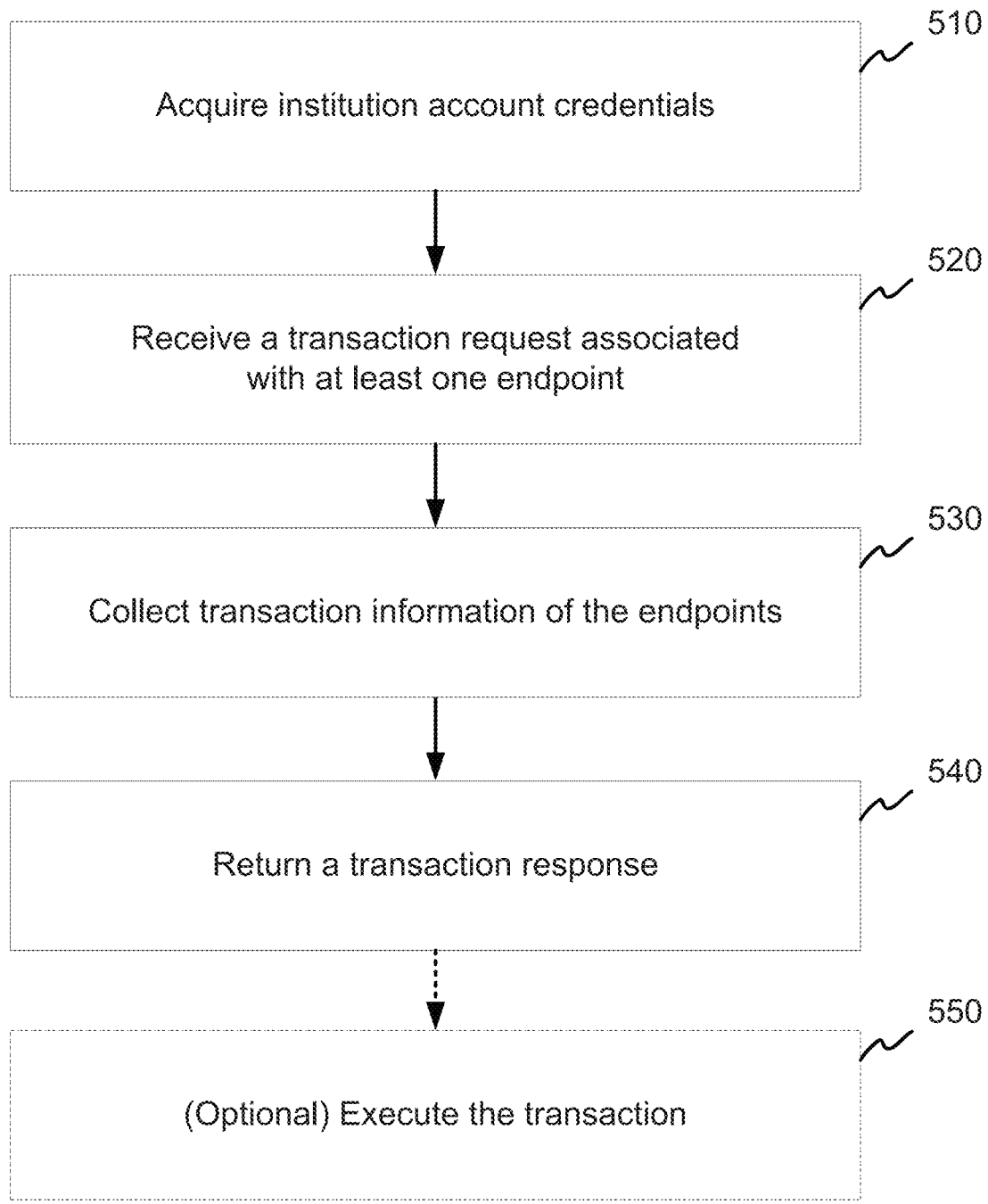
FIG. 5 is a flowchart illustrating an example method of processing transactions, according to an embodiment.

FIG. 5 is a flowchart illustrating an example method of processing transactions, according to an embodiment. As shown in FIG. 5, the method can include acquiring user account (also referred to herein as "institution account") credentials (block 510), receiving a transaction request associated with at least one endpoint (block 520), collecting transaction information of the endpoint (block 530), and returning a transaction response (block 540). In some embodiments, the method can optionally include executing the transaction (block 550), which functions to process the transaction between two endpoints. In some embodiments, the method does not perform execution of the transaction, receiving the transaction request functions to initiate the retrieval of transaction addressing information of the at least one endpoint, collecting transaction information of the endpoint includes collecting transaction addressing information of the endpoint, and returning a transaction response functions to transmit the collected transaction addressing information of the endpoint. The method functions to leverage account access during the transaction process. Variations of the method can be used to add functionality such as verifying account information used in financial transfers, programmatically transferring funds, setting programmatic events, catching errors and fraud, performing conditional processing of a transaction, and/or other suitable operations. The method may be performed by the system 100. In some implementations, the transactions are automated clearing house (ACH) transactions, but any suitable type of transaction may be used. In a first implementation, the method enables a customer/developer, via the API 110, to obtain verified ACH endpoint information. For example, an account number and a routing number may be obtained, as well as verification of ownership of the account. In this variation, the system 100 provides the information to execute the transaction. In another embodiment, the method additionally executes the transaction having obtaining the required information and verification. The method of FIG. 5 may be implemented by the system 100, but the method may alternatively be implemented by any suitable system.

Figure 6:
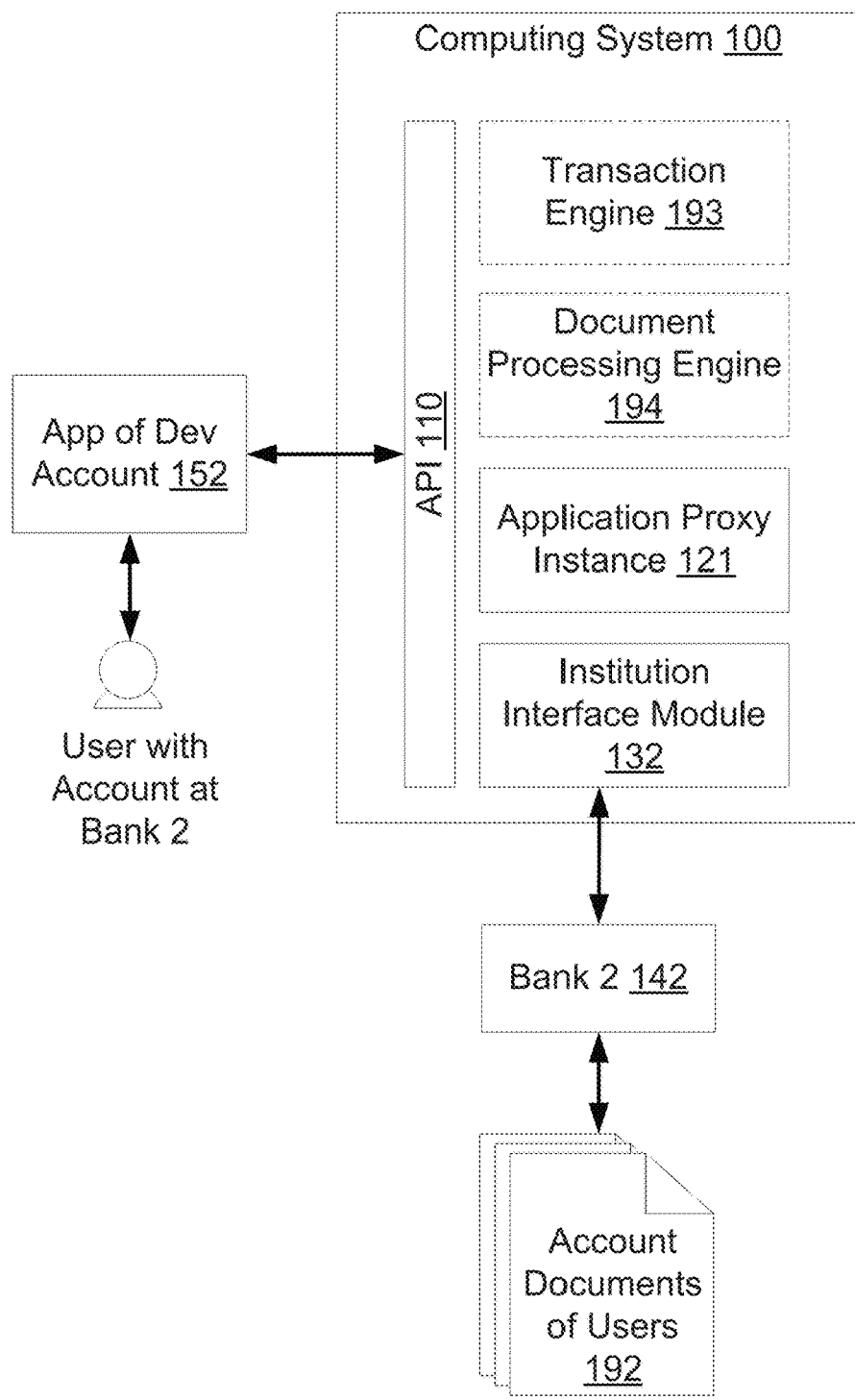
FIG. 6 is a simplified block diagram of the computing system and network environment of FIG. 1, according to an embodiment.

FIG. 6 is a simplified block diagram of the computing system and network environment of FIG. 1, according to an embodiment. The method of FIG. 5 is described below in reference to certain aspects of FIG. 6 (or, alternatively, FIG. 1)

At block 510, which includes acquiring institution account credentials, the system 100 functions to obtain login information for an institution (e.g., the institution 142). The institution account credentials may include a username and password. The account may be an account of an external institution. Additionally, an institution may include additionally authentication challenges such as a pin code, security questions, single-use passwords, secondary device code verification, biometric identification, and/or any suitable form of multi-factor authentication (MFA), as described above. Such additional authentication challenges may be collected at the same time of the account credentials, but the MFA authentication process may alternatively be defined in the API protocol. For example, if the primary account credentials are not sufficient, the MFA challenge may returned in a response, this additional credential request can be repeated as required before access to the account is obtained. The institution account credentials can additionally be stored, and automatically used to complete subsequent access or login attempts.

The account credentials may be provided through an API request of a customer/developer or application of the customer/developer to the API 110. The API 110 may be used in establishing, setting up, or enrolling a new user account. One user may have at least one associated user account at an external institution, but may be linked or associated with multiple user accounts at multiple external institutions. Account credentials may be obtained for each user account.

At block 520, which includes receiving a transaction request associated with at least one endpoint, the system 100 functions to initiate the retrieval of transaction addressing information of an endpoint. The endpoint may be a transaction endpoint, which may be any suitable endpoint from which funds may be withdrawn or deposited. In a common transaction, there is a single withdrawal account and a single deposit account. The method can be used in obtaining information for one or more endpoints. In some variations, there may be a plurality of withdrawal and/or deposit accounts. In one variation, the transaction request is identical to an enroll user request used to obtain the user credentials of block 510. The account credentials may alternatively be previously obtained or obtained in response to the transaction request.

In one variation, in which the transaction request is for information about an account, the API request may specify an institution and account credentials. Additional credentials may additionally be required such as a pin code, state in which an account was created, or MFA challenge answers. A second request with similar parameters may be submitted to obtain the account credentials for other involved transaction endpoints.

In another variation, the transaction request may explicitly define the transaction details. The transaction request may include at least one withdrawal account endpoint and deposit account endpoint. Account credentials may be specified for each endpoint. In one variation, a single API request may include account credentials for both endpoints. In another variation, a transaction resource is used, such that withdrawal endpoint information, deposit account information, and transaction details can be specified asynchronous. For example, a transaction resource is created through an API request via API 110. Later, an API request hits the new transaction resource (by specifying a transaction identifier) to specify withdrawal information, then deposit information, and then the amount to be transferred. Once all the information is populated, the transaction may be executed either automatically, in response to an executed command, or scheduled for a later time. Bulk, aggregate, or group transactions may additionally be specified in a request. If multiple entities are withdrawal endpoints, then the division of funds may be specified (e.g., a percentage breakdown or amount breakdown). Similarly, funds for multiple deposit endpoints may be specified.

At block 520, which includes collecting transaction information of the endpoint, the system 100 functions to access and determine properties of a transaction endpoint. Collecting transaction information of the endpoint may involve using the account credentials to gain account access in an institution. The account access may be facilitated by using a proxy application, as described above. The account access can be used to request and obtain account documents that include endpoint information. The account documents may include bank statements or other suitable documents. If the documents are in PDF or other alternative formats, the content may be scraped to identify transaction information.

At block 530, the system 100 collects transaction information and/or transaction addressing information of the endpoint. The account addressing information may be the account number and the routing number of an account. Billing address, wire routing number, and/or other account information can additionally be pulled. In one variation, the account number and routing number are available in banking statements. An extraction script may be used to pull the document and then isolate the information from the document. Accessing the account number and the routing number in an automated fashion may avoid chances of error. As a first benefit, access to the account provides evidence that the owner of the account participated in providing the transaction endpoint information. As another benefit, the information is automatically pulled, which avoids human error.

Collecting transaction information of the endpoint, at block 530, may additionally include collecting transaction status information of the endpoint, which can include indication of fund requirements, account fraud checks, and other status information. Various stages can be built into providing the transaction information, which provide different safeguards and/or features into financial transactions.

In a first optional stage, the transaction status information can determine a sufficient funds status. The sufficient funds status may be applied to a withdrawal account to ensure that the account has funds to complete the transaction. Transaction history and/or current fund value may be accessed through the account access. In one variation, the fund amount is returned in the response such that the customer/developer/application can respond appropriately. In another variation, the transaction amount is compared to available funds. If sufficient funds are not found, then an error or warning may be raised.

In another optional stage, the account may be processed for fraud patterns. For example, the age of the account may be accessed. Newly created accounts may be less trustworthy than established accounts with significant history. Similarly transaction history may be assessed for fraudulent behavior. If the account is used for a diverse range of transactions indicative of normal behavior then the account may be identified as normal. If the account only participates in repeated high value transactions or other fraud patterns, then the account may be flagged as fraudulent. Additionally, the entities involved in the transaction may be indicative of fraud.

The method may additionally include verifying transaction conditions during one or more stages. Transaction conditions may be used to take any suitable action. The available actions can include permitting a transaction or preventing a transaction. Additionally, the action can include sending a notification. The notification can include an email, text message, a platform message, a phone call, or any suitable notification. The action may additionally include triggering a programmatic event. In one variation the programmatic event is a callback event, wherein an HTTP message is sent to a destination. Conditions may be customized or selected from a set of provided conditions. Example conditions can include a condition that triggers a notification for transactions over a particular amount; a condition based on available funds after the transaction to alert a user to funds below a threshold; and a condition based on the frequency of transactions or the entities involved in the transaction account. Conditions can be scoped for a developer account, a particular institution account, or for any suitable scope of entities.

At block 540, the system 100 returns a transaction response so as to transmit the results of the transaction request. The transaction response is may be made in a synchronous API message from the API 110 that is sent in response to an initial request. Alternatively, a status API resource may be used such that an application/service can periodically check the status API resource to determine the processing status and/or the results. Alternatively, any suitable approach may be used to provide the results to the initial request.

In an implementation, the response provides the addressing information used for an endpoint. If there are no errors or warnings with respect to the account, then account information may be NACHA compliant as the endpoint information was accessed and obtained in a manner that validates the ownership of the account (e.g., by providing credentials and optionally multi-factor authentication responses). The transaction response can include the account number, the routing number, and/or any additional information for the endpoint that is used in executing the transaction. The transaction response may additionally include the available funds, such that the requesting entity can check for sufficient funds. The response may additionally indicate if sufficient funds are available if the transaction amount was provided, which functions to hide the available funds from the requesting entity while preventing overdraft transaction. The transaction response can additionally include other fields such as a status field, where the account may be labeled according to any categorization of the account. For example, the status may indicate that the account is normal or fraudulent.

Additionally or alternatively, the method can include optional block 550. At block 550 the system 100 executes the transaction, which functions to process the transaction between two endpoints. In this variation a request to execute a transaction between at least two endpoints is received. Additionally, returning a transaction response may include returning results of the transaction in the response. In another implementation, the method includes executing the transaction. The transaction response can include information about the status of the transaction when the transaction is submitted, being processed, and/or completed. Transactions may not be instantaneous, and as such the initial transaction response may indicate if the transaction was successfully initiated. Successfully initiated means that the transaction endpoint information was successfully retrieved, that any conditional stages (such as a sufficient funds stage, a fraud-check stage, and custom conditions) are satisfied. A subsequent response or status resource may be updated that reflects the status of the transaction. A transaction resource may be updated with a pending process, when the transaction is initiated and proceeding normally. The transaction resource can be updated with a completed status possibly indicating the time of completion. If an error or issue is encountered, the status of the transaction resource may be updated to reflect the error or issue. The method may additionally include monitoring status of transaction and triggering programmatic event according to the status.

In one variation, executing the transaction can include establishing proxy accounts in at least two institutions, and expediting transactions between the two institutions through an internal deposit to a first proxy account in a first institution and a second internal deposit from a second proxy account in the second institution. In some cases, transactions between institutions are slower than transactions made within an institution. By establishing a cross institution account network, transactions can be facilitated between two accounts in different institutions with similar speeds of internal transactions. The proxy accounts may include a funds reserve, which may be periodically balanced between proxy accounts to maintain an operational reserve of funds.

Additionally, the method may be applied to create an abstraction between a user and the underlying account. A transaction endpoint can be abstracted to a user entity, which may be associated with multiple optional transactional endpoints (e.g., different bank accounts). Accordingly, the method may include selecting an institution, which functions to dynamically select a connected account to participate in a transaction. Various conditions may be set to respond to events when receiving a transaction request, collecting information for the transaction, and/or executing a transaction. In one variation, one institution is set as a primary account and another account managed by the same entity is set as a secondary account. If the primary account is not able to complete a transaction, the method may detect an error condition and automatically fails over to the secondary account. In another variation, a set of accounts may be preconfigured to be used depending on properties of the request. In combination with the proxy transfer endpoint, the identifying information for the proxy endpoint can be used, but the underlying service automatically will use an automatically selected account to use for the funds. For example, a set of entities and/or category of entities/transactions may be set to use particular accounts. Similarly, transactions to one proxy account may be automatically split into transactions with multiple associated accounts. For example, an account holder may set a proxy account to automatically split deposits between two accounts in a 30/70 balance.

Referring now to FIG. 6, the system 100 functions to provide an interface (e.g., via the API 110) for applications and services that can facilitate the process of transferring funds. The system 100 can function to provide verified account information used in ACH transfers, to execute transfer of funds, to enable programmatic events during transfer process, to mitigate risk and errors, and/or provide alternative transaction functionality. As described above in reference to FIG. 1, the system 100 is part of a larger API platform, which provides an API to access account data and execute transactions, among other items. In some variations, the system 100 is part of a multi-tenant API platform that enables a plurality of developers to create accounts and build applications and/or services that leverage the API of the API platform. In alternative variations, the system 100 is part of a single-tenant API platform and may provide an internal API for a dedicated set of products or services. For example, a product may be built on top of the API platform that enables end users to create accounts to manage accounts with one or more institutions (e.g., banks, credit card companies, investment managers, etc.).

The API 110 functions to provide an interface for accessing institution transaction endpoint information. The API 110 can additionally provide a normalized customer facing interface. In one implementation, the API 110 leverages an application proxy instance 121, which simulates a proprietary first-party application accessing a closed API of an institution (e.g., the institution 142). The system 100 can include additional components or services that particularly facilitate the access of information relating to a transaction endpoint. For example, a service, script, or module can be configured to access statements or other suitable documents that can contain endpoint information such as account number and routing number information. The statements or information may be contained in pdf or other suitable document formats. The system 100 can include document readers that can access and extract the requested information from the statements.

In one variation, the API 110 allows an API request to specify an account, and a response output provides the information related to executing a transaction with the endpoint. In one implementation, the API 110 can include at least one API resource for interacting with the transaction endpoint. As shown in FIG. 7, an endpoint information request can include institution credentials of an account. The credentials can include username and password. The API protocol can additionally provide a mechanism for completing multi-factor authentication challenges such as security questions, or code-based multi-factor authentication. The API request may additionally include other properties such as developer account identifiers, API authentication tokens, institution type identifiers, and other suitable parameters. The response is a data object that includes at least automatically obtained information such as tracking number, routing number, and/or wire routing number. Additional response information can include funds amount (or alternatively a Boolean indicator if the funds are sufficient), an account status (e.g., is the account fraudulent, trusted, etc.), billing address of the account, name of the institution, type of account (e.g., saving, depository, etc.), and other suitable properties. Other API properties or features can include a mechanism to specify if endpoint information is requested or if the transaction should be executed.

The institution interface module 132 functions to model the internal interface of at least one first-party application with an external institution (e.g., institution 142). The account credentials of a user account (and optionally multi-factor authentication credentials) can be used for an application proxy to gain access to an institution through the institution interface module. The system 100 may additionally include a transaction engine 193, which can facilitate the transfer of funds between two accounts. The transaction engine 193 can be integrated with the API 110, such that an API request can direct the execution of a transaction. The transaction engine 193 can execute ACH transactions, but may alternatively or additionally use other financial tools to withdrawal funds and/or deposit funds. With a transaction engine, transactions can be executed between two accounts that have been configured with account credentials. The API response may include the status of the transaction, transaction errors, a status URI or any suitable response to facilitate executing a transaction as shown in FIG. 8. In one variation, proxy accounts can be used in different institutions. With sufficient reserves, transfers between institutions can be expedited by transferring funds to and from the proxy accounts, and then asynchronously updating the proxy accounts.

The system 100 can also include, in some implementations, an evaluation model generation engine 195 (which may manage generation of evaluation models, as described herein), and/or a user account evaluation engine 196 (which may manage evaluating user account based on generated evaluation models, as described herein).

The system 100 can additionally include other aspects such as a messaging/notification system, which can manage alerts and/or triggering programmatic events (e.g., call-backs), an engine for generating user interfaces and/or user interface data, and/or the like. The system 100 may additionally or alternatively include any other suitable components to implement the functionality of described in the present disclosure.

In some implementations, the system 100 includes a document processing engine 194. In some implementations, the document processing engine 194 is constructed to process account documents (e.g., account documents 192) of an external user account system (e.g., bank system 142) of an external institution. The account documents may be processed to identify and/or obtain transaction information. In some implementations, in a case where the documents are in a PDF format, the document processing engine 194 is constructed to scrape content of the PDF documents to identify the transaction information. In some implementations, the document processing engine 194 is an extraction script that is constructed to pull the document and then isolate the transaction information from the document (e.g., as described above in reference to FIG. 5). In some implementations, the system 100 accesses the document, stores the accessed document (e.g., in a memory or other storage medium of the system 100), and then controls the document processing engine to process the stored document to identify the transaction information.

Figure 9:
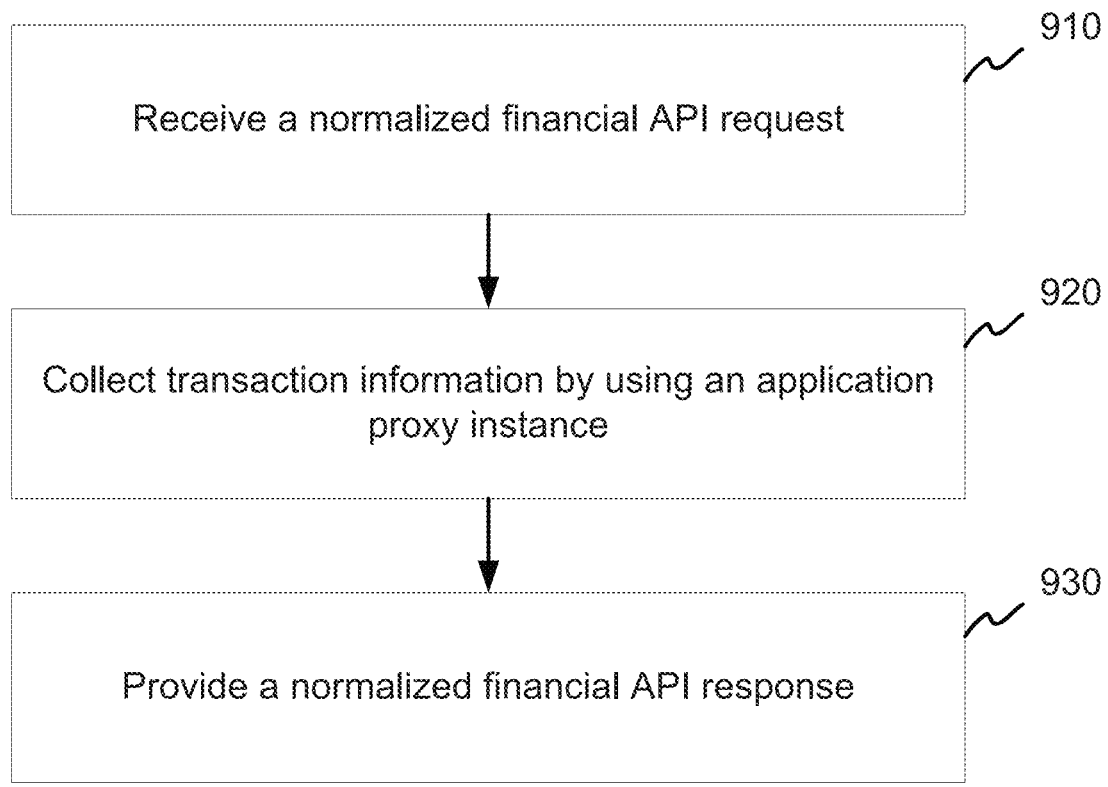
FIGS. 9-10 are flowcharts illustrating example methods of processing transactions, according to various embodiments.
Figure 10:
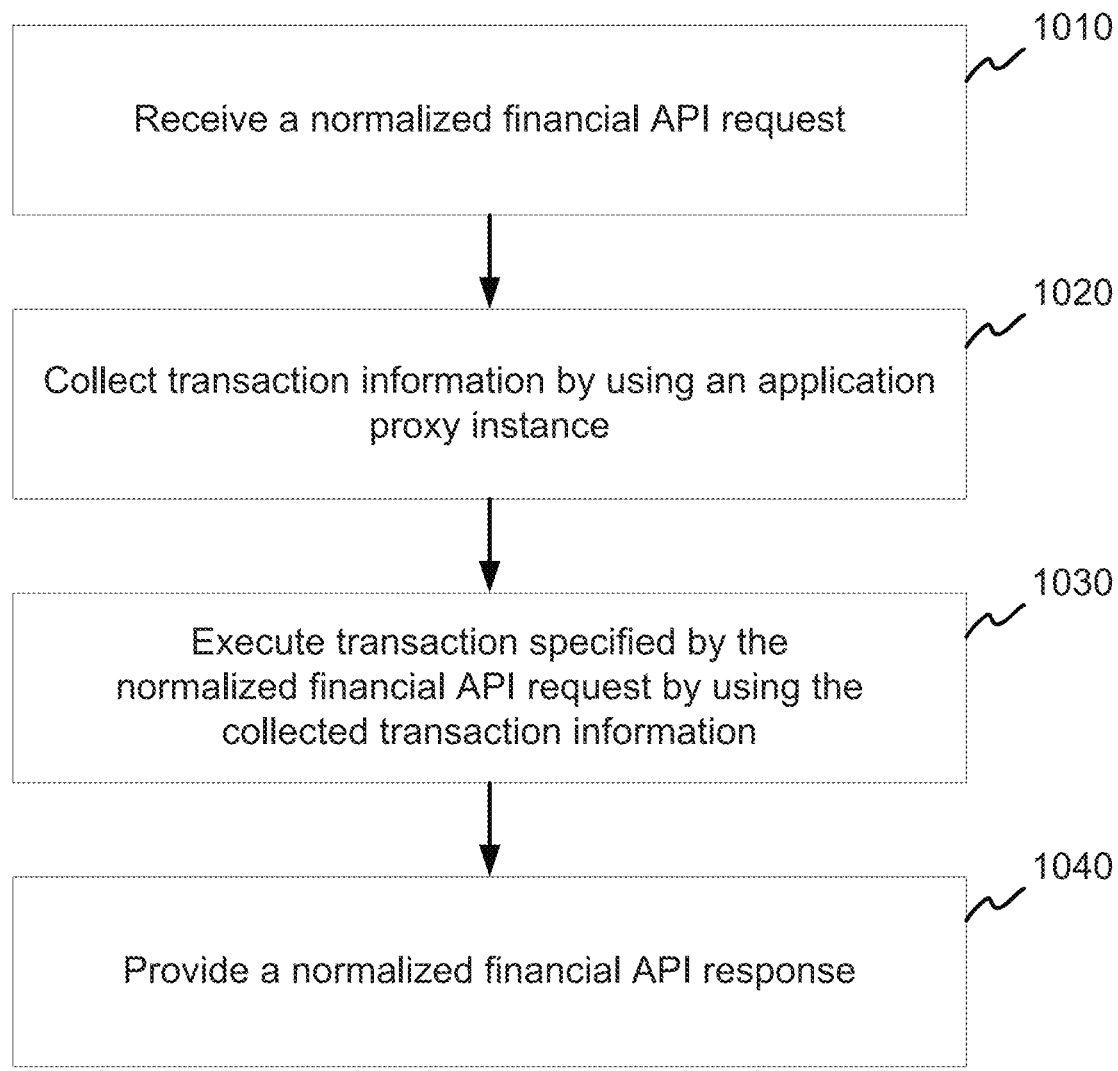

FIGS. 9-10 are flowcharts illustrating example methods of processing transactions, according to various embodiments. The methods of FIGS. 5-6 are described below in reference to certain aspects of FIG. 1 (or, alternatively, FIG. 6).

Referring to FIG. 9, a method for processing a normalized API request at the system 100 includes: receiving a normalized API request associated with at least one account endpoint, the normalized API request being provided by an external user-facing system/application (e.g., system/application 152 of FIG. 1) by using API 110 of the system 100, the normalized API request specifying account credentials of each account endpoint of the normalized API request (block 910).

Responsive to the normalized API request: transaction information of each account endpoint of the normalized API request is collected by using an application proxy instance (e.g., one of proxy instances 121, 122, and/or 123 of FIG. 1) associated with the account endpoint to collect the transaction information from a corresponding institution system (e.g., an external user account system 141, 142, and/or 143 of FIG. 1) by using the associated account credentials specified by the normalized API request and a proprietary AP) (e.g., one of APIs 161, 162, and/or 163 of FIG. 1) of the system 100 (block 920).

Further, a normalized API response is provided to the external user-facing system/application (block 930). The normalized API response provides the transaction information of each account endpoint of the normalized API request. Each application proxy instance is constructed to simulate an application of the corresponding external institution system.

In some implementations, the collected transaction information for each account endpoint includes at least an account number and a corresponding routing number for use in automated clearing house (ACH) transactions. In some implementations, the transaction information is collected by processing at least one statement accessed from the corresponding external institution system.

Additional examples and details of obtaining transaction and account information via proxy instances of the system may be found in U.S. patent application Ser. No. 14/790, 897, filed Jul. 2, 2015, and titled "SYSTEM AND METHOD FOR FACILITATING PROGRAMMATIC VERIFICATION OF TRANSACTIONS" (referred to herein as "the '897 application"). The entire disclosure of this application is hereby made part of this specification as if set forth fully herein and incorporated by reference for all purposes, for all that it contains.

Referring to FIG. 10, a method for processing a normalized API request at the system 100 includes: receiving a normalized API request associated with at least one account endpoint (block 1010). The normalized API request is provided by an external application system by using a platform API of the platform system. The normalized API request specifies a transaction and at least one of an account token and account credentials of each account endpoint of the normalized API request.

Responsive to the normalized API request, transaction information of each account endpoint of the normalized API request is collected (block 1020). The transaction information is collected by using an application proxy instance associated with the account endpoint to collect the transaction information from a corresponding institution system by using at least one of an associated account token and associated account credentials specified by the normalized API request and by using a proprietary API of the institution system.

The transaction specified by the normalized API request is executed by using the collected transaction information (block 1030). A normalized API response is provided to the external system (block 1040). The normalized API response provides results of the transaction. Each application proxy instance is constructed to simulate an application of the corresponding external institution system.

In some implementations, the collected transaction information for each account endpoint includes at least an account number and a corresponding routing number for use in automated clearing house (ACH) transactions.

In some implementations, the transaction information is collected by processing at least one statement accessed from the corresponding external institution system.

Additional examples and details of such functionality of the system may be found in the '897 application.

In some implementations, the user information of the normalized API request includes a user account identifier for each user account of the external user-facing system/application (e.g., the external user-facing system/application 152) corresponding to the normalized API request.

In some implementations, the normalized API request includes parameters as shown in Table 1.

TABLE 1

| NORMALIZED API REQUEST PARAMETER | DESCRIPTION |
| --- | --- |
| <Platform Account ID> | An account of an external user-facing system/application (e.g., "Dev Account A", "Dev Account B" of FIGS. 1 and 4A-4B). |
| <User Account Identifier> | An identifier that identifies a user account of the application system identified by the <Platform Account ID> parameter. |
| <Institution ID> | An identifier that identifies an external institution system (e.g., institutions 141, 142, and/or 143). |

In some implementations, the <User Account Identifier> is used to select at least one corresponding application proxy instance, and each selected application proxy instance includes user credentials (e.g., as depicted in FIG. 4B) to access the associated institution system.

In some implementations, the system 100 determines an application proxy instance associated with the normalized API request based on the <Platform Account ID> parameter, the <User Account Identifier> parameter, and the <Institution ID> parameter. In some implementations, the system 100 identifies an application proxy instance of the application proxy system 120 that is managed in association with the <Platform Account ID> parameter, the <User Account Identifier> parameter, and the <Institution ID> parameter, and uses the identified application proxy instance to collect the transaction information.

In some implementations, each proprietary API request includes parameters as shown in Table 2.

TABLE 2

| PROPRIETARY API REQUEST PARAMETER | DESCRIPTION |
| --- | --- |
| <User Credentials> | The user credentials of the corresponding normalized API request. The user credentials are specified by the application proxy instance, e.g., 421-425, (e.g., as shown in FIG. 4B) used to provide the proprietary API request. |

In various other implementations, the normalized API requests and/or the proprietary API requests may include other sets of parameters, depending on the specifics of the APIs and the types of requests involved. For example, other requests may include identifier tokens, multiple account identifiers (e.g., when requesting transfer of funds), etc. Additional examples and details of such other types of requests and functionality of the system may be found in the '897 application.

In some implementations, the system may send various types of alerts and/or other indications to a user computing device (e.g., user computing devices 171, 172, and/or 173). These various types of alerts and/or other indications may activate one or more applications (e.g., an SMS (simple message service) and/or MMS (multimedia messaging service) process and/or application, an email process and/or application, a process and/or application related to the system, a first-party and/or third-party process and/or application (e.g., of an institution and/or a user-facing application/service), and/or the like) on the user computing device. For example, as described herein, alerts may be communicated with the user computing device for the purpose of completing a multi-factor authentication process. In such an example, an SMS message with a secret/authentication code may be communicated to the user computing device, activating an SMS process and/or application (and/or another process and/or application) on the user computing device. Such an alert may be sent by the system and/or an institution system. In another example, the system may send alerts to the user computing device regarding access to a user account of the user, a transaction, and/or the like. Such alerts may notify the user that a new transaction has posted to their account, that a transaction has posted for a particular amount, a transaction has been denied, and/or the like. Such alerts may comprise SMS messages, email messages, and/or other types of messages that may activate various processes and/or applications, as described above. In yet another example, the system may send an alert to the user computing device including an account document, which may cause a process and/or application suitable for reading the account document to be activated on the user computing device.

V. System Architecture

Figure 11:
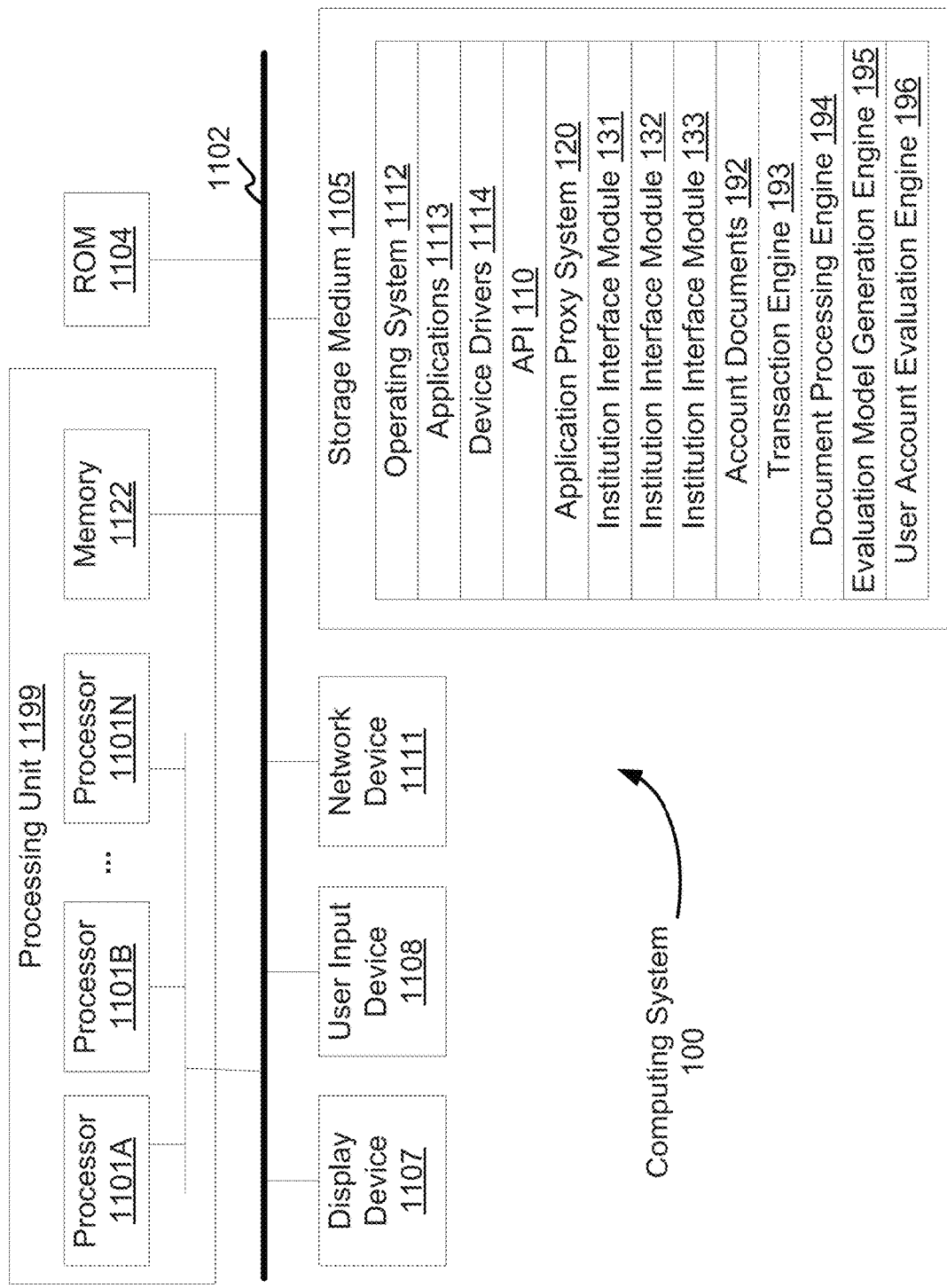
FIG. 11 is a block diagram of an example architecture of the system, according to an embodiment.

FIG. 11 is an architecture diagram of the system 100 according to an implementation in which the system is implemented by a server device. Alternatively, the system may be implemented by a plurality of devices, in a hosted computing environment (e.g., in a cloud server), and/or in any other suitable environment.

The bus 1102 interfaces with the processors 1101A-1101N, the main memory (e.g., a random access memory (RAM)) 1122, a read only memory (ROM) 1104, a computer-readable storage medium 1105 (e.g., a non-transitory computer-readable storage medium), a display device 1107, a user input device 1108, and a network device 1111.

The processors 1101A-1101N may take many forms, such as ARM processors, X86 processors, and/or the like.

In some implementations, the system includes at least one of a central processing unit (processor) and a multi-processor unit (MPU).

The processors 1101A-1101N and the main memory 1122 form a processing unit 1199. In some embodiments, the processing unit includes one or more processors communicatively coupled to one or more of a RAM, ROM, and computer-readable storage medium; the one or more processors of the processing unit receive instructions stored by the one or more of a RAM, ROM, and computer-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more of an API, an application proxy system, one or more instance interface modules, account documents, a transaction engine, a document processing engine, and/or any other functionality or aspects of the system as described herein.

The network adapter device 1111 provides one or more wired or wireless interfaces for exchanging data and commands between the system and other devices, such as external user account systems (e.g., institutions 141, 142, and/or 143), external user-facing systems/applications (e.g., applications 151 and/or 152), user devices (e.g., user devices 171 and/or 172), and/or the like. Such wired and wireless interfaces include, for example, a universal serial bus (USB) interface, Bluetooth interface, Wi-Fi interface, Ethernet interface, near field communication (NFC) interface, and/or the like. In some embodiments, the system communicates with other devices via the Internet.

Machine-executable instructions in software programs (such as an operating system, application programs, and device drivers) are loaded into the memory 1122 (of the processing unit 1199) from the processor-readable storage medium 1105, the ROM 1104 or any other storage location. During execution of these software programs, the respective machine-executable instructions are accessed by at least one of processors 1101A-1101N (of the processing unit 1199) via the bus 1102, and then executed by at least one of processors 1101A-1101N. Data used by the software programs are also stored in the memory 1122, and such data is accessed by at least one of processors 1101A-1101N during execution of the machine-executable instructions of the software programs. The processor-readable storage medium 1105 includes an operating system 1112, software programs/applications 1113, device drivers 1114, the API 110, the application proxy system 120, the institution interface modules 131, 132, and 133, and account documents 192. In some implementations, the processor-readable storage medium 1105 includes the transaction engine 193, the document processing engine 194, the evaluation model generation engine 195, and/or the user account evaluation engine 196.

Further details regarding the system architecture are described below.

Figure 12:
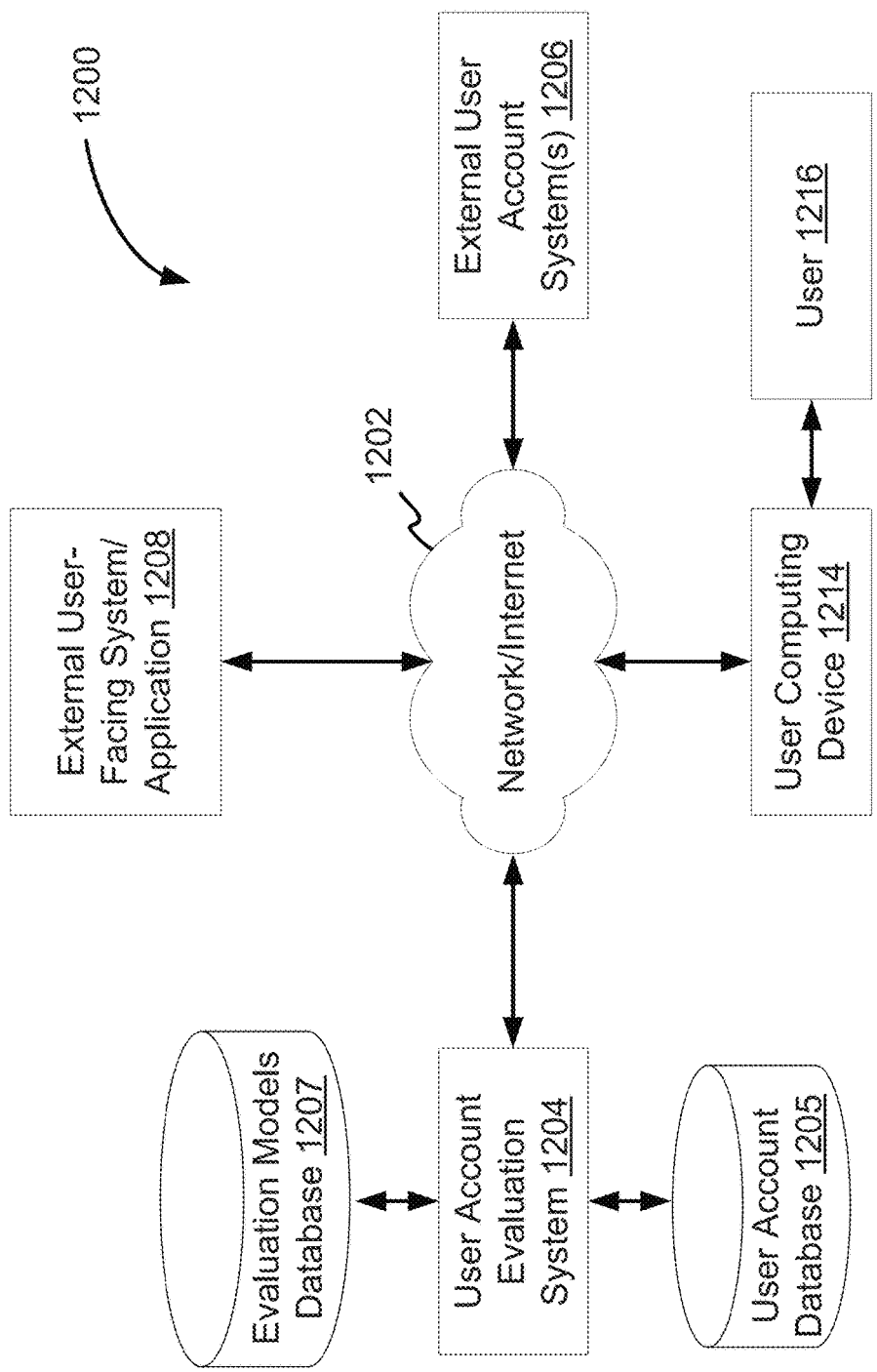
FIG. 12 illustrates an example network environment in which a user account evaluation system may operate, according to an embodiment.

VI. Example Network Environment of the System when Implementing User Account Evaluation FIG. 12 illustrates an example network environment 1200 in which a user account evaluation system 1204 may operate, according to an embodiment. As shown, the network environment includes the user account evaluation system 1204, a user account database 1205, an evaluation models database 1207, an external user account system 1206, an external user-facing system/application 1208, a user computing device 1214, and a user 1216. The various aspects of the network environment 1200 may communicate via a network/Internet 1202. The network/Internet 1202 may comprise a wired and/or wireless network, and/or in certain embodiments may comprise one or more wired and/or wireless networks. The various components of the network environment 1200 may communicate via the network/Internet 1202, and/or alternatively may communicate directly with one another via one or more other wired or wireless connections. In some embodiments, the user account evaluation system 1204 may include the functionality of the system 100 described above, and/or the functionality of the system 100 described above may be implemented in one or more other computing systems in the network environment 1200. For clarity of description, however, the following description assumes that the user account evaluation system 1204 includes the functionality of the system 100 described above.

Additionally, the external user account system 1206 may comprise a system of an institution (e.g., one of institution systems 141, 142, and/or 143), and while more than one external user account system 1206 may be involved in communication with the user account evaluation system 1204 (e.g., the user account evaluation system 1204 may communicate with many different institutions to obtain user account data related to many different user accounts), one external user account system 1206 is shown in FIG. 12 for purposes of clarity.

Further, external user-facing system/application 1208 may comprise the system and/or application, merchant, and/or the like, with which the user may interact. For example, the user 1216 may interact with the external user-facing system/application 1208 via the user computing device 1214. In one example, the external user-facing system/application 1208 may comprise an app, and/or web-based application, running on and/or rendered by the user computing device 1214 (e.g., a mobile device, and/or the like), as described above (e.g., in reference to app 151 and/or 152).

In an embodiment, the external user-facing system/application 1208 may include the permissions plug-in (not shown). The permissions plug-in may comprise a software/code module, snippet, and/or the like, which may be integrated into the external user-facing system/application. The permissions plug-in may be provided by the user account evaluation system 1204 such that the external user-facing system/application 1208 may include functionality provided by the user account evaluation system 1204. In one implementation, the permissions plug-in comprises JavaScript code integrated into the external user-facing system/application. The JavaScript code, when executed, may communicate with the user account evaluation system 1204 to provide certain functionality as described herein. Advantageously, in some implementations, the permissions plug-in may generate interactive user interfaces that may be presented to the user 1216. Information may be obtained from the user 1216 via the interactive user interfaces of the permissions plug-in (e.g., account credentials, and/or the like). The permissions plug-in may obtain such information, and communicate the information to the user account evaluation system 1204 in a secure manner such that the external user-facing system/application 1208 does not have access to the information provided by the user 1216. Further, the permissions plug-in may advantageously handle establishing secure communications with the user account evaluation system 1204, and/or other functionality as described herein, such that a developer of the external user-facing system/application 1208 need not be concerned with these aspects (thus speeding development of the external user-facing system/application 1208). Further details and examples of the functionality of the permissions plug-in may be found in the '603 and '508 applications, which are incorporated by reference herein.

As mentioned above, the user account evaluation system 1204 may include an evaluation model generation engine 195 that may be executed by the system to generate evaluation models, as described herein. Further, the user account evaluation system 1204 may include a user account evaluation engine 196 that may be executed by the system to evaluate user accounts, as described herein.

The user account database 1205 may store user account data obtained by the system. The user account data may be obtained as described above, and may optionally be processed in various ways, as described above. The user account data is associated with user accounts of users, and each user account may be associated with a user account type. For example, types of user accounts may include, in the context of financial accounts, depository accounts, credit accounts, investment accounts, and/or the like. Other types of accounts may include access accounts, Internet-based accounts, and/or the like.

The evaluation models database 1207 may store evaluation models generated by the system. As described below, evaluation models may be generated based on user account data obtained and stored by the system. Evaluation models may be specific to particular types of user accounts, as different evaluations parameters may be relevant to different types of user accounts. Thus, the system may store evaluation models related to depository accounts, evaluation models related to credit accounts, etc. As described below, the evaluation models may be used by the system to evaluate other user accounts, the user account data of which is obtained by the system.

In some embodiments, the user account database 1205 and the evaluation models database 1207 may be combined into a single database, or split into multiple databases. The databases may be local to, and/or remote from the user account evaluation system 1204. In an implementation, the databases and/or the user account evaluation system 1204 may be implemented in a hosted computing environment, such as a cloud computer platform.

As described, user account data, evaluations of user accounts, and/or the like may be requested by external user-facing systems/applications via the API of the system (e.g., the API 110). Similarly, such user account data, evaluations of user accounts (e.g., evaluations parameter scores, etc.), and/or the like may be provided by the system via the API of the system. Advantageously, the API of the system may be standardized such that the information may be requested in a similar way, and provided in a similar way, regardless of the user, the relevant external user account system, the original format of the user account data, and/or the like.

Figure 13:
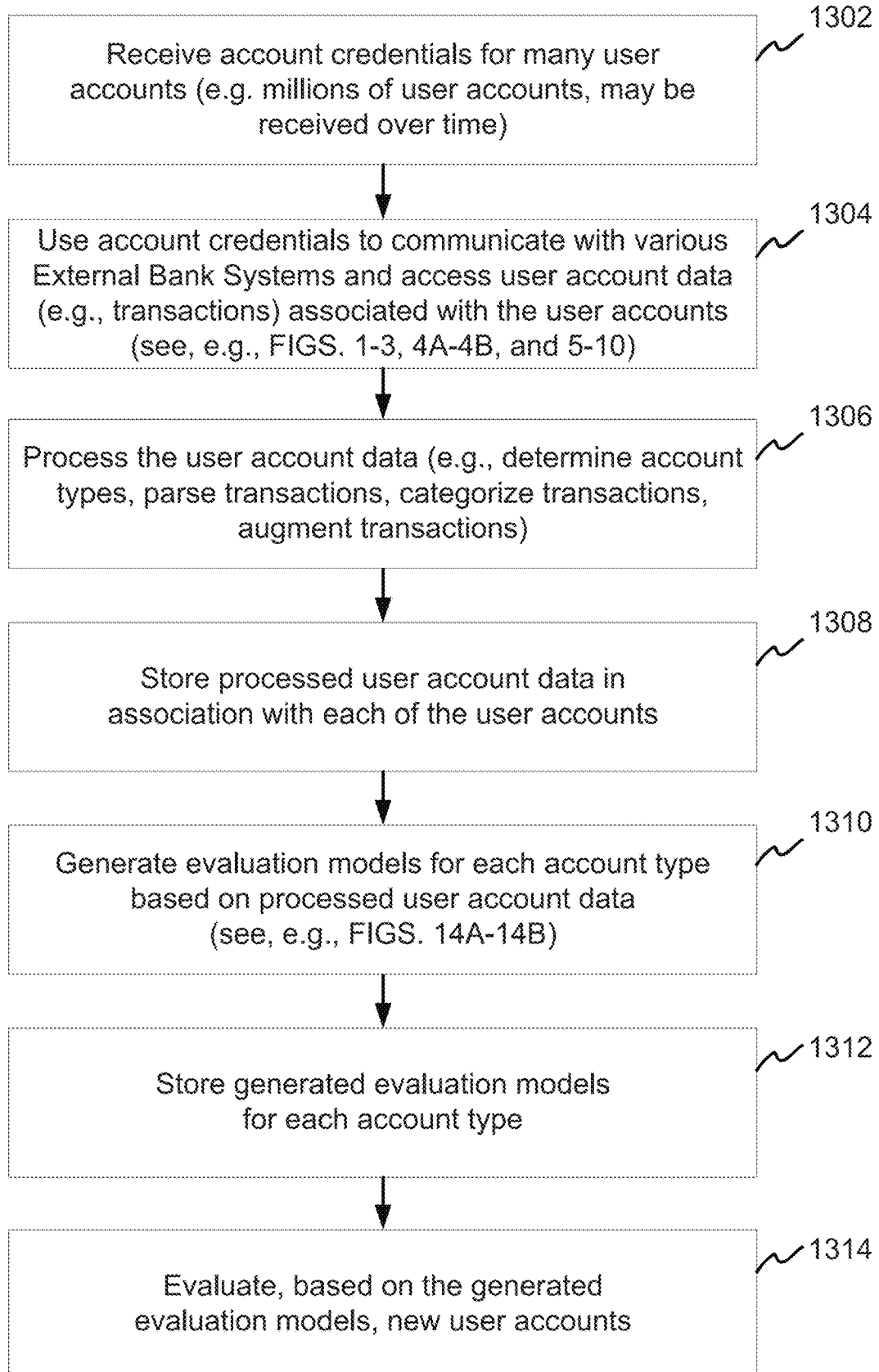
FIG. 13 is a flowchart of an example method of obtaining user account data and generating evaluation models, according to an embodiment.

VII. Example Method of Obtaining User Account Data for Generating Evaluation Models FIG. 13 is a flowchart of an example method of obtaining user account data and generating evaluation models, according to an embodiment. For example, the method of FIG. 13 may be performed by the user account evaluation system 1204.

At block 1302, user account credentials may be received by the system for many user accounts. For example, over time the system may receive user account credentials for many hundreds, thousands, millions, hundreds of millions, or more user accounts. Such account credentials may be received from various users, including various users of one or more external user-facing systems/applications. In some implementations, the account credentials may be received via a permissions plug-in of the external user-facing systems/applications, as described above. Account credentials may include, for example, a username and password (and/or any other credential information) used by the user for logging into/accessing an account of the user, e.g., at the external user account system 1206 (and/or another institution). As described above, the user account credentials may be received, e.g., via API 110 of the system.

At block 1304, the user account evaluation system 1204 uses the user account credentials to communicate with one or more external user account system(s) 1206 to access user account data related to the users/user accounts. As mentioned, the process of communicating with an institution system (e.g., the external user account system 1206) to obtain user account information is described above in reference to, e.g., FIGS. 1-3, 4A-4B, and 5-10. This block (and/or the 1302) may additionally involve presenting information to, and/or obtaining additional information from, the user for purposes of satisfying multi-factor authentication, as described above.

At block 1306 the system processes the user account data accessed/obtained by the system. For example, as described above, the user account data may be parsed and cleansed, such that it may be standardized to a common format. This is helpful because user account data obtained from different institutions may be in varying formats. The user account data may also be categorized and/or augmented with contextual information (e.g., categorical labels, tags, geolocation information, etc.). Further, the user account data may be used to determine an account type of the user account with which the data is associated. For example, the user account data may indicate that a majority of transactions of the account are credit card transactions. Accordingly, the system may determine that that the type of the corresponding user account is "credit." In another example, the system may determine that, because a user account's data includes multiple check deposits, that the account type is "depository." In some instances, user account types may be provided by the external user account systems directly, such that an analysis of the user account data is not necessary to determine the type.

At block 1308, the user account data is stored in the user account database 1205 in association with the respective user accounts.

At block 1310, the processed user account data (or at least a portion of the processed user account data) is used to generate evaluation models. As mentioned, different evaluation models may be generated that correspond to different user account types (as different user account types may have different characteristics and/or relevant criteria to evaluation). Accordingly, the system may generate evaluation models for one or more user account types, using user account data corresponding to the relevant user accounts of the various types. Generation of evaluation models is described in further detail in reference to FIGS. 14A-14B. In one application, the evaluation models may be used to evaluate an amount of risk associated with a user account (e.g., engaging in a transaction with a user account).

At block 1312, the generated evaluation models are stored by the system in the evaluation models database 1207. At block 1314, the system may use the evaluation models, as described below, to evaluate new user accounts accessed by the system (e.g., to determine an amount of risk associated with the new user accounts).

While blocks 1302, 1304, 1306, 1308, 1310, 1312, and 1314 are described above in sequence for convenience, the blocks need not happen entirely sequentially. For example, all the account credentials need not be received before all the user account data is received, or before the user account data is processed or stored. Rather, the system generally is substantially continuously receiving user account credentials, and at the same time, substantially continuously obtaining user account data from various external user account systems, processing the user account data, and/or storing the user account data. Thus, user account data is frequently added to the user account database 1205, which may be evaluated and/or used for generating evaluation models. Evaluation models may be generated and/or regenerated at any time, as need by the system, while the system continued to received user account data, etc. Further, new user accounts by the system may be evaluated based on the evaluation models at any time, determining and sending alerts indicating risky accounts in a real-time manner, for example.

VIII. Examples of Evaluation Parameters

Evaluation models are generated (as described below) based on "evaluation parameters." As used here, the term "evaluation parameter" is a broad term including its ordinary and customary meaning, and includes, but is not limited to, any parameter, criteria, rule, etc. based upon which a user account may be evaluated.

As mentioned above, while the system may be used to evaluate user accounts of various types in various applications and/or contexts, for convenience the system is described in the context of financial accounts. In the financial account context, user account types may include depository accounts, credit accounts, investment accounts, etc., and the user account data (associated with respective user accounts) may include many transactions. Each transaction may define, for example, a date and/or time when the transaction took place, one or more parties to the transaction (e.g., a name of a merchant), an amount of the transaction (e.g., the amount paid for the service or good purchased), a category/type of the transaction, etc.

In the context of financial accounts, and transactions associated with those financial accounts, FIG. 15 illustrates some non-limiting examples of evaluation parameters that may be relevant to evaluating financial accounts, according to an embodiment. The examples of FIG. 15 are described in more detail below. In each of Tables 1-12 below, the "key" indicates a name that may be returned by the API of the system for a given evaluation parameter, and the "description" describes what the evaluation parameter represents.

As mentioned above, the system may include multiple sets of evaluation parameters, each set being associated with a user account type. While each set may include some of the same evaluation parameters, in some embodiments the different sets include unique evaluation parameters that are relevant to the user account type corresponding to the set. The various sets of evaluation parameters may have varying numbers of evaluation parameters. The system may store the various sets of evaluation parameters, e.g., in the evaluation models database 1207.

Advantageously, the evaluation parameters may provide objective indications to the customer, e.g., of risk associated with a given user account. By determining and providing scores related to multiple evaluation parameters for a given account, the system, in some implementations, advantageously provides multiple dimensions of evaluation to the customer that the customer may use and/or combine in various ways to determine whether, e.g., to enter into a transaction with the user/user account. In some embodiments, the customer may specify how and which evaluation parameters are provided by the system.

In various implementations, values of evaluation parameters determined by the system may be analyzed for their accuracy, and the system may employ one or more machine learning or artificial intelligence algorithms (which may be supervised or unsupervised) to feed back results to the system such that evaluation parameters may be adjusted, or the sets may be changed to include other evaluation parameters, to improve the accuracy of the system in evaluating user accounts (e.g., assessing risk).

In some implementations, some evaluation parameters may be combined into a single evaluation parameter. For example, the evaluation parameter described below that is related to Benford's Law may be comprised of one or more evaluation sub-parameters. As described, Benford's Law describes the frequency distribution of the leading digit of transaction amounts. Various related evaluation sub-parameters may be, e.g., a number of transactions beginning with 1, a number of transactions beginning with 2, a number of transactions beginning with 3, etc. It may be the case that certain of these evaluation sub-parameters are particularly indicative of risk for certain types of use accounts. Thus, in some implementations, the Benford's Law evaluation parameter may be a combination of, e.g., two evaluation sub-parameters (e.g., a number of transactions beginning with 2 and a number of transactions beginning with 5). In another example, various evaluation sub-parameters related to the Transaction Amount evaluation parameter may include: fraction of transactions in the amount range of 0-10, fraction of transactions in the amount range of 10-100, fraction of transactions in the amount range of 100-100, etc. Evaluation sub-parameters may be evaluation parameters, and vice versa, in various implementations. In various implementations, values of evaluation parameters determined by the system may be analyzed for their accuracy, and the system may employ one or more machine learning or artificial intelligence algorithms (which may be supervised or unsupervised) to feed back results to the system such that evaluation sub-parameters may be re-selected or combined in different ways to improve the accuracy of the system in evaluating user accounts (e.g., assessing risk).

In various implementations, initial evaluation parameters may be selected via one or more machine learning or artificial intelligence algorithms (which may be supervised or unsupervised). For example, a large set of user accounts may be analyzed on a multi-variate basis to identify common features and/or outliers among the large set.

In some implementations, two or more evaluation parameters may be combined into a single "overall evaluation parameter." For example, for a given account, values for two or more evaluation parameter values may be multiplied, summed, weighted summed, etc. (e.g., any other mathematical operation, or combination of operations, may be applied) with one another to generate an overall evaluation parameter. In some implementations, the overall evaluation parameter may be reported to the customer as an overall score, or an overall risk score. Advantageously, the overall evaluation parameter may provide an objective indication to the customer of an overall assessment, e.g., of risk associated with a given user account. In some embodiments, the customer may specify how and which evaluation parameters are combined for the overall evaluation parameter. In some implementations, evaluation parameters having a higher correlation with the type of risk of interest may be those that are combined in the overall evaluation parameter. In various implementations, values of overall evaluation parameters determined by the system may be analyzed for their accuracy, and the system may employ one or more machine learning or artificial intelligence algorithms (which may be supervised or unsupervised) to feed back results to the system such that evaluation parameters may be re-combined or combined in different ways to generate better overall evaluation parameters to improve the accuracy of the system in evaluating user accounts (e.g., assessing risk).

In various implementations, some evaluation parameters may be determined to be more important (e.g., more indicative of risk) than others, and thus the more important evaluation parameters may be, e.g., reported first to a customer and/or weighted more heavily in an overall evaluation parameter. For example, in one embodiment the following evaluation parameters may be determined to be most important for credit and/or depository user accounts (provided in a rough, but not exact, order of importance): Transaction Classes Indicative of High Risk, Zero Counter, Benford's Law, Transaction Amount, and Average time between credit payments. Thus, in an overall evaluation parameter, these evaluation parameters may be weighted more heavily than others, and may be weighted in approximate descending order of importance.

a. Transaction Amount

Indicates how much money is flowing through an account. May be an important factor in quantifying account behavior. This parameter captures how transactions amounts are distributed. For example, transactions of an account may be bucketed depending on amounts of the transactions, such that a distribution of the amounts may be determined.

TABLE 1

| KEY | DESCRIPTION |
| --- | --- |
| transaction_amounts: | How transaction amounts are distributed across different buckets. | b. Ratio of Highest Amount to Average Amount

Indicates a ratio of the highest transaction amount to the average transaction amount which is an indicator of large, anomalous transactions. The ratio of the lowest negative transaction amount to the average negative transaction amount is a similar indicator for negative amounts. Like the transaction amount parameter, these parameters may identify anomalous accounts because these ratios help to quantify how an account is being used.

TABLE 2

| KEY | DESCRIPTION |
| --- | --- |
| ratio_high_average: | Ratio of highest transaction amount to average positive transaction amount. |
| ratio_low_average: | Ratio of lowest negative transaction amount to average negative transaction amount. | c. Transaction Classes Indicative of High Risk

Indicates an average number of overdraft, fraud, late fee, and/or cash advance transactions per month. This parameter may help indicate anomalous accounts because most normal accounts have a low number of transactions in these classes.

TABLE 3

| KEY | DESCRIPTION |
| --- | --- |
| high_risk_class_txns: | Number of transactions that fall into any of four specific high risk categories (e.g., overdraft, fraud, late fee, and/or cash advance). | d. Bank Fees

Indicates a proportion of an account's transactions that have the category "Bank Fees" (e.g., have been categorized as being bank fees). This parameter may help identify anomalous accounts because most normal accounts have a low number of transactions with this category.

TABLE 4

| KEY | DESCRIPTION |
| --- | --- |
| fraction_bank_fees: | Proportion of transactions that are bank fees. | e. Foreign Fees

Indicates an average number of an account's transactions that have the subcategory "Foreign Transaction" (e.g., have been categorized as being foreign transactions) per month. This parameter may help identify anomalous accounts because most normal accounts exhibit a relatively low number of transactions from a different country.

TABLE 5

| KEY | DESCRIPTION |
| --- | --- |
| foreign_fees: | Number of foreign fees per month. | f. Bank Transfers

Indicates a proportion of an account's transactions that have the category "Transfer" (e.g., have been categorized as being transfers). This parameter may help identify anomalous accounts because the number of transfers into and out of an account may be highly correlated with abnormal behavior.

TABLE 6

| KEY | DESCRIPTION |
| --- | --- |
| bank_transfers: | Proportion of transactions that are transfers. | g. Benford's Law

Indicates how closely the distributions of amounts in the account follow Bendford's Law, which describes the frequency distribution of the leading digit of each transaction amount. Financial data in normal accounts may tend to follow a distribution where smaller numbers are more likely to be leading digits than larger ones. Thus, this parameter may help indicate anomalous accounts (e.g., those associated with fraudulent activity) because it gives an overall picture of how well an account's amounts follow Benford's Law.

TABLE 7

| KEY | DESCRIPTION |
| --- | --- |
| benfords_law: | How much transaction amounts deviate from the distribution of digits predicted by Benford's Law. | h. Additional Transaction Level Risk Factors

Indicates an average number of a combination of different risk factors that are extracted from each transaction's name per month. This parameter may be helpful in detecting anomalous accounts because most normal accounts have a low number of transactions in this class.

TABLE 8

| KEY | DESCRIPTION |
| --- | --- |
| additional_risk_class_txns: | Number of transactions with additional risk factors (e.g., transactions of types such as foreign fees, overdraft protection, etc.) (may include types of transactions mentioned above, including overdraft, fraud, late fee, and/or cash advance. | i. Credit Card Payment Parameters

Indicates an amount and frequency of credit card payments. These parameters may be helpful in detecting anomalous accounts because most normal accounts follow a similar payment amount and time schedule.

TABLE 9

| KEY | DESCRIPTION |
| --- | --- |
| mean_payment_amount: | Average credit card payment amount. |
| mean_payment_time: | Average time between credit payments. | j. Location Factors

Based on an analysis of locations of transactions in a user account. Indicates a percentage of time the user spent in their primary spending state.

TABLE 10

| KEY | DESCRIPTION |
| --- | --- |
| home_state_percentage: | Percentage of time spent in primary spending state. | k. Number of Transactions Per Month

Indicates a number of transactions this account has per month. This parameter may be helpful in detecting anomalous accounts because it is a strong indication of how an account is being used.

TABLE 11

| KEY | DESCRIPTION |
| --- | --- |
| n_txns_per_month: | The average number of transactions this account has per month. | l. Zero Counter

Indicates a number of successive zeros in a transaction amount, starting from the right. This zero counter may be useful in identifying deliberate manual payments, which tend to occur in clean amounts that end in O's. These parameters may be helpful in detecting anomalous accounts because they are a strong indication of how an account is being used.

TABLE 12

| KEY | DESCRIPTION |
| --- | --- |
| zero_count_credit_payments: | Zero count from the right for credit card payments. |
| zero_count: | Zero count from the right for all payments. |

IX. Example Method of Generating Evaluation Models

Figure 14A:
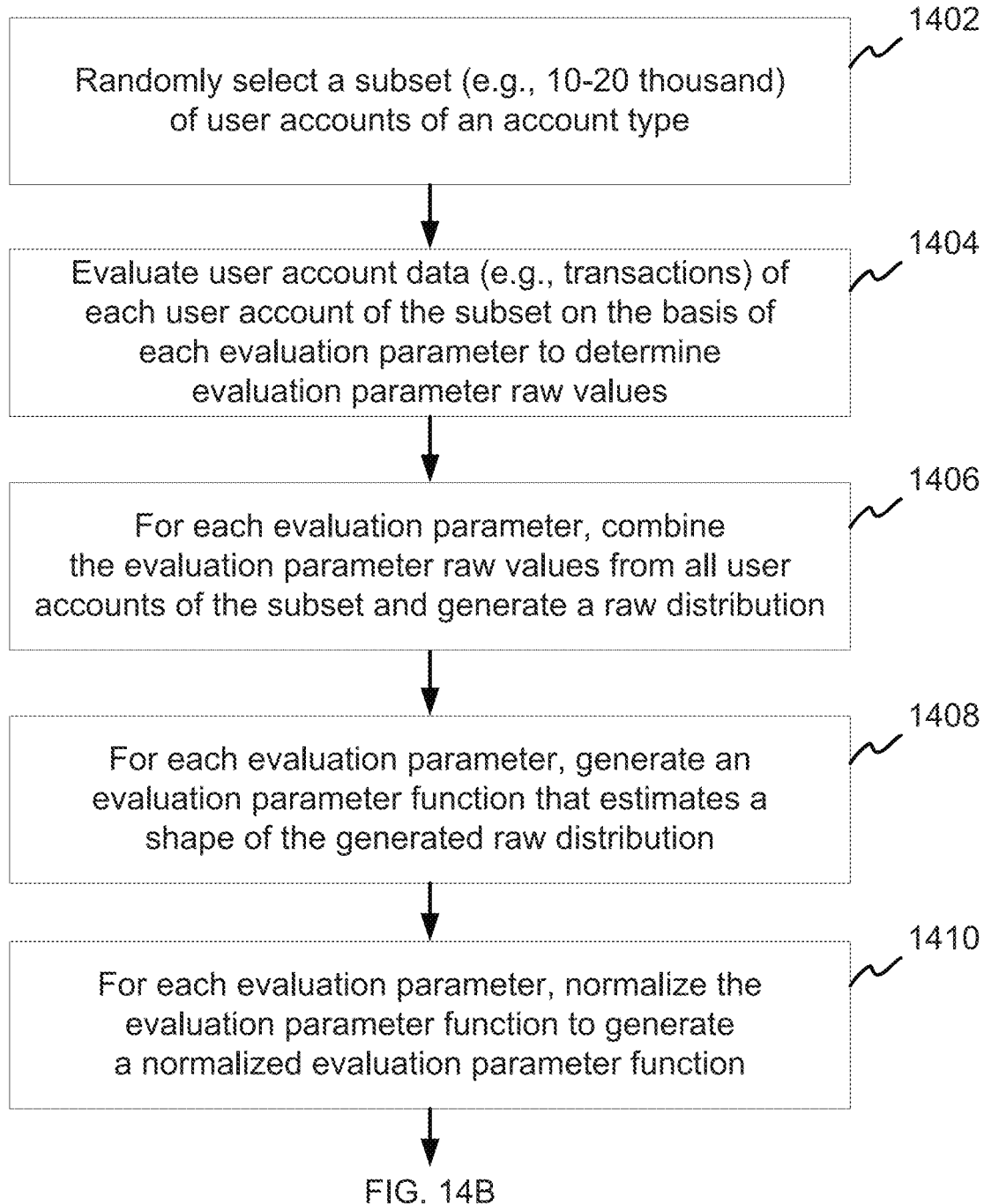
FIGS. 14A-14B are flowcharts of an example method of generating evaluation models, according to an embodiment.
Figure 14B:
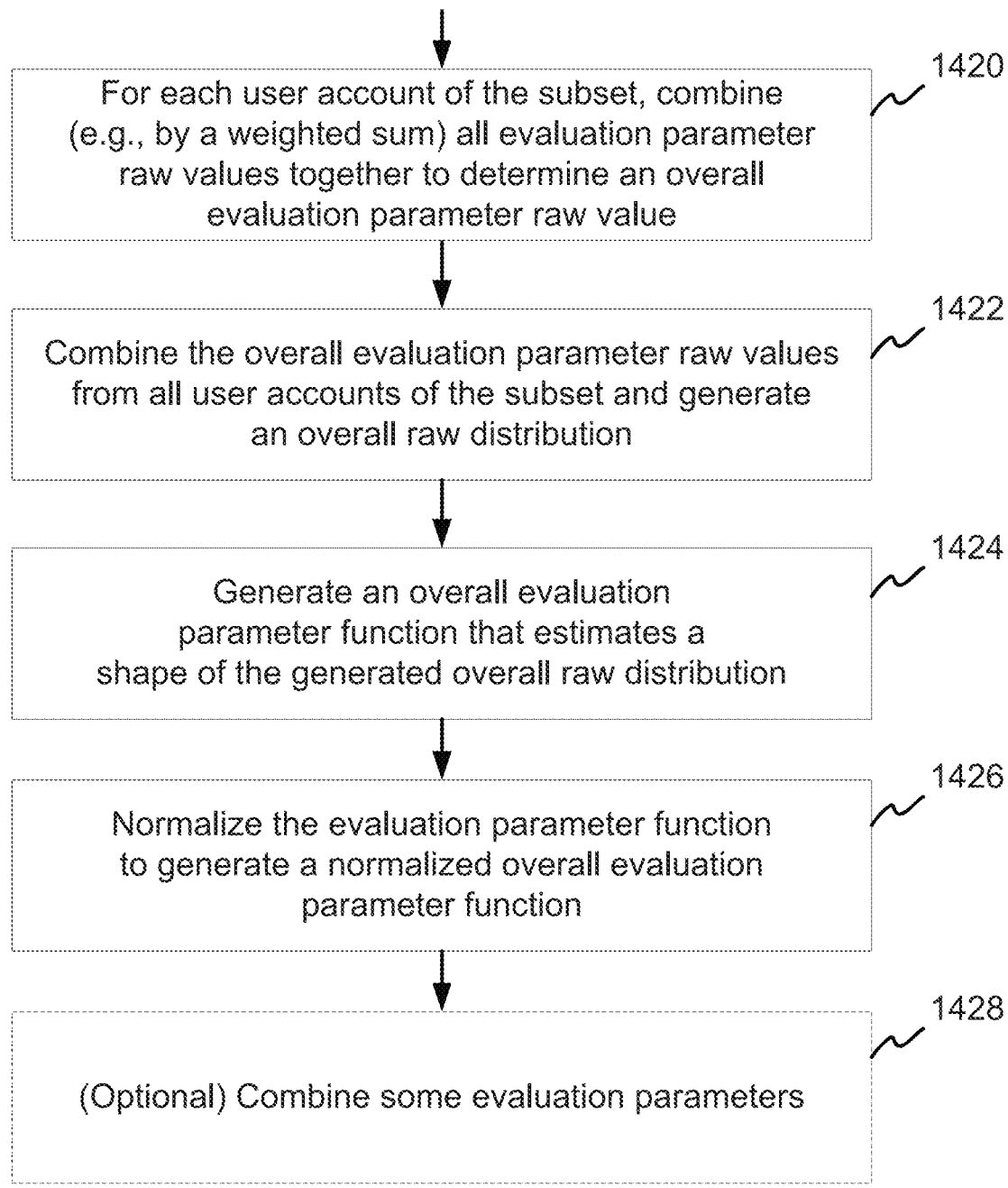

FIGS. 14A-14B are flowcharts of an example method of generating evaluation models, according to an embodiment. For example, the method of FIGS. 14A-14B may be performed by the user account evaluation system 1204. As described above, different sets of evaluation models may be generated for each user account type. Thus, the method of FIGS. 14A-14B may be performed for each user account type. Additionally, as described above, different sets of evaluation parameters may be defined which each apply to different user account types. Accordingly, the method below assumes that the evaluation parameters applied to the user account data are from a set of evaluation parameters that are selected for a user account type associated with the user account data.

In some implementations, evaluation models may be generated once, while in other implementations evaluation models may be regenerated multiple times (e.g., periodically, irregularly, on-demand, frequently, etc.). Additionally, as described above, the system may employ one or more machine learning or artificial intelligence algorithms (which may be supervised or unsupervised) to feed back results to the system such that evaluation parameters may be recombined or combined in different ways, and such that better evaluation models may be generated. In some embodiments, for example, actual risky event/user account information may be received by the system, which may be fed back into the evaluation models to improve the models (e.g., evaluation parameters may be adjusted, re-selected, re-prioritized). In some implementations, the system may automatically employ such machine learning or artificial intelligence algorithms to test and/or back test different combinations of evaluation parameters on a set of user accounts to assess the accuracy of the risk predictions of the system, and automatically improve the evaluation models.

At block 1402, the system randomly selects a subset of user accounts of a given type. In order to increase efficiency of the system, a subset of the user accounts is selected to generate the model rather than using all user accounts stored by the system. The user accounts are randomly selected such that they more accurately represent the whole population of user accounts (e.g., to avoid a biased sample). Additionally, a statistically significant number of user accounts may be selected. As used herein, the term "statistically significant" is a broad term including its ordinary and customary meaning, and includes, but is not limited to, any number of user accounts that provide a sample size sufficient such that characteristics of the sample substantially reflect the characteristics of the whole population of user accounts (e.g. of a given type). In various implementations, the subset may include at least 100, at least 1000, at least 10,000, at least 20,000, or at least more user accounts (of a given type).

In some implementations, methods other than random sampling may be used to select the subset of user accounts, and/or other numbers of user accounts may be sampled for the subset. Additionally, in some implementations all user accounts of a given type may be evaluated in generating the evaluation models.

At block 1404, the system evaluates the user account data associated with the selected subset of user accounts on the basis of each evaluation parameter (e.g., of the set of evaluation parameters that apply to the particular user account type) to determine raw values for each of the evaluation parameters. As used herein, the term "raw value" refers to the actual value (e.g., not normalized) of the evaluation parameter when applied to the user account data of the user account. For example, if the evaluation parameter is "average number of transactions per month," the evaluation parameter raw value may be a number such as 12, 15.6, etc. In some cases, evaluation parameter raw values may comprise more than one value (e.g., a distribution of values. This may be the case, for example, for the "transaction amounts" evaluation parameter. In some cases, for example with the "transaction amounts" evaluation parameter, the evaluation parameter may be comprised of multiple evaluation sub-parameters (e.g., evaluation sub-parameters may include, e.g., number of transactions in the amount range of 0-10, number of transactions in the amount range of 10-100, number of transactions in the amount range of 100-100, etc.), each of which may be a number, but when combined comprise a distribution. Thus, at block 1404, each user account in the subset is evaluated for each of the evaluation parameters in the set of evaluation parameters for the applicable user account type to determine the raw values.

Figure 16A:
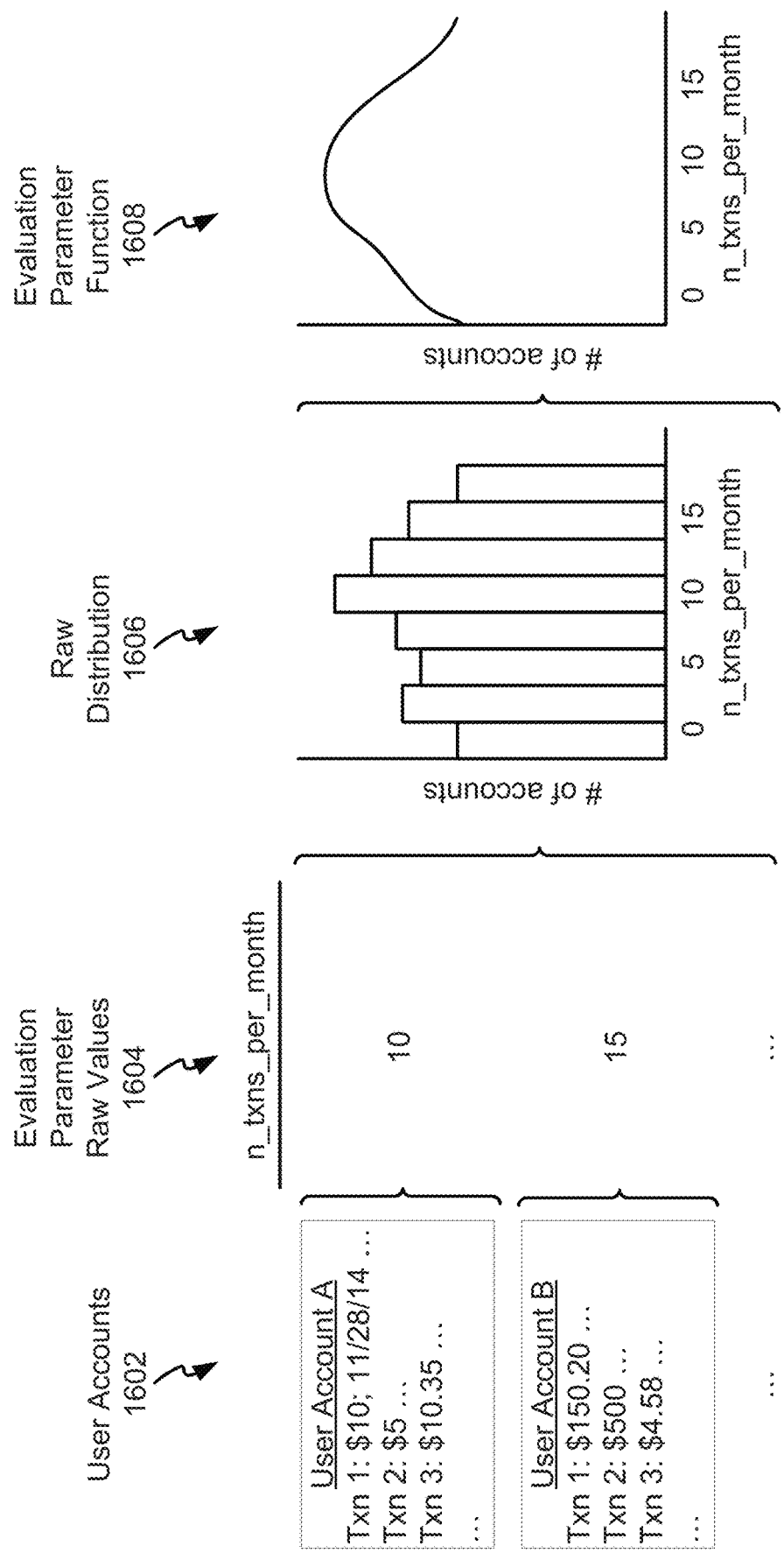
FIGS. 16A-16B illustrate an example of generating an evaluation model, and evaluating a user account, according to an embodiment.

FIG. 16A illustrates an example of evaluating user account data, according to an embodiment. As shown, two or more user accounts 1602 (e.g., User Account A, User Account B, etc.) each comprise multiple transactions. The user accounts are each evaluated to determine an average number of transactions per month (e.g., an evaluation parameter). The results of the evaluation are shown as indicated by the evaluation parameter raw values 1604.

Returning to FIG. 14A, at block 1406, for each evaluation parameter in the set, and across all user accounts in the subset, the system combines the evaluation parameter raw values to generate a distribution of the raw values. Thus, a distribution for the values of each of the evaluation parameters in the set is generated, based on the sample of user accounts comprising the subset. The raw distributions represent, e.g., the variation in the population (e.g., the subset of user accounts) for each evaluation parameter. Advantageously, as described herein, the system may use these distributions to identify new user accounts that vary from the norm with respect to any of the evaluation parameters. As mentioned above, variations from the norm for the evaluation parameters represent risk associated with those new user accounts.

Generation of a raw distribution may include determining bins into which each of the user accounts of the subset may be placed. The bins may be regularly defined, and may be selected automatically by the system based on various factors. For example, the range of raw values may be analyzed, and a predetermined minimum number of regularly spaced bins may be determined by the system. In various implementations, the bins may be more or less granular.

Referring again to FIG. 16A, an example raw distribution 1606 is shown for the "average number of transaction per month" evaluation parameter and for the user accounts 1602. Visualized, the raw distribution may be understood to be a histogram, but the system need not generate visualizations of the distributions.

Referring to FIG. 14A, at block 1408, for each evaluation parameter in the set, the system generates an evaluation parameter function that estimates a shape of the generated raw distribution. The evaluation parameter function may be a continuous or non-continuous (e.g., discrete) function that estimates a probability density function of the raw distribution. The evaluation parameter function may enable interpolation of the raw distribution. Examples of techniques that may be applied to determine the evaluation parameter function include, e.g., kernel density estimation, data clustering, vector quantization, or similar techniques.

FIG. 16A illustrates an example of an evaluation parameter function 1608 that is generated based on the raw distribution 1606. As shown, the evaluation parameter function generally tracks the shape of the raw 1606.

Figure 16B:
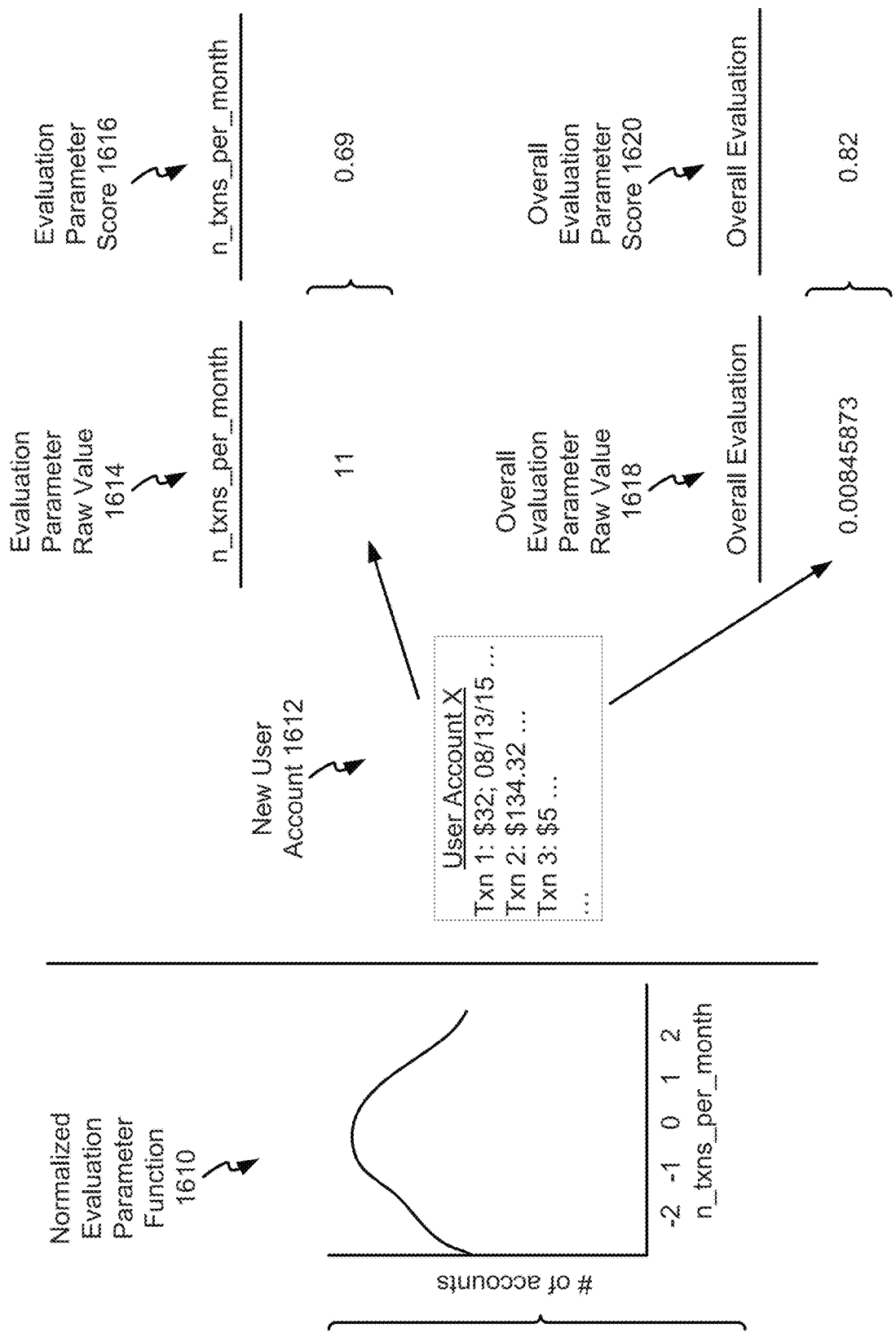

At block 1410 of FIG. 14A, the system normalizes the evaluation parameter function to generate a normalized evaluation parameter function. Normalization of the evaluation parameter function may include determining a mean of the distribution/function, and identifying deviations (e.g., standard deviations) from that mean. FIG. 16B illustrates a normalized evaluation parameter function 1610 corresponding to the evaluation parameter function 1608 of FIG. 16A.

In some implementations, generating an evaluation parameter function (block 1408 of FIG. 14A) and normalizing the evaluation parameter function (block 1410 of FIG. 14A) may be performed simultaneously (e.g. via techniques such as kernel density estimation, data clustering, vector quantization, or similar techniques). Additionally, in some implementations, the raw distribution may be normalized before the evaluation parameter function is generated.

Once the normalized evaluation parameter function is generated for each evaluation parameter, the normalized evaluation parameter functions may be stored by the system (e.g., in the evaluation models database 1207).

Advantageously, the normalized evaluation parameter functions may be used, as described below, to evaluate new user accounts assessed by the system. For example, new user accounts may be evaluated on the basis of various evaluation parameters to determine whether the new user accounts deviate from the norm (e.g., the subset of user accounts of the same type as the new user accounts), and by how much they deviate. Accordingly, a risk associated with the new user accounts may be quantified and provided to a customer.

Referring now to FIG. 14B, as mentioned above, in some implementations the system additionally evaluates user accounts on the basis of overall evaluation parameters. The overall evaluation parameter may comprise a combination of two or more of the evaluation parameters of the set for the given type of user accounts.

At block 1420, for each user account of the subset of user accounts, the system combines each of the determined evaluation parameter raw values (e.g., for each of the evaluation parameter of the set) to determine an overall evaluation parameter raw value. As described above, in various implementations combining the evaluation parameter raw values may include multiplying them, summing them, weighted summing them, and/or applying any other mathematical operation or combination of operations to the evaluation parameter raw values. As mentioned above, the particular formula for combining the evaluation parameter raw values may be indicated by a customer (e.g., may be customer specific). Additionally, fewer than all the evaluation parameters of the set may be combined, depending on the implementation.

At block 1422, the system combines the overall evaluation parameter raw values from each of the user accounts of the subset to generate an overall raw distribution. This block may be performed similarly to what is described above in reference to block 1406.

At blocks 1424 and 1426, the system generates and normalizes an overall evaluation parameter function based on the overall raw distribution. These blocks may be performed similarly to what is described above in reference to blocks 1408 and 1410.

Accordingly, a normalized overall evaluation parameter function is also generated for the subset of user accounts of the user account type, and the system may store the normalized overall evaluation parameter function, e.g., in the evaluation models database 1207. Advantageously, as with the normalized evaluation parameter functions, the system may use the normalized overall evaluation parameter functions to further evaluate new user accounts assessed by the system. For example, new user accounts may be evaluated on the basis of the overall evaluation parameter to determine whether the new user accounts deviate from the norm (e.g., the subset of user accounts of the same type as the new user accounts), and by how much they deviate. Accordingly, a risk associated with the new user accounts may be further quantified and provided to a customer.

In optional block 1428, in some implementations various evaluation parameters may be combined, as described above regarding evaluation sub-parameters. Combining evaluation parameters may be accomplished at any step in the method of FIGS. 14A-14B. Advantageously, combining evaluation parameters may provide a combined evaluation parameter that is more meaningful to a customer in evaluating a user account (e.g., regarding a risk associated with the user account).

In various embodiments, in generating the evaluation models, the system may use all user account data that is available for each user account of the subset, or may use some other amount of the user account data available. For example, the system may determine a time period, or time limit, and/or may otherwise limit the user account data based on time when generating the evaluation models. Thus the evaluation models may advantageously be generated for a known timeframe of data (e.g., a more recent model, an older model, a more comprehensive model, etc.).

In some embodiments, the evaluation parameter may include two, three, or more dimensions. A multi-dimensional evaluation parameter may be evaluated, and a normalized evaluation parameter function may be generated (e.g., via multi-variate kernel density estimation) in manner similar to what is described herein.

X. Example Method of Evaluating a User Account

Figure 17A:
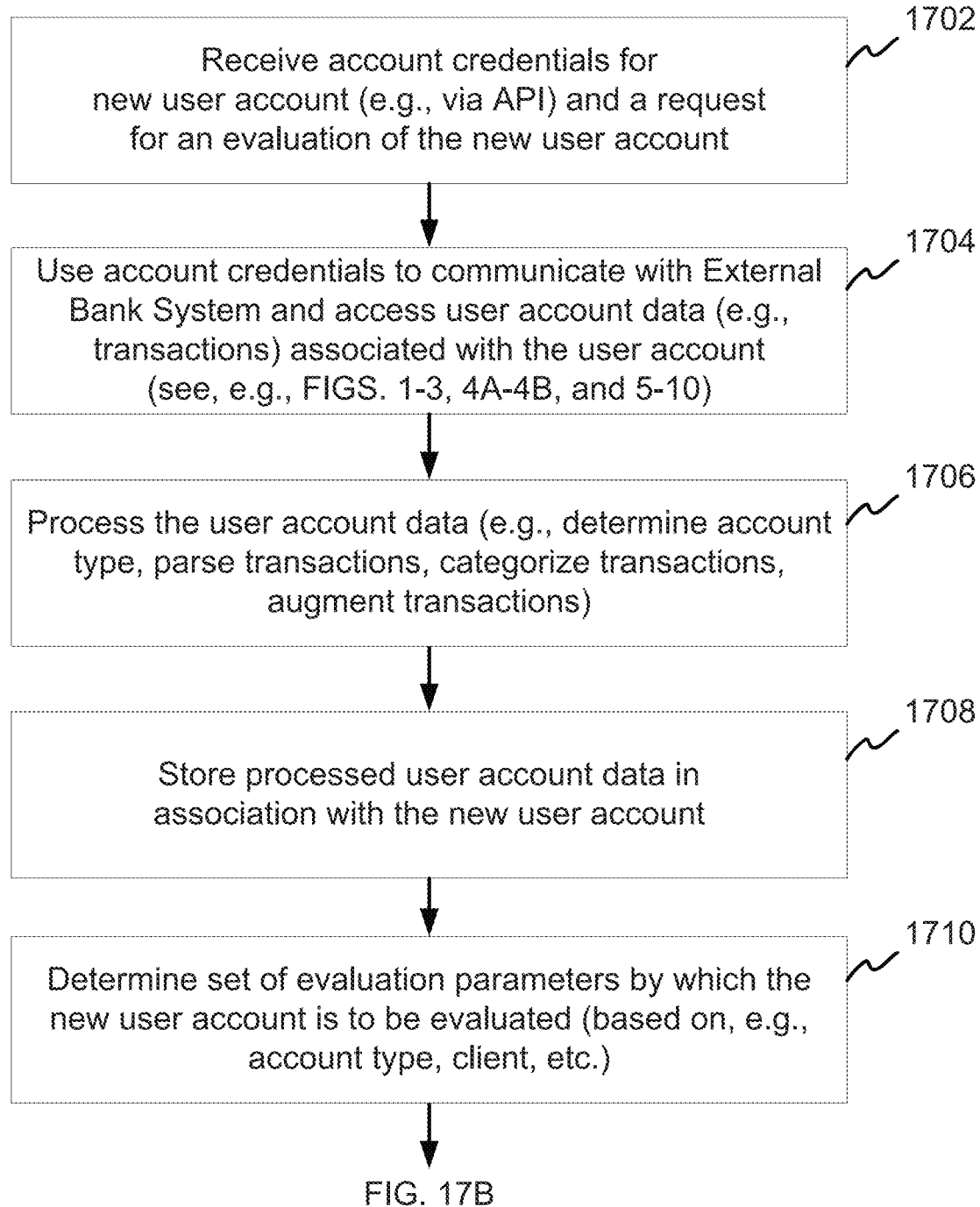
FIGS. 17A-17B are flowcharts of an example method of evaluating a user account, according to an embodiment.
Figure 17B:
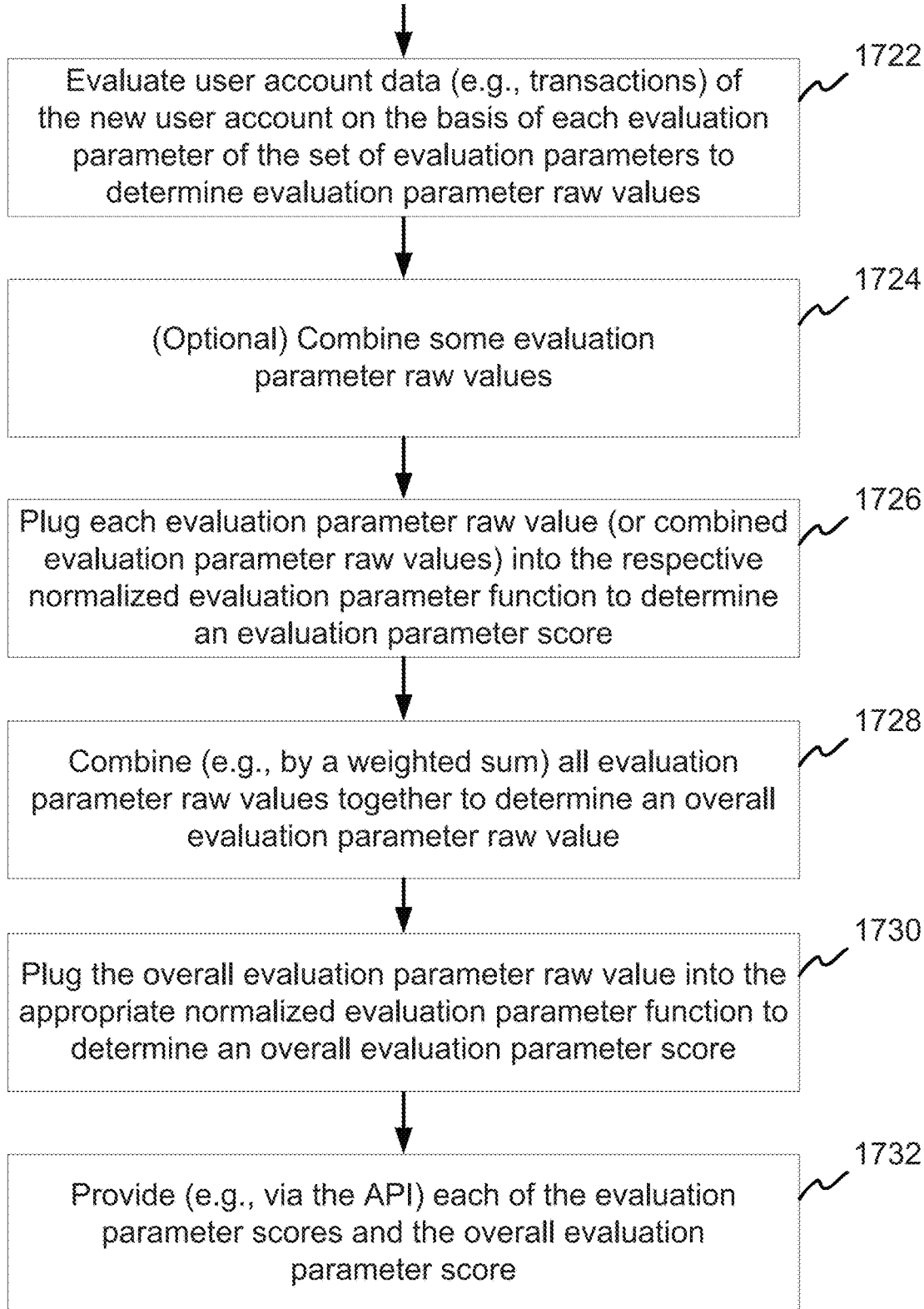

FIGS. 17A-17B are flowcharts of an example method of evaluating a user account, according to an embodiment. For example, the method of FIGS. 17A-17B may be performed by the user account evaluation system 1204.

At block 1702, user account credentials may be received by the system for a new user account that is to be evaluated by the system. This block may be performed similarly to what is described above in reference to block 1302 (of FIG. 13). Additionally, the system may receive a request for an evaluation (e.g., an assessment of risk) of the new user account. The request may be received from a customer via the external user-facing system/application. In some implementations, the request may be received separately, or via a different channel from, the account credentials. In some implementations, the account credentials may be separately encrypted from the request, and/or the account credentials may be protected such that the customer and/or the external user-facing system/application does not have access to the account credentials.

Additionally, in some cases the account credentials may have been previously received and stored by the system, and thus only a request for an evaluation of the new user account may be received.

At block 1704, the user account evaluation system 1204 uses the user account credentials to communicate with one or more external user account system(s) 1206 to access user account data related to the new user account. This block may be performed similarly to what is described above in reference to block 1304 (of FIG. 13).

At block 1706 the system processes the user account data accessed/obtained by the system. This block may be performed similarly to what is described above in reference to block 1306 (of FIG. 13).

At block 1708, the user account data is optionally stored in the user account database 1205 in association with the new user account.

At block 1710, the system determined a set of evaluation parameters by which the new user account is to be evaluated. For example, the system may determine a user account type of the new user account (e.g., as described above), and may then determine a set of evaluation parameters associated with the user account type of the new user account. The set of evaluation parameters applicable to the new user account may be accessed, e.g., from the evaluation models database 1207.

Continuing with FIG. 17B, at block 1722 the system evaluates the user account data associated with the new user account on the basis of each evaluation parameter of the set to determine raw values for each of the evaluation parameters. This block may be performed similarly to what is described above in reference to block 1404 (of FIG. 14A).

At block 1724, the system may optionally combine some of the evaluation parameter raw values (e.g., as described above in reference to the evaluation sub-parameters and/or block 1428 of FIG. 14B). Combining evaluation parameters may be advantageous, e.g., when some of the evaluation models are generated based on combined evaluation parameters and/or evaluation sub-parameters.

At block 1726, the system accesses the normalized evaluation parameter functions associated with each evaluation parameter of the set from the evaluation models database 1207, and plugs the determined evaluation parameter raw values into the respective normalized evaluation parameter functions. As a result, the system determines an evaluation parameter score for each of the evaluation parameters of the set. As described above, the evaluation parameter scores indicate an amount of deviation from the norm (as indicated by the normalized evaluation parameter functions that are generated based on a population or subset of user accounts of a similar type to the new user account) for each evaluation parameter. Advantageously, deviations from the norm, as indicated by the evaluation parameter scores may be correlated with risk associated with the new user account (e.g., a likelihood that the user of the user account will not pay, will initiate a charge back, and/or the like, as described above).

In an implementation, each evaluation parameter score may be a numerical score between 0 and 1, where a score of or close to 0 indicates a lower risk and a score of or close to 1 indicates a higher risk. For example, in one implementation a score of 0.5 may indicate that 50% of the population of user accounts is more normal than the evaluated user account, and score of 0.9 may indicate that 90% of the population of user accounts is more normal than the evaluated user account. In other implementations, any other scores and/or scales may be used.

FIG. 16B illustrates an example of determining an evaluation parameter score for a new user account 1612. As shown, an evaluation parameter raw value 1614 is determined, and then that raw value is plugged into the normalized evaluation parameter function 1610 (the generation of which is described above). The system thereby determines that a raw value of 11 does comprise a slight deviation from the norm, and determines an evaluation parameter score 1616 of 0.69.

In some implementations, the evaluation parameter score comprises a number of standard deviations from the norm, capped at 1. In other implementations the evaluation parameter score is scaled for multiple standard deviations from the norm, where a maximum number of standard deviations corresponds to 1. In various other implementations, other scaling and/or deviations may be used for adjusting the score to a standard scale (e.g., from 0 to 1).

Returning to FIG. 17B, at block 1728, the system combines each of the determined evaluation parameter raw values (e.g., for each of the evaluation parameters of the set) to determine an overall evaluation parameter raw value. This block may be performed similarly to what is described above in reference to block 1420 (of FIG. 14B).

At block 1730, the system accesses the normalized overall evaluation parameter function associated with the user account type from the evaluation models database 1207, and plugs the determined overall evaluation parameter raw value in into the normalized overall evaluation parameter function. As a result, and as with the other evaluation parameters, the system determines an overall evaluation parameter score for the overall evaluation parameter. As described above, the overall evaluation parameter score indicates an overall amount of deviation from the norm (as indicated by the normalized overall evaluation parameter functions that are generated based on a population or subset of user accounts of a similar type to the new user account) for the overall evaluation parameter. Advantageously, deviations from the norm, as indicated by the overall evaluation parameter score may be correlated with an overall risk associated with the new user account (e.g., a likelihood that the user of the user account will not pay, will initiate a charge back, and/or the like, as described above).

The overall evaluation parameter score may be scaled similar to the other evaluation parameter scores described above.

FIG. 16B illustrates an example of determining an overall evaluation parameter score for the new user account 1612. As shown, an overall evaluation parameter raw value 1618 is determined, and then that raw value is plugged into a normalized overall evaluation parameter function (not show) (the generation of which is described above). The system thereby determines that a raw value of 0.00835873 does comprise a deviation from the norm, and determines an overall evaluation parameter score 1620 of 0.82.

At block 1732, the system may provide each of the evaluation parameter scores and the overall evaluation parameter score to, e.g., the customer (or the external user-facing system/application 1208) that requested the score, e.g., via the API 110.

In some implementations, the system may initially determine whether the new user account is active (e.g., there is recent activity in the account). If the account is not currently active, then the system may determine to not evaluate the account, as such an evaluation would not be accurate (and an indication of the same may be provided to the customer).

In various embodiments, the system may periodically re-evaluate a user account and provide an updated score.

In various embodiments, when determining evaluation parameter raw values, the system may use all user account data that is available for the new user account, or may use some other amount of the user account data available. For example, the system may determine a time period, or time limit, and/or may otherwise limit the user account data based on time when evaluating the new user account.

XI. Example API Response of the System

FIG. 18 illustrates an example API response with user account evaluation information, according to an embodiment. The example API response is advantageously in a standardized format, and may be provided as described at block 1732 (of FIG. 17B). Further, as mentioned above, different evaluation information (e.g., evaluation parameters) may be provided depending on preferences of different customers, and thus the API response may vary in various ways from what is shown in the example of FIG. 18.

The example API response includes a section 1802, which provides various information related to a user account (e.g., the user account that is evaluated, in this example, a financial account). Note that the API response may include information and evaluations related to multiple user accounts in a single response. The user account information includes, for example, identifications related to the user, the account, and the customer. The user account information further includes a current account balance and a current available balance on the account.

Section 1804 of the example API response includes additional information related to the account, including a name of the account and an account number.

Section 1806 of the example API response includes an indication of the institution type associated with the account.

Section 1808 of the example API response includes an indication of the type of the account.

Section 1810 of the example API response includes the various information related to the evaluation of the account.

As shown, scores are provided for various evaluation parameters that are associated with the type of the account.

Section 1812 of the example API response includes a score for an overall evaluation parameter that is associated with the type of account.

Various other information may be provided in the API response including, e.g., a token identifier, as described in the '603 and '508 applications, which are incorporated by reference herein.

As mentioned above, in some implementations the system may send various types of alerts and/or other indications to a user computing device (e.g., user computing device 1214). These various types of alerts and/or other indications may activate one or more applications (e.g., an SMS (simple message service) and/or MMS (multimedia messaging service) process and/or application, an email process and/or application, a process and/or application related to the system, a first-party and/or third-party process and/or application (e.g., of an institution and/or a user-facing application/service), and/or the like) on the user computing device. In some examples, the system may send alerts to the user computing device regarding evaluations (e.g., evaluation parameter scores, risk scores, etc.), a change in an evaluation (e.g. change in evaluation parameter scores, risk scores, etc.), the occurrence of an event that affects an evaluation (e.g., a bankruptcy, an overdue bill, etc.), an adverse event (e.g., a charge back, an insufficient funds notice, etc.), and/or the like. Such alerts may comprise SMS messages, email messages, and/or other types of messages that may activate various processes and/or applications, as described above. In another example, an alert may activate, e.g., an email application by which the user may select a link to de-authorize an external user-facing system/application (either automatically, or via a user interface that may be presented as a result of selecting the link).

XII. Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others.

The scope of certain inventions disclosed herein is indicated by the appended claims rather than by the foregoing description. All changes which come within the meaning and range of equivalency of the claims are to be embraced within their scope.

What is claimed is:

1. A computer-implemented method comprising:
by one or more hardware processors executing computer-readable instructions:
generating, from a set of user accounts each associated with a user account type, a normalized evaluation parameter function associated with an evaluation parameter;
instantiating a proxy instance of a software application;
interfacing, using the proxy instance of the software application and via an API of an external user account system, with computing devices associated with the external user account system;
requesting, by the proxy instance of the software application and via the API, new user account data associated with a new user account of a user from at least one of the computing devices associated with the external user account system;
receiving the new user account data from the at least one of the computing devices associated with the external user account system;
determining that the new user account is associated with the user account type;
analyzing, based on the evaluation parameter, the new user account data;
determining, based on the analyzed new user account data, an evaluation parameter raw value for the new user account; and
determining, based on the normalized evaluation parameter function associated with the evaluation parameter, and the evaluation parameter raw value for the new user account, an evaluation parameter score associated with the new user account.

2. The computer-implemented method of claim 1 further comprising:
by the one or more hardware processors executing computer-readable instructions:
receiving, via a standardized API different from the API of the external user account system:
account credentials associated with the new user account; and
a request for the evaluation parameter score associated with the new user account; and
providing, via the standardized API different from the API of the external user account system, the evaluation parameter score.

3. The computer-implemented method of claim 1 further comprising:
configuring the proxy instance of the software application to appear to the computing devices associated with the external user account system to be the software application executing on a physical computing device of a customer of the external user account system.

4. The computer-implemented method of claim 1, wherein generating the normalized evaluation parameter function comprises:
analyzing, based on the evaluation parameter, the user accounts of the set of user accounts to determine evaluation parameter raw values;
generating a raw distribution based on the evaluation parameter raw values;

generating an evaluation parameter function that estimates a shape of the raw distribution; and
normalizing the evaluation parameter function.

5. The computer-implemented method of claim 4, wherein the evaluation parameter is one from a set of evaluation parameters, wherein the set of evaluation parameters is associated with the user account type, wherein the set of evaluation parameters includes an overall evaluation parameter, and wherein the computer-implemented method further comprises:
by the one or more hardware processors executing computer-readable instructions:
for each user account of the set of user accounts, determining an overall evaluation parameter raw value, wherein determining the overall evaluation parameter raw value for a user account comprises:
selecting, based on the overall evaluation parameter, a subset of the evaluation parameters of the set of evaluation parameters; and
combining, based on the overall evaluation parameter, evaluation parameter raw values of the user account associated with respective evaluation parameters of the set of evaluation parameters;
generating an overall raw distribution based on the overall evaluation parameter raw values from each of the user accounts of the set of user accounts;
generating an overall evaluation parameter function that estimates a shape of the overall raw distribution; and
generating a normalized overall evaluation parameter function.

6. The computer-implemented method of claim 5 further comprising:
by the one or more hardware processors executing computer-readable instructions:
combining, based on the overall evaluation parameter, evaluation parameter raw values of the new user account associated with respective evaluation parameters of the set of evaluation parameters;
determining, based on the combined evaluation parameter raw values, an overall evaluation parameter raw value; and
determining, based on the normalized overall evaluation parameter function and the overall evaluation parameter raw value for the new user account, an overall evaluation parameter score.

7. The computer-implemented method of claim 4, wherein generating the raw distribution comprises:
by the one or more hardware processors executing computer-readable instructions:
determining bins into which each of the user accounts of the set of user accounts may be placed; and
putting the user accounts of the set of user accounts into the determined bins based on the respective evaluation parameter raw values.

8. The computer-implemented method of claim 4, wherein generating and/or normalizing the evaluation parameter function comprises:
by the one or more hardware processors executing computer-readable instructions:
estimating, using an estimation technique, a probability density function of the raw distribution.

9. The computer-implemented method of claim 1 further comprising:
by the one or more hardware processors executing computer-readable instructions:
obtaining the respective user account data associated with each of the user accounts of the set of user accounts from a plurality of external user account systems;
processing user account data items of the respective user account data by:
standardizing a format of the user account data items;
categorizing the user account data items; and
augmenting the user account data items with geolocation information; and
determining, based on the respective user account data, user account types of the user accounts of the set of user accounts.

10. A computer system comprising:
one or more non-transitory computer-readable storage devices configured to store a plurality of computer executable instructions; and
one or more hardware computer processors in communication with the one or more non-transitory computer-readable storage devices and configured to execute the plurality of computer executable instructions to cause the computer system to:
generate, from a set of user accounts each associated with a user account type, a normalized evaluation parameter function associated with an evaluation parameter;
instantiate a proxy instance of a software application;
interface, using the proxy instance of the software application and via an API of an external user account system, with computing devices associated with the external user account system;
request, by the proxy instance of the software application and via the API, new user account data associated with a new user account of a user from at least one of the computing devices associated with the external user account system;
receive the new user account data from the at least one of the computing devices associated with the external user account system;
determine that the new user account is associated with the user account type;
analyze, based on the evaluation parameter, the new user account;
determine, based on the analyzed new user account data, an evaluation parameter raw value for the new user account; and
determine, based on the normalized evaluation parameter function associated with the evaluation parameter, and the evaluation parameter raw value for the new user account, an evaluation parameter score associated with the new user account.

11. The computer system of claim 10, wherein the one or more hardware computer processors are configured to execute the plurality of computer executable instructions to further cause the computer system to:
receive, via a standardized API different from the API of the external user account system:
account credentials associated with the new user account; and
a request for the evaluation parameter score associated with the new user account; and
provide, via the standardized API different from the API of the external user account system, the evaluation parameter score.

12. The computer system of claim 10, wherein the proxy instance of the software application is configured to appear to the computing devices associated with the external user account system to be the software application executing on a physical computing device of a customer of the external user account system.

13. The computer system of claim 10, wherein generating the normalized evaluation parameter function comprises:
    analyzing, based on the evaluation parameter, the user accounts of the set of user accounts to determine evaluation parameter raw values;
    generating a raw distribution based on the evaluation parameter raw values;
    generating an evaluation parameter function that estimates a shape of the raw distribution; and
    normalizing the evaluation parameter function.

14. The computer system of claim 13, wherein the evaluation parameter is one from a set of evaluation parameters, wherein the set of evaluation parameters is associated with the user account type, wherein the set of evaluation parameters includes an overall evaluation parameter, and wherein the one or more hardware computer processors are configured to execute the plurality of computer executable instructions to further cause the computer system to:
    for each user account of the set of user accounts, determine an overall evaluation parameter raw value, wherein determining the overall evaluation parameter raw value for a user account comprises:
        selecting, based on the overall evaluation parameter, a subset of the evaluation parameters of the set of evaluation parameters; and
        combining, based on the overall evaluation parameter, evaluation parameter raw values of the user account associated with respective evaluation parameters of the set of evaluation parameters;
    generate an overall raw distribution based on the overall evaluation parameter raw values from each of the user accounts of the set of user accounts;
    generate an overall evaluation parameter function that estimates a shape of the overall raw distribution; and
    generate a normalized overall evaluation parameter function.

15. The computer system of claim 14, wherein the one or more hardware computer processors are configured to execute the plurality of computer executable instructions to further cause the computer system to:
    combine, based on the overall evaluation parameter, evaluation parameter raw values of the new user account associated with respective evaluation parameters of the set of evaluation parameters;
    determine, based on the combined evaluation parameter raw values, an overall evaluation parameter raw value; and
    determine, based on the normalized overall evaluation parameter function and the overall evaluation parameter raw value for the new user account, an overall evaluation parameter score.

16. The computer system of claim 13, wherein generating the raw distribution comprises:
    determining bins into which each of the user accounts of the set of user accounts may be placed; and
    putting the user accounts of the set of user accounts into the determined bins based on the respective evaluation parameter raw values.

17. The computer system of claim 13, wherein generating and/or normalizing the evaluation parameter function comprises:
    estimating, using an estimation technique, a probability density function of the raw distribution.

18. The computer system of claim 10, wherein the one or more hardware computer processors are configured to execute the plurality of computer executable instructions to further cause the computer system to:
    obtain the respective user account data associated with each of the user accounts of the set of user accounts from a plurality of external user account systems;
    process user account data items of the respective user account data by:
        standardizing a format of the user account data items;
        categorizing the user account data items; and
        augmenting the user account data items with geolocation information; and
    determine, based on the respective user account data, user account types of the user accounts of the set of user accounts.

* * * * *